(12) United States Patent
Kawase

(10) Patent No.: US 12,509,305 B2
(45) Date of Patent: Dec. 30, 2025

(54) TRANSPORT SYSTEM

(71) Applicant: Mitsubishi Electric Corporation, Tokyo (JP)

(72) Inventor: Tatsuya Kawase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/876,347

(22) PCT Filed: Nov. 11, 2022

(86) PCT No.: PCT/JP2022/042055
§ 371 (c)(1),
(2) Date: Dec. 18, 2024

(87) PCT Pub. No.: WO2024/100880
PCT Pub. Date: May 16, 2024

(65) Prior Publication Data
US 2025/0270053 A1    Aug. 28, 2025

(51) Int. Cl.
*G07F 7/00* (2006.01)
*B65G 43/00* (2006.01)

(52) U.S. Cl.
CPC ................................. *B65G 43/00* (2013.01)

(58) Field of Classification Search
CPC ........ B65G 15/00; B65G 17/00; B65G 19/00; B65G 35/00; B65G 43/00; B65G 47/00;
(Continued)

(56) References Cited

U.S. PATENT DOCUMENTS 8,996,161 B2    3/2015 Wernersbach et al.
9,505,560 B2 *  11/2016 Kleinikkink ......... G05B 19/414
(Continued)

FOREIGN PATENT DOCUMENTS

EP    3599127 B1 *  10/2022    ............ B65G 43/00
JP    6490273 B2    3/2019
(Continued)

OTHER PUBLICATIONS

International Search Report and Written Opinion mailed on Jan. 31, 2023, received for PCT Application No. PCT/JP2022/042055, filed on Nov. 11, 2022, 9 pages including English Translation.
(Continued)

*Primary Examiner* — Yolanda R Cumbess
(74) *Attorney, Agent, or Firm* — XSENSUS LLP

(57) ABSTRACT

A transport system includes: a plurality of transport path units that apply a driving force to a plurality of moving bodies; a communication master station communicably connected to a transport path communication subordinate station of the transport path unit; a communication subordinate station communicably connected to the communication master station; a position command generator connected to the communication master station; a position generator connected to the communication master station; a position controller connected to the communication subordinate station and allocated to the moving body; and a current command generator to generate a current command value of the transport path unit.

18 Claims, 20 Drawing Sheets

(58) Field of Classification Search
CPC ......... B65G 2201/02; B65G 2203/0266–0291;
B65G 17/002–005; B65G 17/12; B65G
35/06; B65G 2812/02762; G05B 1/01;
G05B 13/00; G05B 19/00; G05B
2219/00; G05B 13/021; G05B 13/0205;
G05B 19/25; G05B 19/251–258; G05B
23/0205; B07C 3/082; G07F 11/58
USPC ....................................................... 700/230
See application file for complete search history.

(56) References Cited

U.S. PATENT DOCUMENTS

| | | |
|---|---|---|
| 10,164,555 B1 | 12/2018 | Ozimek |
| 10,951,138 B2 | 3/2021 | Das |
| 2019/0094252 A1 | 3/2019 | Waser et al. |
| 2021/0116292 A1 | 4/2021 | Kiendl |
| 2021/0249944 A1 | 8/2021 | Ono et al. |

FOREIGN PATENT DOCUMENTS

| | | | | |
|---|---|---|---|---|
| JP | 2019-518953 A | 7/2019 | | |
| JP | 2021-126002 A | 8/2021 | | |
| WO | WO-2022063848 A1 * | 3/2022 | ............ | B60L 15/005 |
| WO | 2022/090259 A2 | 5/2022 | | |

OTHER PUBLICATIONS

Notice of Reason for Refusal mailed on Oct. 24, 2023, received for JP Application 2023-558278, 8 pages including English Translation.
Decision to Grant mailed on Feb. 27, 2024, received for JP Application 2023-558278, 5 pages including English Translation.

* cited by examiner

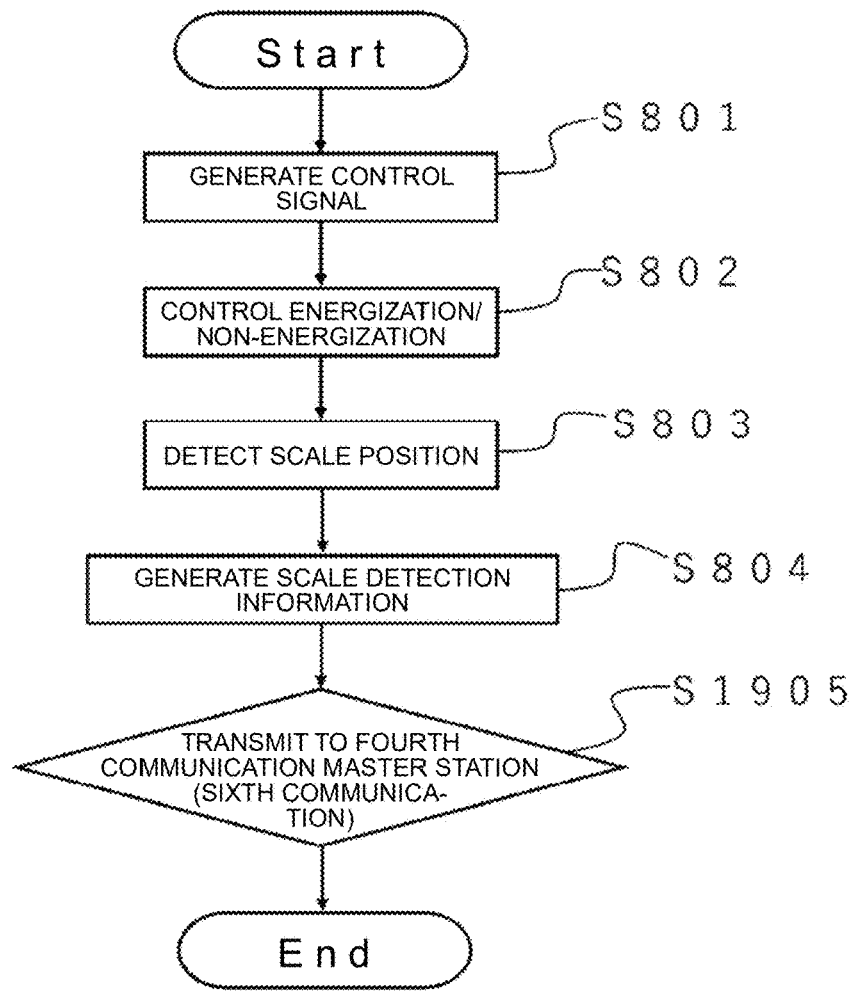
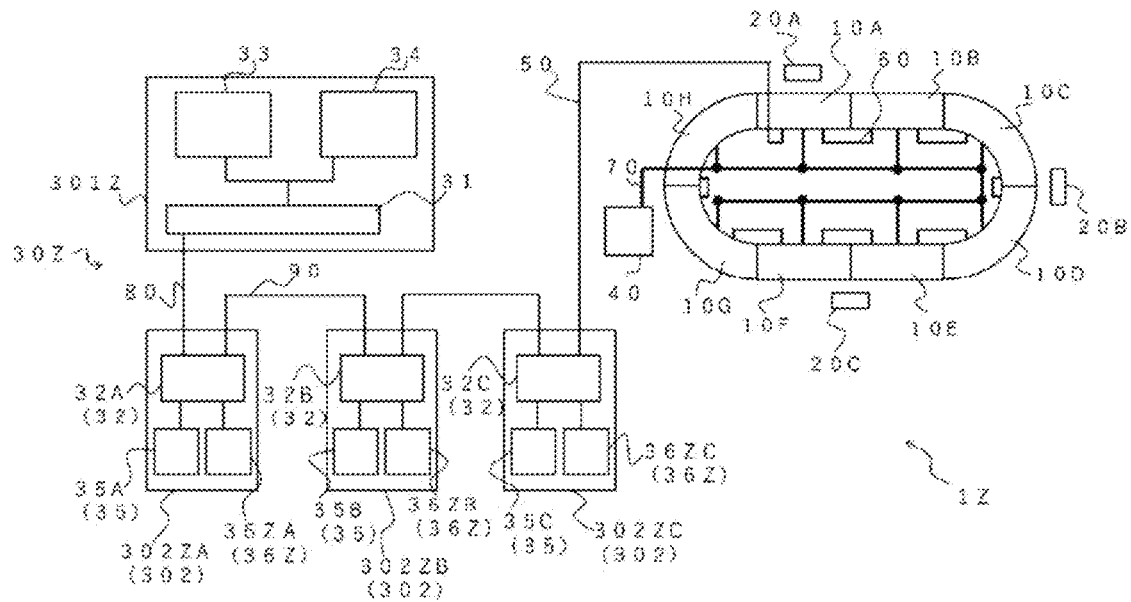

TRANSPORT SYSTEM

CROSS-REFERENCE TO RELATED APPLICATION

This application is a national stage application, pursuant to 35 U.S.C. § 371, of International Patent Application No. PCT/JP2022/042055, filed Nov. 11, 2022, the entire contents of which are incorporated herein by reference.

FIELD

The present disclosure relates to a transport system that moves a plurality of moving bodies along a transport route.

BACKGROUND

In the field of factory automation (FA), in production lines for assembling products, packaging products, and packaging foods, transport systems are used to transport an object to be transported between a plurality of stations that are provided in a production line and between production lines. In recent years, for improving production efficiency, transport systems have attracted attention that divide a transport route into a plurality of control zones in order to move a moving body that serves as an object to be transported, and include a control device that controls the movement of the moving body in each control zone, so as to transport the object to be transported by controlling the movement of the moving body for each control zone.

Patent Literature 1 below discloses a linear track control system including a plurality of linear motor modules and an operation controller, and a transport system including a carriage that serves as a moving body that moves on a transport path (transport route) configured by the plurality of linear motor modules. The linear track control system disclosed in Patent Literature 1 includes a plurality of coil units, a plurality of control sections, a position detection section, and an allocation section for each of a plurality of linear motor modules. In such a linear track control system, when the carriage enters a linear motor module, the position of the carriage is detected by the position detection section, and one control section is allocated to one carriage by the allocation section. Then, the control section to which one carriage is allocated calculates current control information, and performs control so as to supply a drive current according to the current control information to the coil unit necessary for moving the one carriage to which the control section is allocated.

In Patent Literature 1, when one control section is allocated one carriage, in a case where the position of the allocated carriage exists on one coil unit in the linear motor module, the one control section performs control so as to supply a drive current to the one coil unit in which the carriage exists. In addition, in a case where the position of the allocated carriage exists in the vicinity of the boundary between two adjacent coil units in the linear motor module, the one control section performs control so as to supply a drive current to the two coil units constituting the vicinity of the boundary where the carriage exists. In the linear track control system disclosed in Patent Literature 1, when a plurality of carriages enter one linear motor module, one control section is allocated to one carriage by the allocation section, but if the number of carriages exceeds the number of control sections included in the linear motor module and there is no control section to be allocated, error information is transmitted to the operation controller by the allocation section.

CITATION LIST

Patent Literature

Patent Literature 1: Japanese Patent No. 6490273

SUMMARY OF INVENTION

Problem to be Solved by the Invention

In the linear track control system disclosed in Patent Literature 1 described above, when a carriage enters a linear motor module including a plurality of coil units and a plurality of control sections, one control section is allocated to one carriage to control movement of the carriage. Therefore, even when there is a carriage in the vicinity of the boundary between adjacent coil units in one linear motor module, the linear track control system controls the movement of the carriage by one control section to which one carriage is allocated, thereby preventing simultaneous control of one carriage from a plurality of control sections, and controlling the movement of the carriage with high accuracy. Then, when the position of the allocated carriage exists in the vicinity of the boundary between two adjacent coil units in the linear motor module, one control section to which one carriage is allocated performs control so as to supply a drive current to the two coil units constituting the vicinity of the boundary where the carriage exists. Consequently, the linear track control system prevents the driving force applied to the carriage from being halved in one linear motor module, and does not need to have a high-cost electric circuit prepared for one coil unit to supply the driving force expected from two coil units to the carriage.

However, in the transport system, the carriage moves on a transport route configured by a plurality of linear motor modules. Therefore, the transport system is required to be capable of controlling the movement of the carriage with high accuracy even at the boundary between adjacent linear motor modules in the transport system, and to eliminate the need for a high-cost electric circuit prepared for one coil unit to supply the driving force expected from two coil units to the carriage. Furthermore, although the transport system moves a plurality of carriages along the transport route, it is desirable that the transport system is not frequently stopped due to an error related to some control in order to improve production efficiency.

On the other hand, in the linear track control system disclosed in Patent Literature 1, as described above, in one linear motor module, even when there is a carriage at the boundary between adjacent coil units, one control section can perform control so as to supply a drive current to a plurality of coil units through control by the one control section. However, in the linear track control system disclosed in Patent Literature 1, when there is a carriage at the boundary between adjacent linear motor modules, movement of one carriage is simultaneously controlled by two control sections: the control section of one linear motor module and the control section of the other linear motor module. For this reason, the linear track control system disclosed in Patent Literature 1 has a problem that it is difficult to control the movement of the carriage with high accuracy at the boundary between adjacent linear motor modules.

In addition, in the linear track control system disclosed in Patent Literature 1, in a case where there is a carriage at the boundary between adjacent linear motor modules, if one carriage is controlled using one of the control sections of the adjacent linear motor modules, the control section of one linear motor module cannot supply a drive current to the coil unit of the other linear motor module, and thus the driving force applied to the carriage becomes half. In such a case, in the linear track control system disclosed in Patent Literature 1, in order for the carriage to obtain a driving force equivalent to that in a case where both adjacent coil units are driven, it is necessary to supply twice the drive current to one coil unit that can be controlled to receive a supply of drive current by the control section of one linear motor module, and there is a problem that the electric circuit is high in cost.

In addition, the linear track control system disclosed in Patent Literature 1 has a problem that, when the number of carriages that enter the linear motor module exceeds the number of control sections included in the linear motor module, once there is no control section to be allocated, error information is transmitted to the operation controller by the allocation section, and carriage control of all the linear motor modules is stopped. In addition, since the linear track control system disclosed in Patent Literature 1 includes a control section in the linear motor module, in order to avoid the problem of stopping the carriage control of the linear motor module, it is necessary to include, in all the linear motor modules, the same number of control sections as the number of carriages that are the moving bodies moving on the transport path of the transport system, and there is a problem that the control system is increased in size and cost due to the increase in the number of control sections.

The present disclosure has been made to solve the above-described problems, and an object thereof is to provide a transport system in which transport path units having a plurality of drive elements that apply a driving force to a moving body are disposed adjacent to each other, movement of the moving body can be controlled with high accuracy even at the boundary between the adjacent transport path units, an increase in cost of the electric circuit included in one drive element is reduced or prevented, and the control of the moving body of the transport system can be prevented from stopping without increasing the size and cost of the control system.

Means to Solve the Problem

A transport system according to the present disclosure includes: a plurality of transport path units that constitute a movement route on which a plurality of moving bodies move, and apply a driving force to the moving bodies; a communication master station communicably connected to a transport path communication subordinate station provided in the transport path unit; a communication subordinate station communicably connected to the communication master station; a position command generator connected to the communication master station, and configured to generate a position command value of a moving body that is a position command value for each of the plurality of moving bodies; a position generator connected to the communication master station, and configured to generate position information on a moving body that is position information for each of the plurality of moving bodies; a position controller connected to the communication subordinate station, allocated to the moving body, and configured to generate a drive command value of the moving body based on the position command value of the moving body and the position information on the moving body or based on a position deviation obtained from the position command value of the moving body and the position information on the moving body; and a current command generator that generates a current command value of the transport path unit based on the drive command value of the moving body and the position information on the moving body. Then, the communication master station performs a first communication of transmitting the position command value of the moving body and the position information on the moving body or the position deviation toward the communication subordinate station. In addition, when the current command generator is connected to the communication master station, the communication subordinate station performs a second communication of transmitting the drive command value of the moving body toward the communication master station, and the communication master station performs a third communication of transmitting the current command value of the transport path unit toward the transport path communication subordinate station. When the current command generator is connected to the communication subordinate station, the communication subordinate station performs a fourth communication of transmitting the current command value of the transport path unit toward the communication master station, and the communication master station performs the third communication. Further, when the current command generator is connected to the transport path communication subordinate station, the communication subordinate station performs the second communication, and the communication master station performs a fifth communication of transmitting the drive command value of the moving body and the position information on the moving body toward the transport path communication subordinate station.

Effects of the Invention

In the transport system according to the present disclosure, transport path units that apply the driving force to the moving body are disposed adjacent to each other, the movement of the moving body can be controlled with high accuracy even at the boundary between the adjacent transport path units, and an increase in the cost of the electric circuits included in the transport path units can be reduced or prevented. In addition, the transport system according to the present disclosure can prevent the control of the moving body of the transport system from stopping without increasing the size and cost of the control system.

BRIEF DESCRIPTION OF DRAWINGS

FIG. 19 is a flowchart illustrating an example of the operation of the transport path unit according to the fourth embodiment.

FIG. 20 is a schematic diagram illustrating an exemplary configuration of the transport system according to the fifth embodiment.

DESCRIPTION OF EMBODIMENTS

Hereinafter, embodiments of the present disclosure will be described in detail with reference to the drawings. The present disclosure is not limited to the embodiments.

First Embodiment

Figure 1:
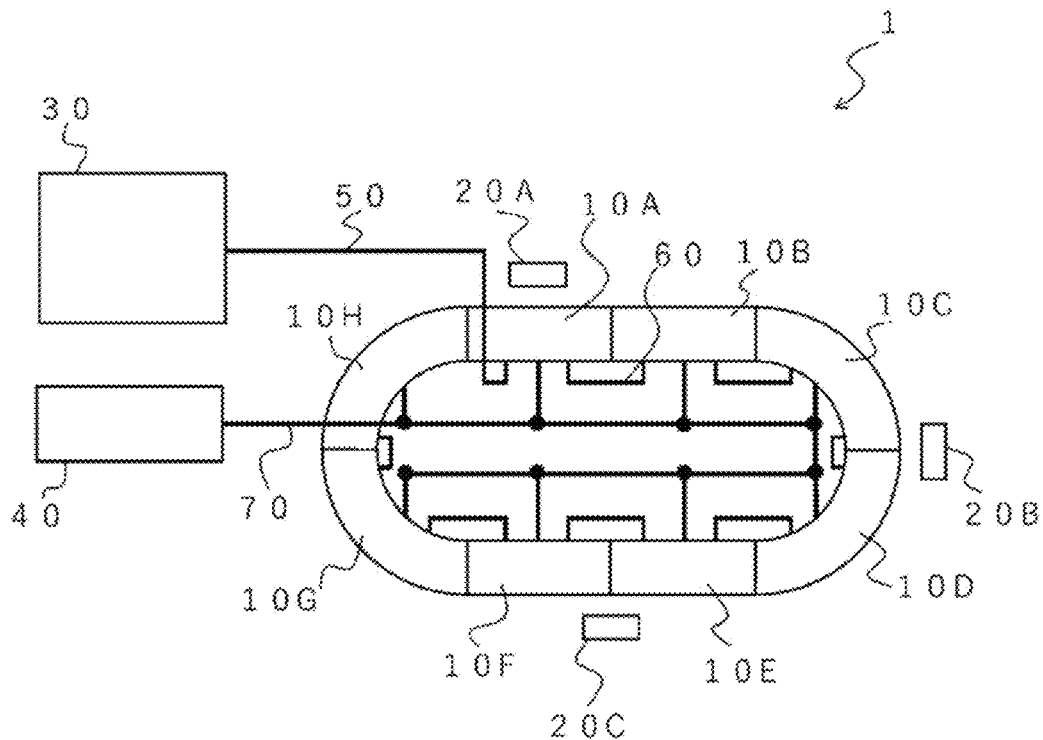
FIG. 1 is a schematic diagram illustrating an exemplary configuration of the transport system according to the first embodiment.

FIG. 1 is a schematic diagram illustrating an exemplary configuration of the transport system according to the first embodiment of the present disclosure. As illustrated in FIG. 1, the transport system 1 includes a plurality of transport path units 10A to 10H constituting a transport route for a plurality of moving bodies 20A to 20C, a control controller 30 that controls operations of the plurality of moving bodies 20A to 20C, and a power supply unit 40 that supplies power to the transport path units 10A to 10H. The plurality of moving bodies 20A to 20C are installed so as to move along the transport route constituted by the transport path units 10A to 10H. In the present disclosure, the plurality of transport path units 10A to 10H may be simply referred to as the transport path units 10 when it is not necessary to distinguish therebetween. In the present disclosure, the plurality of moving bodies 20A to 20C may be simply referred to as the moving bodies 20 in a case where it is not necessary to distinguish therebetween.

Note that, in the transport system 1, a programmable logic controller (PLC) (not illustrated) that gives a command to execute sequence control to the control controller 30 from a higher rank, a human machine interface (HMI) (not illustrated) for inputting parameters by an operator and checking the operating state of the system, and the like may be connected to the control controller 30.

In the transport system 1 illustrated in FIG. 1, the control controller 30 is connected to the transport path units 10 by a first communication line 50, and each of the transport path units 10 are connected to adjacent transport path units 10 by a second communication line 60. The transport path units 10A to 10H are connected to the power supply unit 40 by a power supply line 70.

In FIG. 1, the control controller 30 and one transport path unit 10 are connected by the first communication line 50, and transport path units 10 that are adjacent to each other are connected by the second communication line 60, whereby a communication network between the control controller 30 and the transport path units 10 is configured by a daisy chain. However, the communication network between the control controller 30 and the transport path units 10 may not be a daisy chain. For example, the communication network between the control controller 30 and the transport path units 10 may be in the form of a star connection in which the control controller 30 and a communication hub are connected a communication line, and the communication hub and the transport path units 10A to 10H are connected by communication lines extended from the communication hub by the number of transport path units 10, or may be in the form in which the control controller 30 and the transport path units 10A to 10H are connected by communication lines via communication lines extended from the control controller 30 by the number of transport path units 10.

Although the connection between the control controller 30 and the transport path units 10 and the connection among the transport path units 10 are connected by the first communication line 50 and the second communication line 60 which are wired, they may be connected wirelessly. That is, the connection between the control controller 30 and the transport path units 10 and the connection among the transport path units only need to be configured to be communicable by any communication means.

A positive bus and a negative bus pass through the power supply line 70. The positive bus is connected to the positive electrode of the power supply unit 40, and the negative bus is connected to the negative electrode of the power supply unit 40.

In addition, FIG. 1 illustrates the form of a multi-drop connection in which each of the transport path units 10A to 10H is connected to the common power supply line 70 and configured to share power supplied from the power supply unit 40. However, the connection between the transport path units 10 and the power supply unit 40 may not be in the form of a multi-drop connection. For example, the power supply unit 40 and the transport path unit 10 may be connected in the form of a daisy chain by connecting the power supply unit 40 and one transport path unit 10 by a power supply line and connecting transport path units 10 adjacent to each other by a power line. In addition, it is acceptable that the transport system 1 includes a plurality of power supply units, and a plurality of transport path units 10 are connected to one power supply unit by a power supply line so as to constitute a power supply domain in which power supply to the transport path units 10 is distributed.

In the transport system 1 illustrated in FIG. 1, the plurality of transport path units 10A to 10H include transport path units 10A, 10B, 10E, and 10F each having a shape forming a straight track and transport path units 10C, 10D, 10G, and 10H each having a shape forming a curved track, and the plurality of transport path units 10 are coupled to form a transport route for the moving body 20. Then, the transport system 1 is a system that can move the moving body 20 along the transport route by controlling drive elements 12 included in the transport path units 10 based on the control data output from the control controller 30.

FIG. 1 illustrates an example in which the transport system 1 includes a transport route with a closed loop shape by coupling the plurality of transport path units 10A to 10H. In FIG. 1, the transport system 1 includes eight transport path units 10, but the number of transport path units 10 is not particularly limited. Further, the transport path unit 10 is not limited to the shape illustrated in FIG. 1. For example, the transport path unit 10 may have a shape having a variety of paths such as a Y shape having a branch, a T shape, and a cross shape. That is, the transport system 1 can include various transport routes by combining the transport path units 10 having various shapes. Further, the transport route may be configured as a route having a start point and an end point. In FIG. 1, the transport system 1 includes the three moving bodies 20A to 20C, but the number of moving bodies 20 is not limited to three, and only needs to be a required number.

In the first embodiment, each configuration will be described using an example of a moving-magnet-type linear transport system in which the moving bodies 20 include magnets, the transport path units 10 include coils, and the magnets and the coils constitute a moving-magnet-type linear motor so that the moving bodies 20 move along the transport route constituted by the transport path units 10.

Figure 2:
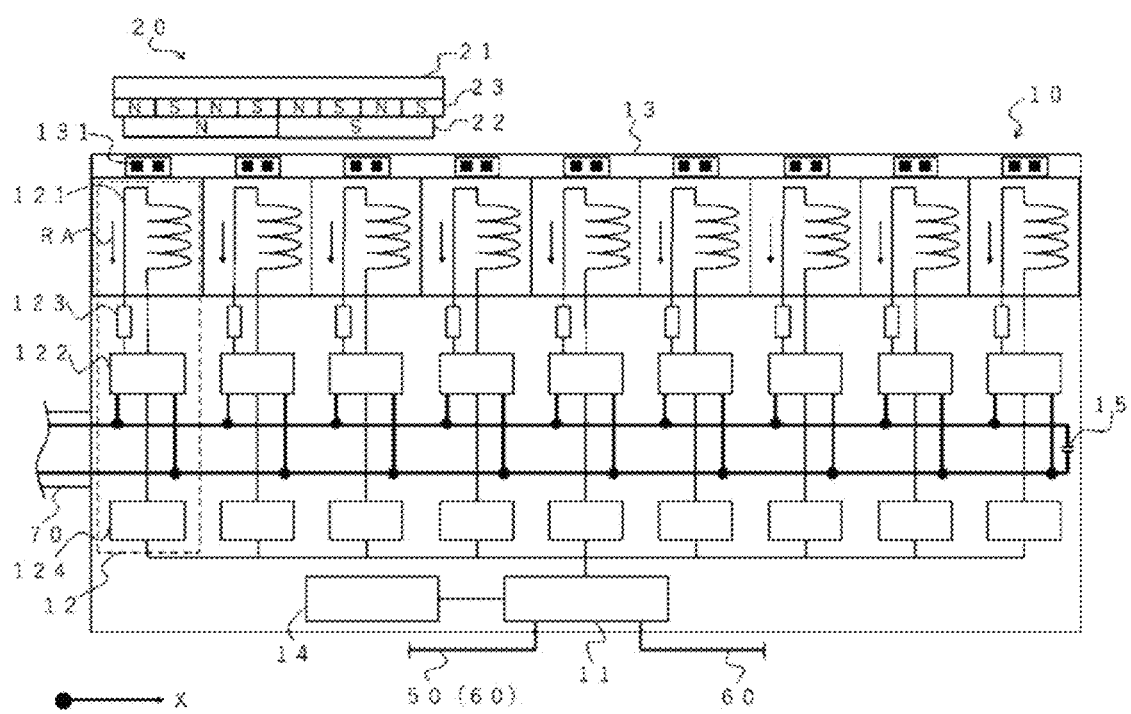
FIG. 2 is a diagram illustrating an exemplary configuration of a transport path unit and a moving body according to the first embodiment.

FIG. 2 is a diagram illustrating an exemplary configuration of a transport path unit and a moving body according to the first embodiment of the present disclosure. The transport path units 10A to 10H may differ in the number of drive elements 12 depending on the shape, but have the same configuration except for the number of drive elements 12. Therefore, FIG. 2 illustrates one transport path unit 10. In addition, the moving bodies 20A to 20C have the same configuration, and thus one moving body 20 is illustrated in FIG. 2. In FIG. 2, a path direction which is a direction along the extending direction of the transport route constituted by the transport path unit 10 is illustrated as an X axis.

As illustrated in FIG. 2, the moving body 20 includes a mover magnet group 22 in which S-pole magnets and N-pole magnets are disposed side by side along the X-axis direction on a moving body substrate 21. In FIG. 2, one S-pole magnet and one N-pole magnet are illustrated for the mover magnet group 22, but any number of S-pole magnets and N-pole magnets may be disposed alternately along the X-axis direction. The moving body 20 moves by obtaining a driving force through interaction between the electromagnetic field generated by a coil 121 of the transport path unit 10 described later and the magnetic field generated by the mover magnet group 22.

The moving body 20 includes, on the moving body substrate 21, a position detection magnet group 23 for detecting the position of the moving body 20 with a position sensor 131 provided in a scale 13 described later. In FIG. 2, four S-pole magnets and four N-pole magnets are alternately disposed along the X-axis direction in the position detection magnet group 23, but any number of S-pole magnets and N-pole magnets for the position detection magnet group 23 may be alternately disposed along the X-axis direction.

In the moving body 20, the mover magnet group 22 is disposed at a position facing the coil 121 described later on the moving body substrate 21, and the position detection magnet group 23 is disposed at a position facing the position sensor 131 described later on the moving body substrate 21. Therefore, the mover magnet group 22 and the position detection magnet group 23 are disposed at different positions in the moving body substrate 21.

Note that the moving body 20 may not necessarily include the position detection magnet group 23. If the moving body 20 does not include the position detection magnet group 23, the mover magnet group 22 is disposed at a position where a magnetic field can be detected by the position sensor 131 described later, so that the mover magnet group 22 can also serve as the position detection magnet group 23.

As illustrated in FIG. 2, the transport path unit 10 includes a transport path communication subordinate station 11 that transmits and receives control data to and from the control controller 30 and other transport path units 10, a plurality of drive elements 12 that apply a driving force to the moving body 20, the scale 13 including a plurality of position sensors 131, and a position calculator 14 that calculates scale detection information based on a detection signal output from the position sensor 131. In FIG. 2, one of the drive elements 12 is surrounded by a chain line for convenience of description. In addition, the transport path unit 10 includes an internal power supply bus connected to the power supply line 70, and the internal power supply bus includes a positive-side power supply bus connected to the positive bus of the power supply line 70 and a negative-side power supply bus connected to the negative bus of the power supply line 70. A capacitor 15 is disposed between the positive-side power supply bus and the negative-side power supply bus.

When it is necessary to distinguish between different transport path units 10 in terms of the transport path communication subordinate station 11, the drive element 12, the scale 13, the position sensor 131, and the position calculator 14, the transport path communication subordinate station 11, the drive element 12, the scale 13, the position sensor 131, and the position calculator 14 will be described with alphabetic symbols same as the alphabetic symbols attached to the transport path unit 10 in the present disclosure. For example, the transport path communication subordinate station 11, the drive element 12, the scale 13, the position sensor 131, and the position calculator 14 included in the transport path unit 10A are referred to as the transport path communication subordinate station 11A, the drive element 12A, the scale 13A, the position sensor 131A, and the position calculator 14A.

The transport path communication subordinate station 11 is an interface for transmitting and receiving control data to and from the control controller 30 and transmitting and receiving control data to and from an adjacent transport path unit 10. When the transport system 1 connects the control controller 30 and the transport path units 10 in a daisy chain, the transport path communication subordinate station 11 of one transport path unit 10 connected to the control controller 30 is connected to the first communication line 50 for connecting to the control controller 30 and the second communication line 60 for connecting to the adjacent transport path unit 10. In addition, the transport path communication subordinate station 11 of the transport path unit 10 (for example, the transport path unit 10B sandwiched between the transport path unit 10A and the transport path unit 10C) that is sandwiched between the transport path units 10 without being connected to the control controller 30, is connected to two second communication lines 60 for connecting to the adjacent transport path units 10.

When transmitting and receiving control data to and from the control controller 30 and when transmitting and receiving control data to and from the adjacent transport path units 10, the transport path communication subordinate station 11 may adopt constant cycle communication in which communication is performed at a predetermined communication cycle freely set, or may adopt non-constant cycle communication in which a predetermined communication cycle is not set. The control data transmitted and received by the transport path communication subordinate station 11 is data for controlling the movement of the moving body 20 in the transport system 1, and includes a current command value, scale detection information, and the like to be described later.

The drive elements 12 are continuously arranged along the direction of the X axis of the transport path unit 10, and apply a driving force to the moving body 20 that has entered the transport path unit 10 based on the control data received by the transport path communication subordinate station 11. FIG. 2 illustrates an example in which nine drive elements 12 are disposed in the transport path unit 10. One drive element 12 includes the coil 121 that generates an electromagnetic field for applying a driving force to the moving body 20, an inverter circuit 122 that controls a current supplied by the coil 121 to generate the electromagnetic field, a current sensor 123 that detects an actual current value RA supplied to the coil 121, and a current controller 124 that controls the operation of the inverter circuit 122. Hereinafter, each configuration of the drive element 12 will be described.

When it is necessary to distinguish between different transport path units 10 in terms of the coil 121, the inverter circuit 122, the current sensor 123, and the current controller 124, the coil 121, the inverter circuit 122, the current sensor 123, and the current controller 124 will be described with alphabetic symbols similar to the alphabetic symbols attached to the transport path unit 10 in the present specification. For example, the coil 121, the inverter circuit 122, the current sensor 123, and the current controller 124 included in the drive element 12A of the transport path unit 10A are referred to as the coil 121A, the inverter circuit 122A, the current sensor 123A, and the current controller 124A.

The coil 121 is a winding-type coil in which a conductive winding is wound around an iron core, and the current sensor 123 is connected to one end side of the two ends of the winding. One of the two ends of the winding of the coil 121 is connected to the inverter circuit 122 via the current sensor 123, and the other end is connected to the inverter circuit 122, so that both ends of the winding are connected to the inverter circuit 122.

The inverter circuit 122 is an electric circuit that controls a current to be supplied to the coil 121. That is, the inverter circuit 122 is an electric circuit included in one drive element 12. The inverter circuit 122 has one end connected to the positive-side power supply bus and the other end connected to the negative-side power supply bus, and power is supplied from the power supply unit 40 via the power supply line 70. The inverter circuit 122 is connected to the current controller 124 via an internal bus. The inverter circuit 122 operates based on a control signal for controlling the operation of the inverter circuit 122 output from the current controller 124 described later, and operates to supply a necessary current from the power supply unit 40 to the coil 121. Note that the inverter circuit 122 only needs to adopt a form of electric circuit according to the power supplied from the power supply unit 40. For example, in the case of single-phase power, a single-phase full-bridge circuit or a single-phase half-bridge circuit may be adopted, and in the case of three-phase power, a three-phase full-bridge circuit or a three-phase half-bridge circuit may be adopted.

The current sensor 123 is connected to one end side of the winding of the coil 121, and detects the actual current value RA which is a value of the current supplied to the coil 121 and actually flowing through the coil 121. The detected actual current value RA is output to the current controller 124 via an internal bus.

The current controller 124 is an arithmetic circuit that calculates a control signal for controlling the operation of the inverter circuit 122 so that the current supplied to the coil 121 can be controlled by the inverter circuit 122. The current controller 124 is connected to the transport path communication subordinate station 11 and the current sensor 123 via an internal bus. The current controller 124 calculates the voltage value of the current to be supplied to the coil 121 based on the current command value included in the control data received by the transport path communication subordinate station 11 and the actual current value RA detected by the current sensor 123. The calculation of the voltage value by the current controller 124 may be performed using, for example, proportional-integral-differential (PID) control based on the deviation between the current command value and the actual current value RA. The current controller 124 generates a pulse-width-modulation (PWM) signal obtained by comparing the calculated voltage value with a triangular wave of the voltage value in the power supply line 70. The PWM signal is a control signal for controlling the operation of the inverter circuit 122. The current controller 124 outputs the control signal to the inverter circuit 122 via an internal bus.

The scale 13 outputs a detection signal for obtaining the position of the moving body 20 in the transport path unit 10. The scale 13 is disposed along the X-axis direction in the transport path unit 10, and includes a plurality of position sensors 131 that detect the position detection magnet group 23 or the mover magnet group 22 provided in the moving body 20. In the following description, a configuration in which the moving body 20 includes the position detection magnet group 23 will be described. However, if the moving body 20 does not include the position detection magnet group 23, the position detection magnet group 23 can be replaced with the mover magnet group 22.

The position sensor 131 is a sensor capable of detecting a magnetic field generated from the position detection magnet group 23, and for example, a Hall sensor or a magnetoresistive sensor can be adopted. The plurality of position sensors 131 are disposed on the scale 13 at positions facing the position detection magnet group 23 provided on the moving body 20 and along the transport route constituted by the transport path unit 10. FIG. 2 illustrates a form in which nine position sensors 131 are disposed along the X-axis direction on the scale 13 in one transport path unit 10. However, a desired number of position sensors 131 may be disposed on the scale 13 in one transport path unit 10 according to conditions such as the length of the transport route of one transport path unit 10, the size of the moving body 20, and the detection frequency of the moving body 20.

For example, when a Hall sensor is used as the position sensor 131, one Hall sensor including two Hall elements disposed at an interval of half the magnetization pitch of the position detection magnet group 23 can be adopted. The magnetization pitch is a distance from one end of one N-pole magnet (or S-pole magnet) to one end of an adjacent S-pole magnet (or N-pole magnet) on a side opposite to the one end in a direction in which the N-pole magnets and the S-pole magnets of the position detection magnet group 23 are arrayed. That is, the magnetization pitch in the position detection magnet group 23 illustrated in FIG. 2 is the length of one N-pole magnet or the length of one S-pole magnet in the X-axis direction. The scale 13 including such a Hall sensor as the position sensor 131 outputs, as a detection signal, a SIN wave corresponding to the N-pole magnet of the position detection magnet group 23 and a COS wave corresponding to the S-pole magnet when the moving body 20 passes through one position sensor 131 of the scale 13. Then, the SIN wave and the COS wave output from the scale 13 are detected by an analog-to-digital converter (AD) (not illustrated) and acquired by the position calculator 14 described later. The scale 13 is an example of a position detector.

The position calculator 14 is an arithmetic circuit that calculates scale detection information based on a detection signal output from the position sensor 131. The position calculator 14 is connected to the transport path communication subordinate station 11 via an internal bus. When the detection signal output from the scale 13 is a SIN wave and a COS wave, the position calculator 14 acquires the SIN wave and the COS wave through an AD converter (not illustrated), and performs arc tangent function (ARCTAN) calculation based on the acquired SIN wave and COS wave. Consequently, the position calculator 14 can calculate the relative position of the moving body 20 with respect to the position sensor 131 of the scale 13 as scale detection information. Then, the position calculator 14 outputs the scale detection information to the transport path communication subordinate station 11. The scale detection information is an example of control data transmitted by the transport path communication subordinate station 11.

Figure 3:
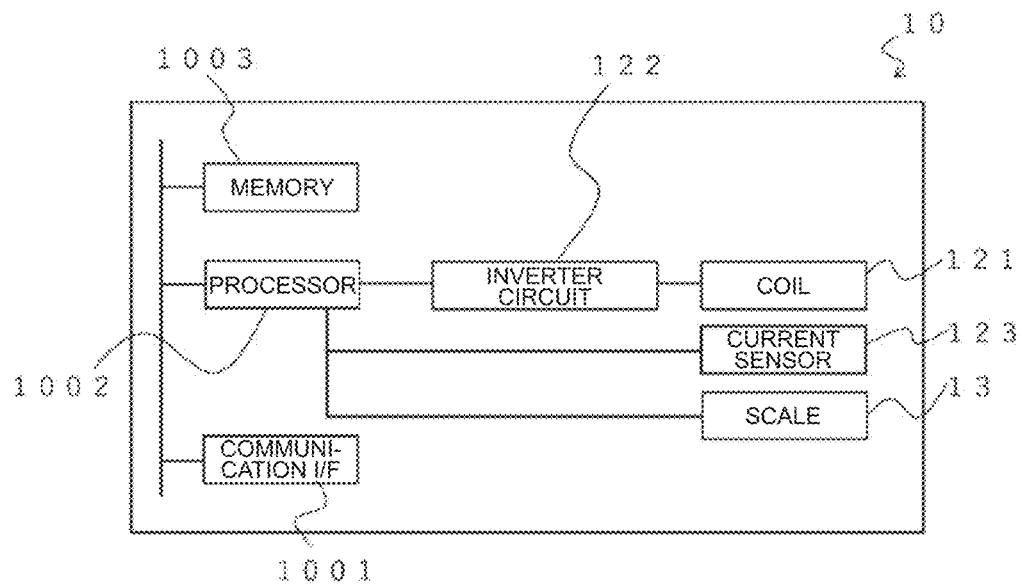
FIG. 3 is a diagram illustrating an exemplary hardware configuration of the transport path unit according to the first embodiment.

FIG. 3 is a diagram illustrating an exemplary hardware configuration of the transport path unit according to the first embodiment. The hardware of the transport path unit 10 includes a communication interface (communication I/F) 1001 that functions as the transport path communication subordinate station 11, a processor 1002 that functions as the current controller 124 and the position calculator 14, a memory 1003 that reads and writes various data used for each calculation in the processor 1002, and the coil 121, the inverter circuit 122, the current sensor 123, and the scale 13 described above.

The processor 1002 is the processor 1002 that can calculate a control signal as the current controller 124 and calculate scale detection information as the position calculator 14, and for example, a microprocessor, a microcontroller, a microcomputer, a central processing unit (CPU), a digital signal processor (DSP), or the like can be adopted. The memory 1003 includes a nonvolatile memory that stores each calculation program that is executed by the processor 1002 and a volatile memory that serves as a work memory at the time of each calculation in the processor 1002. FIG. 3 illustrates an example in which the hardware configuration of the transport path unit 10 includes one processor 1002, but a plurality of processors such as a processor functioning as the current controller 124 and a processor functioning as the position calculator 14 may be included. In addition, the hardware configuration of the transport path unit 10 may include a processor functioning as the current controller 124 as a plurality of processors.

Figure 4:
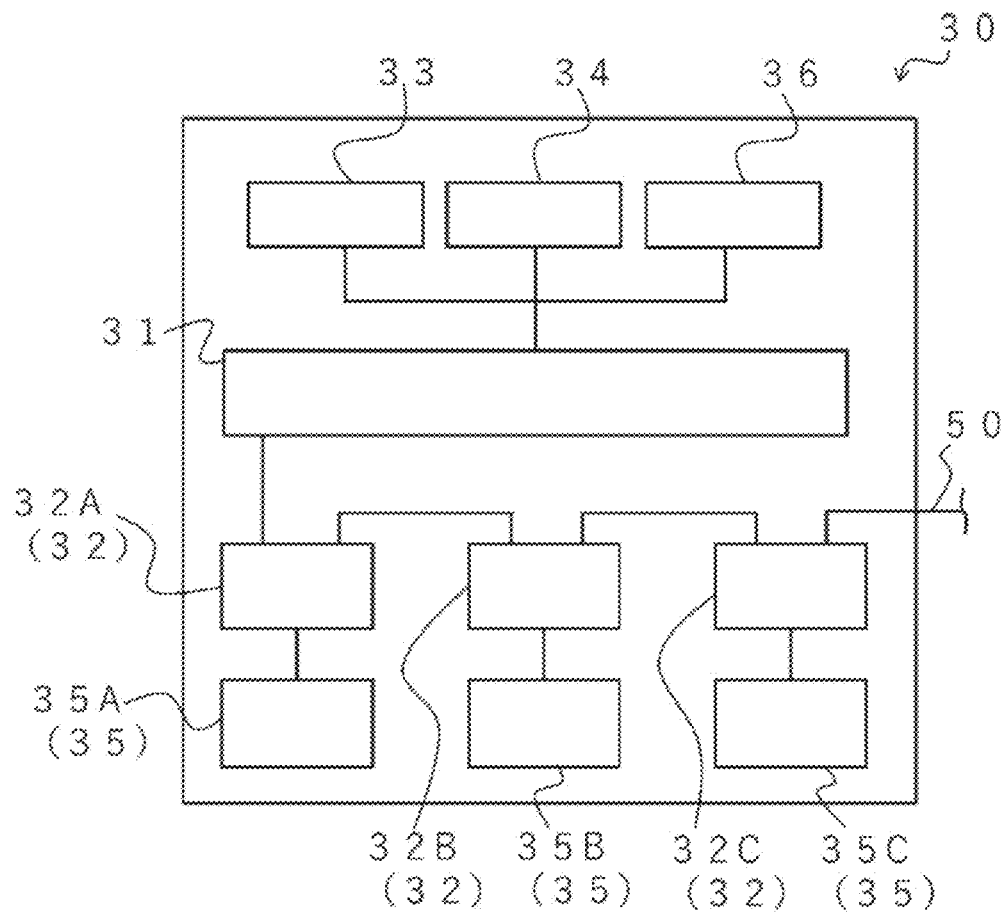
FIG. 4 is a diagram illustrating an exemplary configuration of the control controller according to the first embodiment.

FIG. 4 is a diagram illustrating an exemplary configuration of the control controller according to the first embodiment. As illustrated in FIG. 4, the control controller 30 includes a communication master station 31 that transmits and receives various command values and information for generating control data transmitted from the control controller 30 to and from a communication subordinate station 32, the communication subordinate station 32 that transmits and receives various command values and information for generating control data transmitted from the control controller 30 to and from the communication master station 31, a position command generator 33 that generates a position command value of the moving body 20, a position generator 34 that generates position information on the moving body 20 on the transport route of the transport system 1 based on the scale detection information received from the transport path unit 10, a position controller 35 that generates a drive command value of the moving body 20 based on the position command value of the moving body 20 and the position information on the moving body 20, and a current command generator 36 that generates current command values of all the transport path units 10 on the transport route of the transport system 1 based on the drive command value of the moving body 20 and the position information on the moving body 20. Hereinafter, various command values and information for generating control data may be referred to as generation data.

The communication master station 31 is an interface for transmitting and receiving generation data including various command values and information to and from the communication subordinate station 32 to be described later, and transmitting and receiving control data to and from the transport path communication subordinate station 11 included in the transport path unit 10. The communication master station 31 is communicably connected to the communication subordinate station 32 via an internal bus in the control controller 30, and is configured to transmit and receive generation data including various command values and information to and from the communication subordinate station 32 at a constant communication cycle. In addition, the communication master station 31 is configured to be able to perform one-to-many communication with the communication subordinate station 32 and the transport path communication subordinate station 11.

Furthermore, the communication master station 31 is connected to the position command generator 33, the position generator 34, and the current command generator 36, which will be described later, via an internal bus in the control controller 30, and is configured to be able to transfer generation data including various command values and information to and from the position command generator 33, the position generator 34, and the current command generator 36. Note that a specific description of connection between the communication master station 31, the communication subordinate station 32, and the transport path communication subordinate station 11 of the transport path unit 10, and a specific description of communication control related to transmission and reception with the communication subordinate station 32 performed by the communication master station 31 and transmission and reception with the transport path communication subordinate station 11 included in the transport path unit 10 will be given later.

The communication subordinate station 32 is an interface for transmitting and receiving generation data including various command values and information to and from the communication master station 31, and transmitting and receiving control data to and from the transport path communication subordinate station 11 included in the transport path unit 10. The communication subordinate station 32 is communicably connected to the communication master station 31 via an internal bus in the control controller 30. In the first embodiment, the communication subordinate station 32 includes three communication subordinate stations 32A, 32B, and 32C as illustrated in FIG. 4. The communication subordinate stations 32A, 32B, and 32C may be simply referred to as the communication subordinate station 32 in a case where it is not necessary to distinguish therebetween.

The communication subordinate station 32 is connected to the position controller 35 to be described later via an internal bus in the control controller 30, and is configured to be able to transfer various command values and information to and from the position controller 35. As illustrated in FIG. 4, the control controller 30 according to the first embodiment includes three position controllers 35A, 35B, and 35C. The communication subordinate station 32A is connected to the position controller 35A via an internal bus, the communication subordinate station 32B is connected to the position controller 35B via an internal bus, and the communication subordinate station 32C is connected to the position controller 35C via an internal bus. That is, the number of communication subordinate stations 32 is the same as the number of position controllers 35 so that the communication subordinate stations 32 can perform one-to-one communication with the position controllers 35. Note that a specific description of the position controllers 35A, 35B, and 35C will be given later.

The position command generator 33 is an arithmetic circuit that generates a position command value of the moving body 20. When the transport system 1 includes three moving bodies 20A, 20B, and 20C as illustrated in FIG. 1, the position command generator 33 generates a position command value of the moving body 20A, a position command value of the moving body 20B, and a position command value of the moving body 20C. That is, the position command generator 33 generates a position command value of the moving body 20, which is a position command value for each moving body 20 included in the transport system 1. The position command value is, for example, a command value indicating a target position of the moving body 20 on the transport route. The position command generator 33 outputs the generated position command value to the communication master station 31. The position command value is an example of various command values for generating control data, and is generation data.

When generating the position command value, the position command generator 33 can generate the position command of each moving body 20 based on the position command generation program stored in the memory of the control controller 30. When generating the position command value, the position command generator 33 may generate the position command value of each moving body 20 based on external information such as a command from a programmable logic controller (PLC) (not illustrated) connected to the control controller 30, an operator command from a human machine interface (HMI), and the like.

The position generator 34 is an arithmetic circuit that generates position information on the moving body 20 on the transport route of the transport system 1 based on the scale detection information received from the transport path unit 10. The position generator 34 calculates the position information on the moving body 20 on the transport route based on the scale detection information included in the control data received from all the transport path units 10 constituting the transport route.

As illustrated in FIG. 1, in a case where the movement route of the transport system 1 includes the transport path units 10A to 10H, and the transport route includes three moving bodies 20A, 20B, and 20C, the position generator 34 calculates and generates position information on the moving body 20A, position information on the moving body 20B, and position information on the moving body 20C, which are information indicating a position where each of the moving bodies 20A, 20B, and 20C exists on the transport route, based on the scale detection information included in all the control data received from the transport path units 10A to 10H. That is, the position generator 34 generates the position information on the moving body 20, which is the position information for each moving body 20 included in the transport system 1. The position information on the moving body 20 is information indicating the position of the moving body 20 on the transport route of the transport system 1 as an absolute position. The position generator 34 outputs the generated position information on the moving body 20 to the communication master station 31. Note that the position information on the moving body 20 is an example of information for generating control data, and is generation data.

The generation of the position information on the moving body 20 by the position generator 34 may be, for example, a calculation of adding all the received scale detection information with an adder, or a calculation of storing in advance a recording table in which the number of transport path units 10 constituting the transport route and identification information are recorded in the memory of the control controller 30 and collating all the received scale detection information with the recording table, and various calculation methods can be adopted.

The position controller 35 is an arithmetic circuit that generates a drive command value of the moving body 20 based on the position command value of the moving body 20 generated by the position command generator 33 and the position information on the moving body 20 generated by the position generator 34. In the first embodiment, the position controller 35 includes three position controllers 35A, 35B, and 35C as illustrated in FIG. 4. These position controllers 35A, 35B, and 35C may be simply referred to as the position controller 35 in a case where it is not necessary to distinguish therebetween. The position controller 35 is allocated to the moving body 20 provided in the transport system 1, and is configured to generate a drive command value of the allocated moving body 20.

The first embodiment describes an example of a form in which the transport system 1 includes the three moving bodies 20A, 20B, and 20C, and one position controller 35 is allocated to one moving body 20. Specifically, the position controller 35A is allocated to generate a drive command value of the moving body 20A, the position controller 35B is allocated to generate a drive command value of the moving body 20B, and the position controller 35C is allocated to generate a drive command value of the moving body 20C. Then, the position controller 35A outputs the generated drive command value of the moving body 20A to the communication subordinate station 32A, the position controller 35B outputs the generated drive command value of the moving body 20B to the communication subordinate station 32B, and the position controller 35C outputs the generated drive command value of the moving body 20C to the communication subordinate station 32C. The drive command value of the moving body 20 is an example of various command values for generating control data, and is generation data.

Note that the number of moving bodies 20 to be allocated to the position controllers 35 can be freely determined, and can be set before the transport system 1 is operated. As illustrated in FIG. 1, in a case where the transport system 1 includes the three moving bodies 20A, 20B, and 20C, for example, all of the three moving bodies 20A, 20B, and 20C may be allocated to one position controller 35. In addition, for example, in a case where the transport system 1 includes nine moving bodies, the control controller 30 may include nine position controllers 35 and allocate one moving body to one position controller 35 to allocate the nine moving bodies to the nine position controllers 35, the control controller 30 may include three position controllers 35 and allocate three moving bodies to one position controller 35 to allocate the nine moving bodies to the three position controllers 35, or the control controller 30 may include one position controller 35 and allocate nine moving bodies to one position controller 35 to allocate the nine moving bodies to one position controller 35. That is, the position controller 35 can be provided as many as the number of moving bodies 20 provided in the transport system 1 at a maximum as the entire transport system 1.

In one method of generating a drive command value of the moving body 20 by the position controller 35, a position deviation is calculated from a position command value of a predetermined moving body 20 and position information on the predetermined moving body 20 based on the position command value of the moving body 20 generated by the position command generator 33 and the position information on the moving body 20 generated by the position generator 34, and a speed command value of the predetermined moving body 20 is generated through calculation of proportional-integral-differential (PID) control using the calculated position deviation. The speed command value is a value obtained by calculating the speed given to the moving body 20 from the position deviation. The speed command value of the moving body 20 is an example of a drive command value.

One method of generating the drive command value of the moving body 20 by the position controller 35 will be specifically described by the use of the moving body 20A as an example. The position controller 35A allocated to the moving body 20A calculates a position deviation based on the position command value of the moving body 20A generated by the position command generator 33 and the position information on the moving body 20 generated by the position generator 34, and performs PID control calculation using the position deviation to generate a speed command value of the moving body 20A. As for the moving bodies 20B and 20C, the allocated position controllers 35B and 35C generate the speed command values of the moving bodies 20B and 20C similarly from the position command values and the position information.

In another method of generating the drive command value of the moving body 20 by the position controller 35, the speed command value of the predetermined moving body 20 is generated as described above, and the speed of the predetermined moving body 20 is calculated by differentially calculating the position information on the predetermined moving body 20. In this method, the speed deviation is calculated from the speed command value of the predetermined moving body 20 and the speed of the predetermined moving body 20, and the thrust command value of the predetermined moving body 20 is generated through calculation of proportional-integral-differential (PID) control using the calculated speed deviation. The thrust command value is a value obtained by calculating the speed to be given to the moving body 20 from the speed deviation. The generation of the drive command value of the moving body 20 by this different method is to generate the drive command value based on the position command value of the moving body 20 generated by the position command generator 33 and the position information on the moving body 20 generated by the position generator 34, and is to generate the drive command value based on the position command value of the moving body 20 generated by the position command generator 33 and the position information on the moving body 20 generated by the position generator 34. The thrust command value of the moving body 20 is an example of a drive command value.

Another method of generating the drive command value of the moving body 20 by the position controller 35 will be specifically described with the moving body 20A as an example. The position controller 35A allocated to the moving body 20A generates the speed command value of the moving body 20A as described above, differentially calculates the position information on the moving body 20, and calculates the speed of the moving body 20A. In this method, the speed deviation is calculated from the speed command value of the moving body 20A and the speed of the moving body 20A, and the thrust command value of the moving body 20A is generated through calculation of the PID control using the calculated speed deviation. As for the moving bodies 20B and 20C, the allocated position controllers 35B and 35C generate the thrust command values of the moving bodies 20B and 20C similarly from the position command values and the position information.

The position controller 35 generates either the speed command value of the moving body 20 or the thrust command value of the moving body 20, and outputs either the speed command value of the moving body 20 or the thrust command value of the moving body 20 to the communication subordinate station 32 as a drive command value of the moving body 20.

The current command generator 36 is an arithmetic circuit that generates current command values of all the transport path units 10 on the transport route of the transport system 1 based on the drive command value of the moving body 20 and the position information on the moving body 20. That is, the current command generator 36 generates current command values regarding the plurality of transport path units 10 as one control target. The current command value is a command value indicating the magnitude of the current to be supplied to the coil 121 included in each drive element 12 provided in the transport path unit 10. The current command generator 36 generates a current command value based on the drive command value of the moving body 20 and the position information on the moving body 20. When the drive command value of the moving body 20 is a speed command value, the current command generator 36 generates the current command value that is a command value indicating the magnitude of the current to be supplied to the coil 121 for giving the speed specified by the speed command value to the moving body 20 as a driving force. On the other hand, when the drive command value of the moving body 20 is a thrust command value, the current command generator 36 generates a command value indicating the magnitude of the current to be supplied to the coil 121 for giving the speed specified by the thrust command value to the moving body 20 as a driving force. The current command generator 36 generates current command values for all the transport path units 10 on the transport route of the transport system 1.

When generating the current command value, the current command generator 36 calculates and generates the current command values for all the coils 121 included in all the transport path units 10 using an arithmetic expression stored in the memory of the control controller 30. Specifically, in a case where eight transport path units 10 are included as in the transport system 1 illustrated in FIG. 1, and one transport path unit 10 includes nine coils 121 as illustrated in FIG. 2, the current command generator 36 generates current command values for the 72 coils 121. Note that the arithmetic expression used here only needs to be an arithmetic expression that converts the speed of the moving body 20 indicated by the speed command value or the thrust command value that is a drive command value into the magnitude of the current to be supplied to the coil 121, and an arithmetic expression used for known motor control can be adopted.

The current command generator 36 outputs all the generated current command values to the communication master station 31. The communication master station 31 that has acquired the current command values transmits the current command values toward the transport path communication subordinate stations 11 of the transport path units 10. The current command value is an example of control data transmitted by the control controller 30.

Here, connection between the communication master station 31, the communication subordinate station 32, and the transport path communication subordinate station 11 of the transport path unit 10 in the control controller 30 according to the first embodiment will be described. As illustrated in FIG. 4, the communication master station 31 is connected to the communication subordinate station 32A via an internal bus. The communication subordinate station 32A is connected to the communication subordinate station 32B via an internal bus. The communication subordinate station 32B is connected to the communication subordinate station 32C via an internal bus. That is, the communication master station 31 and the communication subordinate stations 32A, 32B, and 32C are connected by a daisy chain, and generation data including various command values and information for generating control data can be transmitted and received between the communication master station 31 and the communication subordinate station 32. By adopting such a daisy chain, serial communication can be adopted for transmission and reception of various command values and information between the communication master station 31 and the communication subordinate station 32, and an increase in internal buses can be reduced or prevented.

Then, in the configuration in which the communication master station 31 and the communication subordinate station 32 are connected by a daisy chain as illustrated in FIG. 4, the communication master station 31 transmits and receives generation data to and from the communication subordinate station 32A via an internal bus connecting the communication master station 31 and the communication subordinate station 32A. The communication master station 31 transmits and receives generation data to and from the communication subordinate station 32B via an internal bus connecting the communication master station 31 and the communication subordinate station 32A, the communication subordinate station 32A, and an internal bus connecting the communication subordinate station 32A and the communication subordinate station 32B. In other words, the communication subordinate station 32B performs transmission and reception with the communication master station 31 via the communication subordinate station 32A. The communication master station 31 transmits and receives generation data to and from the communication subordinate station 32C via an internal bus connecting the communication master station 31 and the communication subordinate station 32A, the communication subordinate station 32A, an internal bus connecting the communication subordinate station 32A and the communication subordinate station 32B, the communication subordinate station 32B, and an internal bus connecting the communication subordinate station 32B and the communication subordinate station 32C. In other words, the communication subordinate station 32C performs transmission and reception with the communication master station 31 via the communication subordinate station 32A and the communication subordinate station 32B. Even in such a configuration, it can be said that the communication master station 31 transmits and receives generation data to and from the communication subordinate stations 32A, 32B, and 32C. In addition, the communication master station 31 is configured to include two channels: a transmission channel and a reception channel.

As illustrated in FIG. 4, the communication subordinate station 32C is connected to the communication subordinate station 32B and is connected to the first communication line 50 connected to the transport path unit 10. Specifically, the communication subordinate station 32C included in the control controller 30 and the transport path communication subordinate station 11 included in the transport path unit 10 are connected via the first communication line 50, thereby forming a communication network for transmitting and receiving control data between the control controller 30 and the transport path unit 10. That is, the communication subordinate station 32 and the transport path communication subordinate station 11 are connected by a daisy chain, and control data can be transmitted and received between the communication master station 31 and the transport path communication subordinate station 11 via the communication subordinate station 32.

Note that the control controller 30 does not necessarily need to connect the communication subordinate station 32C and the first communication line 50, and only needs to be able to form a communication network for transmitting and receiving control data between the control controller 30 and the transport path unit 10. For example, the control controller 30 may form a communication network for transmitting and receiving control data between the control controller 30 and the transport path unit 10 by connecting the communication master station 31 and the transport path communication subordinate station 11 provided in the transport path unit 10 via the first communication line 50.

In addition, in the configuration in which the communication master station 31, the communication subordinate station 32, and the transport path communication subordinate station 11 are connected by a daisy chain as illustrated in FIG. 4, the communication master station 31 transmits and receives control data to and from the transport path communication subordinate station 11 of the transport path unit 10 via an internal bus connecting the communication master station 31 and the communication subordinate station 32A, the communication subordinate station 32A, an internal bus connecting the communication subordinate station 32A and the communication subordinate station 32B, the communication subordinate station 32B, an internal bus connecting the communication subordinate station 32B and the communication subordinate station 32C, the communication subordinate station 32C, and the first communication line 50. In other words, the communication master station 31 performs transmission and reception with the transport path communication subordinate station 11 of the transport path unit 10 via the first communication line 50. Even in such a configuration, it can be said that the control controller 30 transmits and receives control data to and from the transport path communication subordinate station 11 of the transport path unit 10. By adopting such a daisy chain, serial communication can be adopted for transmission and reception of control data between the communication master station 31 and the transport path communication subordinate station 11, and an increase in communication lines can be reduced or prevented.

Figure 5:
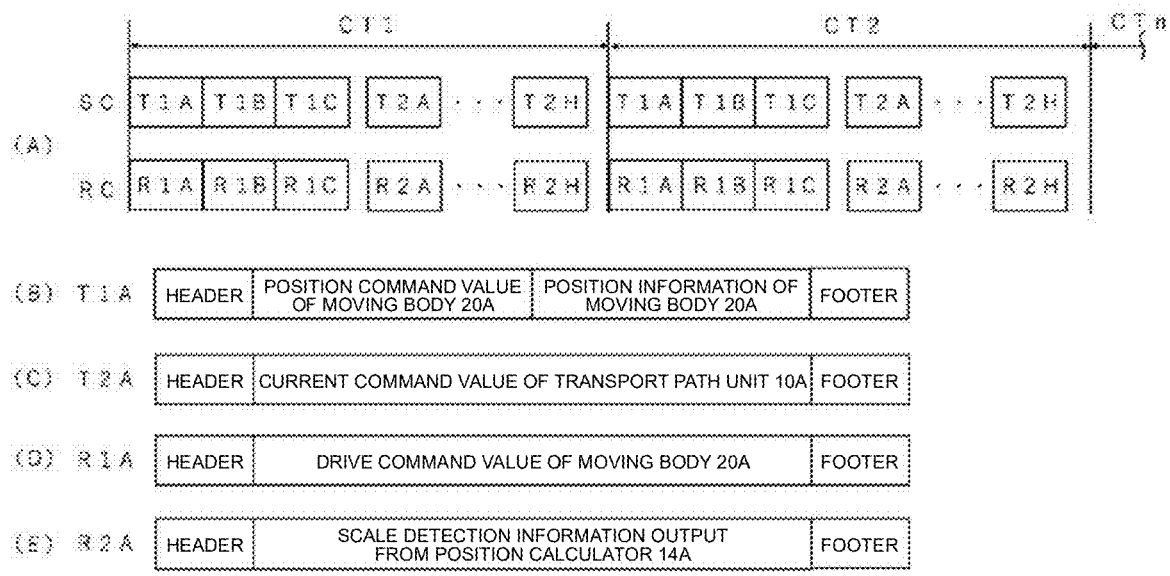
FIG. 5 is a diagram illustrating an example of communication control in the communication master station according to the first embodiment.

FIG. 5 is a diagram illustrating an example of communication control in the communication master station according to the first embodiment. Communication control of the communication master station 31 regarding transmission and reception with the communication subordinate station 32 performed by the communication master station 31 and transmission and reception with the transport path communication subordinate station 11 included in the transport path unit 10 performed by the communication master station 31 will be specifically described with reference to FIG. 5.

The communication master station 31 is configured to transmit generation data toward the communication subordinate station 32. As an example, the communication master station 31 is configured to designate a desired communication subordinate station 32 for the plurality of communication subordinate stations 32A to 32C as a communication destination, and transmit the generation data toward the designated communication subordinate station 32. The communication master station 31 is configured to transmit control data toward the transport path communication subordinate station 11. As an example, the communication master station 31 is configured to designate a desired transport path communication subordinate station 11 for the plurality of transport path communication subordinate stations 11A to 11H and transmit control data toward the designated transport path communication subordinate station 11. The communication master station 31 is configured to receive generation data from one or a plurality of communication subordinate stations 32. The communication master station 31 is configured to receive control data from the plurality of transport path communication subordinate stations 11. As illustrated in FIG. 5(A), the communication master station 31 transmits and receives generation data including various command values and information for generating control data to and from the communication subordinate station 32 and transmits and receives control data to and from the transport path communication subordinate station 11 using a transmission channel SC and a reception channel RC. The communication master station 31 performs communication control so as to transmit and receive each communication frame to and from the communication subordinate station 32 and the transport path communication subordinate station 11 once within a predetermined constant communication cycle CTn (n is a natural number).

Specifically, as illustrated in FIG. 5(A), within the communication cycle CT1 using the transmission channel SC, the communication master station 31 designates the communication subordinate station 32A and transmits a communication frame T1A toward the communication subordinate station 32A, designates the communication subordinate station 32B and transmits a communication frame T1B toward the communication subordinate station 32B, and designates the communication subordinate station 32C and transmits a communication frame T1C toward the communication subordinate station 32C. The transmission of these communication frames T1A, T1B, and T1C is an example of a first communication. When the communication master station 31 transmits the communication frames T1A, T1B, and T1C toward the communication subordinate stations 32A to 32C, if it is not necessary to designate the communication subordinate stations 32A to 32C, the communication master station 31 may not designate the communication subordinate stations 32A to 32C. Examples of cases where the communication master station 31 does not need to designate the communication subordinate station 32 include a case where only one communication subordinate station 32 is provided in the transport system 1, a case where the communication subordinate station 32 of the transmission destination is determined in advance in the transport system 1, and the like. In addition, within the same communication cycle CT1 using the transmission channel SC, the communication master station 31 designates the transport path communication subordinate station 11A and transmits a communication frame T2A toward the transport path communication subordinate station 11A, designates the transport path communication subordinate station 11B and transmits a communication frame T2B toward the transport path communication subordinate station 11B, and similarly designates the transport path communication subordinate stations 11C to 11H and transmits communication frames T2C to T2H toward the transport path communication subordinate stations 11C to 11H. The transmission of these communication frames T2A to T2H is an example of a third communication. When the communication master station 31 transmits the communication frames T2A to T1H toward the transport path communication subordinate stations 11A to 11H, if it is not necessary to designate the transport path communication subordinate stations 11A to 11H, the communication master station 31 may not designate the transport path communication subordinate stations 11A to 11H. Examples of cases where the communication master station 31 does not need to designate the transport path communication subordinate station 11 include a case where only one transport path communication subordinate station 11 is provided in the transport system 1, a case where the transport path communication subordinate station 11 of the transmission destination is determined in advance in the transport system 1, and the like. The communication master station 31 performs control to divide the communication cycle CT1 into time slots and transmit each communication frame in a time division manner.

As illustrated in FIG. 5(A), within the communication cycle CT1 using the reception channel RC, the communication master station 31 receives a communication frame R1A from the communication subordinate station 32A, receives a communication frame R1B from the communication subordinate station 32B, and receives a communication frame R1C from the communication subordinate station 32C. In other words, the communication subordinate station 32A transmits the communication frame R1A toward the communication master station 31, the communication subordinate station 32B transmits the communication frame R1B toward the communication master station 31, and the communication subordinate station 32C transmits the communication frame R1C toward the communication master station 31. The transmission of these communication frames R1A, R1B, and R1C is an example of a second communication.

Further, as illustrated in FIG. 5(A), in the same communication cycle CT1 using the reception channel RC, the communication master station 31 receives a communication frame R2A from the transport path communication subordinate station 11A, receives a communication frame R2B from the transport path communication subordinate station 11B, and similarly receives communication frames R2C to R2H from the transport path communication subordinate stations 11C to 11H. In other words, the transport path communication subordinate station 11A transmits the communication frame R2A toward the communication master station 31, the transport path communication subordinate station 11B transmits the communication frame R2B toward the communication master station 31, and similarly, the transport path communication subordinate stations 11C to 11H transmit the communication frames R2C to R2H toward the communication master station 31. The transmission of these communication frames R2A to R2H is an example of a sixth communication. The communication master station 31 performs control to divide the communication cycle CT1 into time slots and receive each communication frame in a time division manner.

As illustrated in FIG. 5(B), the communication frame T1A transmitted from the communication master station 31 toward the communication subordinate station 32A includes a header, a footer, and a payload. The communication frame T1A is a communication frame for designating the communication subordinate station 32A and transmitting the generation data toward the communication subordinate station 32A. In the communication frame T1A, designation information (destination address, etc.) of the communication subordinate station 32A is attached as a header, and the communication subordinate station 32A is designated by the information on the header. The payload includes a position command value of the moving body 20A and position information on the moving body 20A. In the footer, frame check sequence data and the like are attached for confirming that the communication frame has been accurately received at the reception destination. The communication frames T1B and T1C (not illustrated) are communication frames for designating the communication subordinate stations 32B and 32C and transmitting the generation data toward the communication subordinate stations 32B and 32C, have designation information on the communication subordinate stations 32B and 32C attached as a header, and include position command values of the moving bodies 20B and 20C and position information on the moving bodies 20B and 20C as payloads. Frame check sequence data and the like are attached to the footer. Consequently, the communication master station 31 can designate a desired communication subordinate station 32 as a communication destination and transmit the generation data toward the designated communication subordinate station 32.

Next, as illustrated in FIG. 5(C), the communication frame T2A transmitted by the communication master station 31 toward the transport path communication subordinate station 11A includes a header, a footer, and a payload. The communication frame T2A is a communication frame for designating the transport path communication subordinate station 11A and transmitting the control data toward the transport path communication subordinate station 11A. In the communication frame T2A, designation information (destination address, etc.) of the transport path communication subordinate station 11A is attached as a header, and the transport path communication subordinate station 11A is designated by the information on the header. The payload includes current command values for controlling energization or de-energization for all the coils 121A included in the transport path unit 10A including the transport path communication subordinate station 11A. In the footer, frame check sequence data and the like are attached for confirming that the communication frame has been accurately received at the reception destination. The communication frames T2B to T2H (not illustrated) are communication frames for designating the transport path communication subordinate stations 11B to 11H and transmitting current command values for controlling energization or non-energization for all the coils 121B to 121H respectively included in the transport path units 10B to 10H including the transport path communication subordinate stations 11B to 11H toward the transport path communication subordinate stations 11B to 11H. In the communication frames T2B to T2H, designation information on the transport path communication subordinate stations 11B to 11H is attached as a header, and the transport path communication subordinate stations 11B to 11H are designated by the information on the header. The payload includes current command values for controlling energization or de-energization for all the coils 121B to 121H respectively included in the transport path units 10B to 10H including the transport path communication subordinate stations 11B to 11H. Frame check sequence data and the like are attached to the footer. Consequently, the communication master station 31 can transmit the control data toward the desired transport path communication subordinate station 11.

As illustrated in FIG. 5(D), the communication frame R1A received by the communication master station 31 from the communication subordinate station 32A includes a header, a footer, and a payload. The communication frame R1A is a communication frame for transmitting the generation data from the communication subordinate station 32A toward the communication master station 31. The communication frame R1A has designation information (destination address, etc.) of the communication master station 31 attached as a header, and includes a drive command value of the moving body 20A as a payload. In the footer, frame check sequence data and the like are attached for confirming that the communication frame has been accurately received at the reception destination. The communication frames R1B and R1C (not illustrated) are communication frames for the communication master station 31 to receive the generation data from the communication subordinate stations 32B and 32C, respectively, and are communication frames transmitted from the communication subordinate stations 32B and 32C toward the communication master station 31. The communication frames R1B and R1C have designation information on the communication master station 31 attached as a header, and include drive command values of the moving bodies 20B and 20C, respectively, as payloads. Frame check sequence data and the like are attached to the footer. Consequently, each of the communication subordinate stations 32 can transmit the generation data toward the communication master station 31, and the communication master station 31 can receive the generation data from each of the communication subordinate stations 32.

Next, as illustrated in FIG. 5(E), the communication frame R2A received by the communication master station 31 from the transport path communication subordinate station 11A includes a header, a footer, and a payload. The communication frame R2A is a communication frame for transmitting control data from the transport path communication subordinate station 11A toward the communication master station 31. The communication frame R2A has designation information (destination address, etc.) of the communication master station 31 attached as a header, and includes, as a payload, scale detection information indicating relative positions of the moving body 20A with respect to all the position sensors 131A output by the position calculator 14A included in the transport path unit 10A including the transport path communication subordinate station 11A. In the footer, frame check sequence data and the like are attached for confirming that the communication frame has been accurately received at the reception destination. The communication frames R2B to R2H (not illustrated) are communication frames for transmitting, from the transport path communication subordinate stations 11B to 11H toward the communication master station 31, the scale detection information output by the position calculators 14B to 14H respectively included in the transport path units 10B to 10H including the transport path communication subordinate stations 11B to 11H. The communication frames R2B to R2H have designation information on the communication master station 31 attached as a header, and include scale detection information calculated by the position calculator 14B to scale detection information calculated by the position calculator 14H as payloads. Frame check sequence data and the like are attached to the footer. Consequently, each of the transport path communication subordinate stations 11 can transmit the control data toward the communication master station 31, and the communication master station 31 can receive the control data from each of the transport path communication subordinate stations 11.

Note that FIG. 5(A) illustrates an example in which the communication master station 31 performs communication control so as to transmit and receive each communication frame to and from the communication subordinate station 32 and the transport path communication subordinate station 11 once within the constant communication cycle CTn (n is a natural number), but it goes without saying that the communication control is not limited to such communication control. The communication master station 31 may change the communication cycle CTn for each type of communication frame, or may differentiate the communication cycle CTn for each type of frame. For example, in a case where the processing time for generating the position command value in the position command generator 33 is longer than other processing times, the communication master station 31 may perform the transmission of the communication frames T1A to T1C once in N communication cycles. In addition, for example, the communication master station 31 may perform the transmission of the communication frames T1A to T1C and the reception of the communication frames R1A to R1C in the same communication cycle CT1, and perform the transmission of the communication frames T2A to T2H and the reception of the communication frames R2A to R2H in the same communication cycle CT2. By performing such communication control, it is possible to effectively utilize a communication band and shorten one communication cycle, and thus, it is also possible to improve control performance of the moving body 20.

Figure 6:
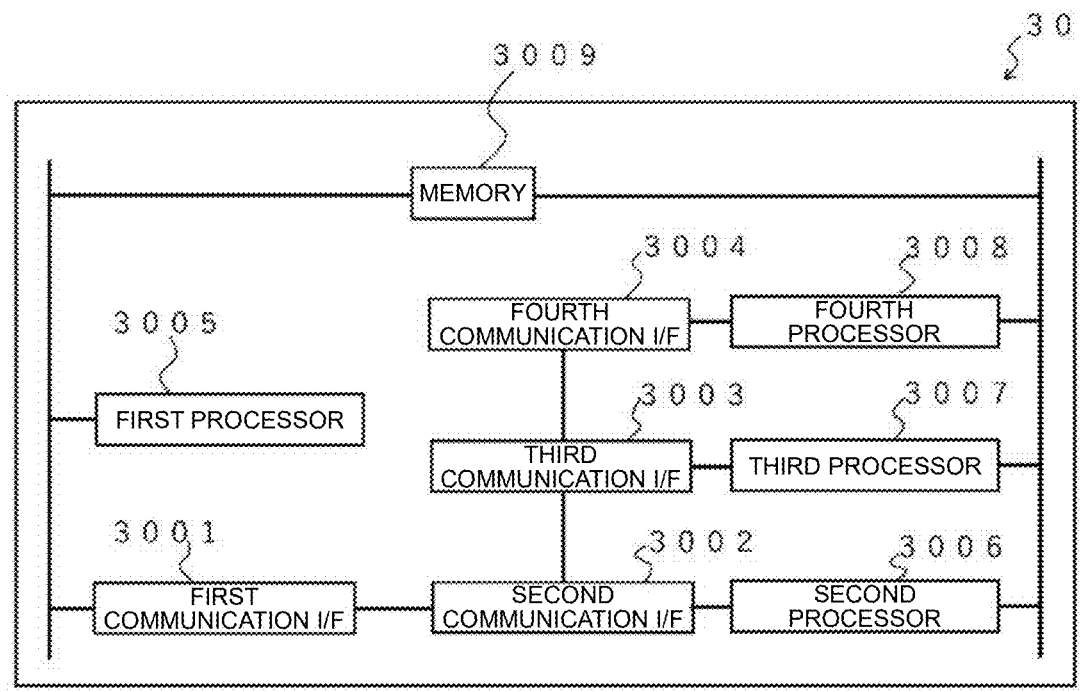
FIG. 6 is a diagram illustrating an exemplary hardware configuration of the control controller according to the first embodiment.

FIG. 6 is a diagram illustrating an exemplary hardware configuration of the control controller according to the first embodiment. The hardware of the control controller 30 includes a first communication interface (first communication I/F) 3001 that functions as the communication master station 31, a second communication interface (second communication I/F) 3002 that functions as the communication subordinate station 32A, a third communication interface (third communication I/F) 3003 that functions as the communication subordinate station 32B, a fourth communication interface (fourth communication I/F) 3004 that functions as the communication subordinate station 32C, a first processor 3005 that functions as the position command generator 33, the position generator 34, and the current command generator 36, a second processor 3006 that functions as the position controller 35A, a third processor 3007 that functions as the position controller 35B, a fourth processor 3008 that functions as the position controller 35C, and a memory 3009 that reads and writes various data used for each calculation in the first processor 3005 to the fourth processor 3008.

The first processor 3005 is a processor that can calculate a position command value, position information, and a current command value of the transport path unit 10 as the position command generator 33, the position generator 34, and the current command generator 36, and for example, a microprocessor, a microcontroller, a microcomputer, a central processing unit (CPU), a digital signal processor (DSP), or the like can be adopted. In addition, the second processor 3006 to the fourth processor 3008 are processors that can calculate drive command values as the position controllers 35A to 35C, and for example, a microprocessor, a microcontroller, a microcomputer, a central processing unit (CPU), a digital signal processor (DSP), or the like can be adopted. The memory 3009 includes a nonvolatile memory that stores calculation programs and the like that are executed by the first processor 3005 to the fourth processor 3008, and a volatile memory that serves as a work memory at the time of each calculation in the processor 1002.

In the hardware configuration of the control controller 30 in FIG. 6, the processor functioning as the position command generator 33, the position generator 34, and the current command generator 36 is illustrated as the first processor 3005 as an example. However, the hardware configuration may include a plurality of processors such as a processor functioning as the position command generator 33, a processor functioning as the position generator 34, and a processor functioning as the current command generator 36. In addition, in the hardware configuration of the control controller 30, three processors of the second processor 3006 to the fourth processor 3008 are illustrated as processors functioning as the position controllers 35A to 35C. However, for example, in a case where one position controller 35 is allocated to a plurality of moving bodies 20, one processor functioning as one position controller 35 may be included. Furthermore, in the hardware configuration of the control controller 30, one memory 3009 shared by the first processor 3005 to the fourth processor 3008 is illustrated. However, a plurality of memories may be included instead of one memory shared by the processors.

Figure 7:
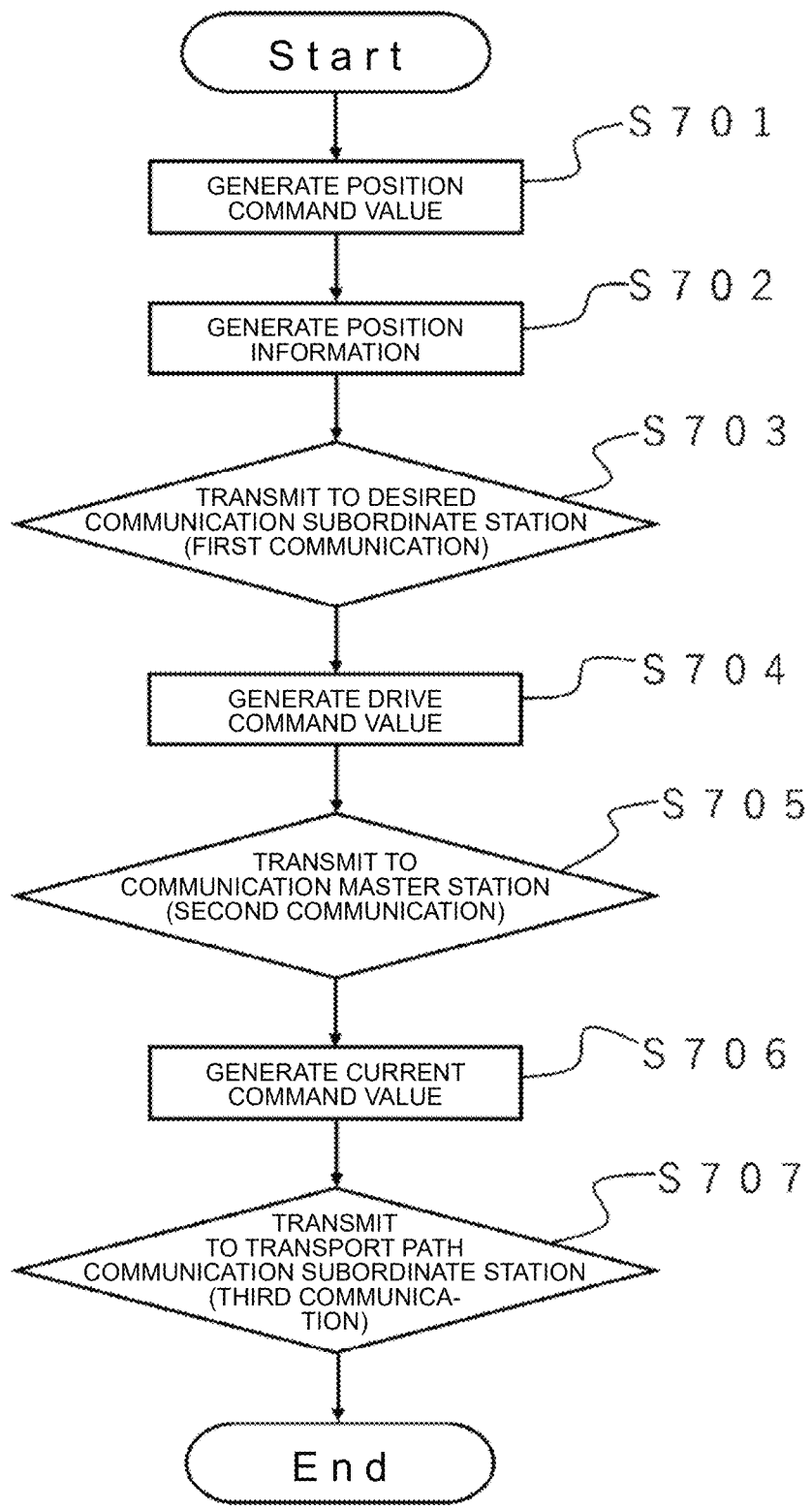
FIG. 7 is a flowchart illustrating an example of the operation of the control controller according to the first embodiment.
Figure 8:
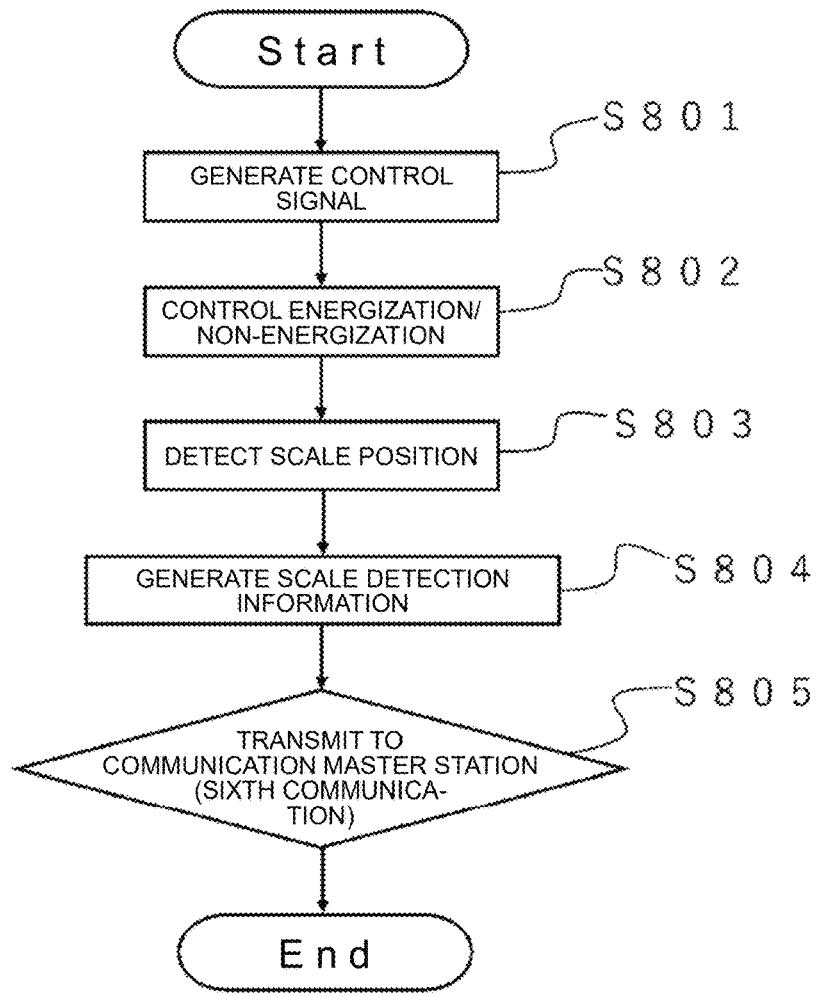
FIG. 8 is a flowchart illustrating an example of the operation of the transport path unit according to the first embodiment.

FIG. 7 is a flowchart illustrating an example of the operation of the control controller according to the first embodiment of the present disclosure. FIG. 8 is a flowchart illustrating an example of the operation of the transport path unit according to the first embodiment of the present disclosure. Control of the moving body 20 in the transport system 1 will be described with reference to FIGS. 7 and 8.

The control controller 30 executes each program stored in the memory 3009 with each processor of the control controller 30 to execute the functions of the position command generator 33, the position generator 34, the position controllers 35A to 35C, and the current command generator 36.

In step S701 illustrated in FIG. 7, the position command generator 33 of the control controller 30 generates the position command value of each of the three moving bodies 20A, 20B, and 20C included in the transport system 1. Then, the position command generator 33 outputs the generated position command value of each of the moving bodies 20A, 20B, and 20C to the communication master station 31 of the control controller 30.

In step S702, the position generator 34 of the control controller 30 generates the position information on each of the moving bodies 20A, 20B, and 20C indicating the positions of the moving bodies 20A, 20B, and 20C, respectively, on the transport route based on the scale detection information included in the control data received from the transport path units 10A to 10H using the communication frames R2A to R2H. Then, the position generator 34 outputs the generated position information on each of the moving bodies 20A, 20B, and 20C to the communication master station 31 of the control controller 30.

In step S703, the communication master station 31 of the control controller 30 performs the first communication of transmitting the acquired position command value and position information on each of the moving bodies 20A, 20B, and 20C toward the communication subordinate station 32. Specifically, the communication master station 31 transmits the position command value and the position information on the moving body 20A toward the communication subordinate station 32A using the communication frame T1A including a header, a footer, and a payload, transmits the position command value and the position information on the moving body 20B toward the communication subordinate station 32B using the communication frame T1B, and transmits the position command value and the position information on the moving body 20C toward the communication subordinate station 32C using the communication frame T1C.

In step S704, the position controllers 35A, 35B, and 35C of the control controller 30 respectively generate the drive command values of the moving bodies 20A, 20B, and 20C based on the position command values and the position information on the moving bodies 20A, 20B, and 20C received by the communication subordinate stations 32A, 32B, and 32C, respectively. Then, the position controllers 35A, 35B, and 35C output the generated drive command values of the moving bodies 20A, 20B, and 20C to the communication subordinate stations 32A, 32B, and 32C, respectively. Specifically, the position controller 35A acquires the position command value and the position information on the moving body 20A from the communication subordinate station 32A connected via the internal bus, generates the drive command value of the moving body 20A based on the position command value and the position information on the moving body 20A, and outputs the generated drive command value of the moving body 20A to the communication subordinate station 32A. Similarly, the position controllers 35B and 35C generate the drive command value of the moving body 20B and the drive command value of the moving body 20C, respectively, and output the drive command values to the communication subordinate stations 32B and 32C connected via the internal bus, respectively.

In step S705, the communication subordinate stations 32A, 32B, and 32C of the control controller 30 perform the second communication of transmitting the acquired drive command values of the moving bodies 20A, 20B, and 20C toward the communication master station 31. Specifically, the communication subordinate station 32A transmits the drive command value of the moving body 20 toward the communication master station 31 using the communication frame R1A including a header, a footer, and a payload. Similarly, the communication subordinate stations 32B and 32C transmit the drive command value of the moving body 20B and the drive command value of the moving body 20C toward the communication master station 31 using the communication frames R1B and R1C.

In step S706, the current command generator 36 of the control controller 30 generates the current command values of the transport path units 10A to 10H based on the position information on the moving bodies 20A, 20B, and 20C generated by the position generator 34 and the drive command values of the moving bodies 20A, 20B, and 20C received by the communication master station 31. Note that the position information on the moving bodies 20A, 20B, and 20C can be read and acquired from a memory included in the control controller 30. The current command generator 36 acquires the drive command value of the moving body 20A, the drive command value of the moving body 20B, and the drive command value of the moving body 20C from the communication master station 31 connected via the internal bus. Then, the current command generator 36 acquires the position information on the moving body 20A, the position information on the moving body 20B, and the position information on the moving body 20C from the memory of the control controller 30. The current command generator 36 generates current command values of the transport path units 10A to 10H based on the drive commands and the position information on the moving bodies 20A, 20B, and 20C, and outputs the current command values to the communication master station 31.

More specifically, the current command generator 36 generates current command values regarding the transport path units 10A to 10H as one control target. For example, with respect to the transport path units 10A to 10H in the transport system 1 illustrated in FIG. 1, when the moving body 20A is located on the transport path unit 10A, the moving body 20B is located across the transport path units 10C and 10D, and the moving body 20C is located across the transport path units 10E and 10F, the current command generator 36 generates, as the current command value of the transport path unit 10A, a current command value indicating the magnitude of the current to be supplied to the coil 121A included in the plurality of drive elements 12A of the transport path unit 10A based on the drive command and position information on the moving body 20A, and generates, as the current command values of the remaining transport path units 10 except the transport path unit 10A, current command values for making the magnitude of the current to be supplied to the coils 121 included in the plurality of drive elements 12 of the remaining transport path units 10 to 0 (zero). Similarly, the current command generator 36 generates, as the current command values of the transport path units 10C and 10D, current command values indicating the magnitude of the current to be supplied to the coils 121C and 121D included in the plurality of drive elements 12C and 12D of the transport path units 10C and 10D based on the drive command and position information on the moving body 20B, and generates, as the current command values of the remaining transport path units 10 except the transport path units 10C and 10D, current command values for making the magnitude of the current to be supplied to the coils 121 included in the plurality of drive elements 12 of the remaining transport path units 10 to 0 (zero).

Furthermore, similarly, the current command generator 36 generates, as the current command values of the transport path units 10E and 10F, a current command value indicating the magnitude of the current to be supplied to the coils 121E and 121F included in the plurality of drive elements 12E and 12F of the transport path units 10E and 10F based on the drive command and position information on the moving body 20C, and generates, as the current command values of the remaining transport path units 10 except the transport path units 10E and 10F, a current command value for making the magnitude of the current to be supplied to the coils 121 included in the plurality of drive elements 12 of the remaining transport path units 10 to 0 (zero). Then, the current command generator 36 merges all the current command values generated based on the drive command values and the position information on the moving bodies 20A, 20B, and 20C, and generates a current command value indicating the magnitude of the current to be supplied to the coil 121 included in each drive element 12 as the current command value of the transport path units 10A, 10C, 10D, 10E, and 10F, and a current command value for making the magnitude of the current to be supplied to the coil 121 included in each drive element 12 to 0 (zero) as the current command values of the transport path units 10B, 10G, and 10H, thereby generating the current command values of all the transport path units 10 on the transport route of the transport system 1.

In step S707, the communication master station 31 of the control controller 30 performs the third communication of transmitting the acquired current command value of each of the transport path units 10A to 10H toward the transport path communication subordinate station 11. Specifically, the communication master station 31 transmits the current command value of the transport path unit 10A toward the transport path communication subordinate station 11A using the communication frame T2A including a header, a footer, and a payload. Similarly, the communication master station 31 transmits the current command values of the transport path units 10B to 10H toward the transport path communication subordinate stations 11B to 11H using the communication frames T2B to T2H.

In step S801 illustrated in FIG. 8, each current controller 124 of the transport path unit 10 calculates a control signal for controlling the operation of the inverter circuit 122 based on the current command value received by the transport path communication subordinate station 11 and the actual current value RA detected by the current sensor 123 of the transport path unit 10, and outputs the calculated control signal to the inverter circuit 122. Specifically, the current controller 124A included in each drive element 12A of the transport path unit 10A acquires, via the internal bus, the actual current value RA detected by the current sensor 123A of the drive element 12A in which the current controller 124A is included, and acquires, from the current command value, a command value indicating the magnitude of the current to be supplied to the coil 121A of the drive element 12A in which the current controller 124A is included. Each current controller 124 calculates a control signal for controlling the operation of the inverter circuit 122 based on the command value indicating the magnitude of the current and the actual current value RA, and outputs the control signal to the inverter circuit 122A of the drive element 12A in which the current controller 124 is included. Similarly, the current controllers 124B to 124H of the transport path units 10B to 10H also output control signals to the inverter circuits 122B to 122H of the drive elements 12B to 12H in which the current controllers 124B to 124H are included.

In step S802, each inverter circuit 122 of the transport path unit 10 acquires the control signal output from the current controller 124 via the internal bus, and operates to supply a necessary current to the coil 121. Specifically, the inverter circuit 122A included in each drive element 12A of the transport path unit 10A acquires the control signal output from the current controller 124A via the internal bus, and operates to supply a necessary current from the power supply unit 40 to the coil 121A based on the control signal. That is, each inverter circuit 122A transforms the current from the power supply unit 40 according to the magnitude of the current indicated by the current command value included in the control data transmitted from the control controller 30, and energizes or de-energizes the coil 121A. Similarly, the inverter circuits 122B to 122H of the transport path units 10B to 10H operate to supply a necessary current from the power supply unit 40 to the coils 121B to 121H based on the control signal.

In the transport system 1, once the coil 121 of the transport path unit 10 is energized or de-energized according to the current command value in step S802, an electromagnetic field is generated in the energized coil 121. The moving body 20 obtains a driving force through interaction between the electromagnetic field generated by the coil 121 and the magnetic field generated by the mover magnet group 22, and moves along the transport route configured by the transport path unit 10.

In step S803, the scale 13 of each transport path unit 10 detects the moving body 20 using the position sensor 131 included in the scale 13 and outputs a detection signal. As described above, in a case where the position sensor 131 is a Hall element, the position sensor 131 outputs the waveform signal of the SIN wave and the COS wave as a detection signal once the moving body 20 passes through the Hall element. In addition, the Hall element through which the moving body 20 does not pass outputs the absence of a waveform signal as a detection signal. That is, all the scales 13 of the transport path units 10 output detection signals from all the position sensors 131 included in the scales 13. Specifically, the scale 13A of the transport path unit 10A outputs, as a detection signal, the waveform signal of the SIN wave and the COS wave from the position sensor 131A through which the moving body 20 has passed among the plurality of position sensors 131A included in the scale 13A, and outputs, as a detection signal, the absence of a waveform signal (for example, "0 (zero)") from the position sensor 131A through which the moving body 20 has not passed. Similarly, for the scales 13B to 13H of the transport path units 10B to 10H, the waveform signal of the SIN wave and the COS wave is output as a detection signal from the position sensors 131B to 131H through which the moving body 20 has passed among the plurality of position sensors 131B to 131H included in the scales 13B to 13H, respectively, and the absence of a waveform signal is output as a detection signal from the position sensors 131B to 131H through which the moving body 20 has not passed.

In step S804, the position calculator 14 of each transport path unit 10 acquires the detection signals via the internal bus, calculates scale detection information based on the detection signals, and outputs the scale detection information to the transport path communication subordinate station 11. The position calculator 14 calculates the relative position of the moving body 20 with respect to the position sensors 131 of the scale 13 as scale detection information based on the detection signals of all the position sensors 131 output from the scale 13 of the transport path unit 10 in which the position calculator 14 is included. Specifically, the position calculator 14A of the transport path unit 10A calculates the relative position of the moving body 20 with respect to the position sensors 131A of the scale 13A as scale detection information based on the detection signals of all the position sensors 131A output from the scale 13A. In a case where the moving body 20 has not passed on the transport path unit 10A, the position calculator 14A calculates information indicating that the moving body 20 has not passed through any of the position sensors 131A as scale detection information indicating the relative position of the moving body 20 with respect to the position sensor 131 of the scale 13A. In such a case, for example, information indicating 0 (zero) or information on a freely determined word can be adopted as the scale information. The position calculator 14A outputs the calculated scale detection information to the transport path communication subordinate station 11A. In addition, the position calculators 14B to 14H of the respective transport path units 10B to 10H similarly calculate scale detection information based on the detection signals output from the position sensors 131B to 131H included in the scales 13B to 13H of the transport path units 10B to 10H in which the position calculators 14B to 14H are included, and output the scale detection information to the transport path communication subordinate stations 11B to 11H, respectively.

In step S805, the transport path communication subordinate station 11 of each transport path unit 10 performs the sixth communication of transmitting the acquired scale detection information toward the communication master station 31. Specifically, the transport path communication subordinate station 11A transmits the scale detection information calculated by the position calculator 14A of the transport path unit 10A toward the communication master station 31 of the control controller 30 using the communication frame R2A including a header, a footer, and a payload. Similarly, the transport path communication subordinate stations 11B to 11H of the transport path units 10B to 10H sequentially transmit the scale detection information calculated by the position calculators 14B to 14H of the transport path units 10B to 10H toward the communication master station 31 of the control controller 30 using the communication frames R2B to R2H.

As described above, in the transport system 1 according to the first embodiment, the position controller 35 is provided in the control controller 30, and the position controller 35 of the control controller 30 is allocated to all the moving bodies 20 moving in the transport system 1. Further, the position controller 35 is connected to the communication subordinate station 32. The communication master station 31 of the control controller 30 is configured to transmit and receive generation data to and from the communication subordinate station 32. Consequently, the current command generator 36 of the control controller 30 can generate a current command value for applying the driving force to all the moving bodies 20 moving in the transport system 1 based on the generation data, and can generate current command values for all the transport path units 10. Therefore, in the transport system 1 according to the first embodiment, since the current command values for all the transport path units 10 can be generated by the current command generator 36, even when the moving body 20 moving in the transport system 1 is located at the boundary between the transport path units 10, the movement of the moving body 20 can be controlled with high accuracy, and an increase in the cost of the electric circuits such as the inverter circuit 122 included in one drive element can be reduced or prevented.

Furthermore, the transport system 1 according to the first embodiment is configured such that, as described above, the position controller 35 is provided in the control controller 30, all the moving bodies 20 moving in the transport system 1 are allocated to the position controller 35, and the current command values for all the transport path units 10 can be generated by the current command generator 36. Consequently, the transport system 1 according to the first embodiment does not need to include the position controller 35 in each of the transport path units 10, and the number of position controllers 35 can be equal to or less than the number of moving bodies 20 at a maximum. Consequently, it is possible to reduce or prevent an increase in the size and cost of the control system of the control controller 30 and the transport path unit 10. In addition, in the transport system 1, since the moving body 20 is always allocated to a predetermined position controller 35, processing of allocating control of the moving body 20 during operation of the transport system 1 is unnecessary. Therefore, the transport system 1 according to the first embodiment can prevent the control of the moving body 20 of the transport system 1 from stopping without increasing the size and cost of the control system.

Second Embodiment

A transport system according to the second embodiment of the present disclosure will be described. Note that components similar to those of the first embodiment are denoted by the same reference signs, and a detailed description thereof is omitted. Hereinafter, configurations different from those of the first embodiment will be specifically described.

Figure 9:
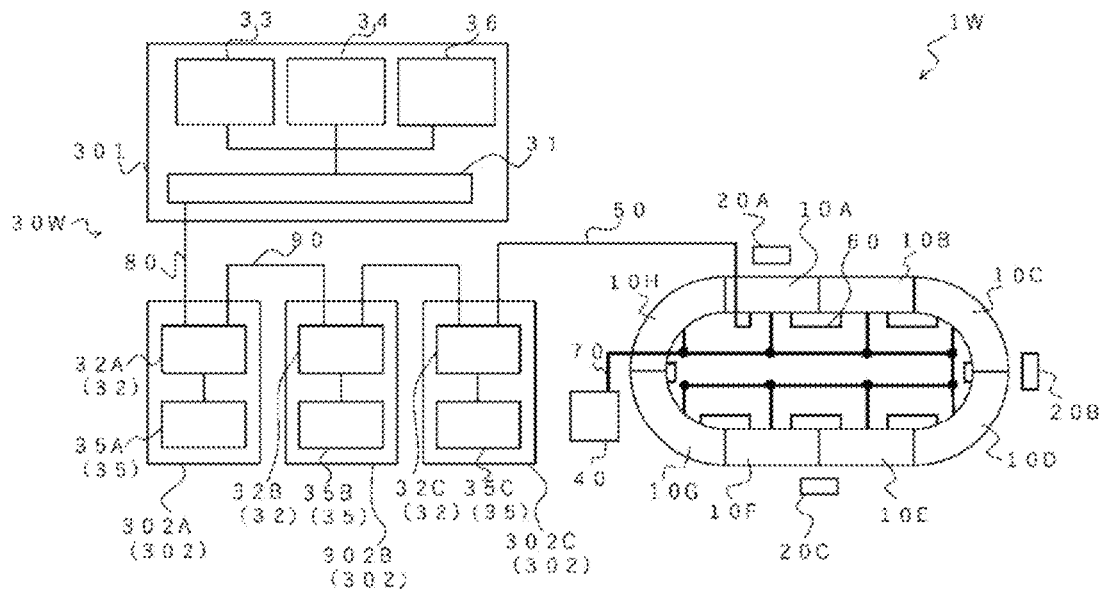
FIG. 9 is a schematic diagram illustrating an exemplary configuration of the transport system according to the second embodiment.

FIG. 9 is a schematic diagram illustrating an exemplary configuration of the transport system according to the second embodiment of the present disclosure. As illustrated in FIG. 9, similarly to the first embodiment, the transport system 1W includes the plurality of transport path units 10A to 10H constituting a transport route for the plurality of moving bodies 20A to 20C, and the power supply unit 40 that supplies power to the transport path units 10A to 10H. Note that the transport system 1W according to the second embodiment includes a control controller 30W that controls the operations of the plurality of moving bodies 20A to 20C instead of the control controller 30. Unlike the control controller 30, the control controller 30W includes a position command controller 301 and a drive controller 302. That is, the position command controller 301 and the drive controller 302 are configured as separate housings, and these controllers operate so as to function as the control controller 30W.

As illustrated in FIG. 9, the position command controller 301 includes the communication master station 31, the position command generator 33, the position generator 34, and the current command generator 36. The position command generator 33, the position generator 34, and the current command generator 36 are connected to the communication master station 31 via an internal bus in the position command controller 301. The communication master station 31, the position command generator 33, the position generator 34, and the current command generator 36 have functions similar to those in the above-described first embodiment. That is, the position command generator 33 generates a position command value of the moving body 20, the position generator 34 generates position information on the moving body 20, and the current command generator 36 generates a current command value of the transport path unit 10. The position command value of the moving body 20 and the position information on the moving body 20 are examples of generation data, and the current command value of the transport path unit 10 is an example of control data.

The drive controller 302 includes the communication subordinate station 32 and the position controller 35. The position controller 35 is connected to the communication subordinate station 32 via an internal bus in the drive controller 302. The communication subordinate station 32 and the position controller 35 have functions similar to those in the above-described first embodiment, and the position controller 35 generates a drive command value of the moving body 20. The drive command value of the moving body 20 is an example of generation data.

The drive controller 302 is a controller that generates a drive command value of the moving body 20 using the position controller 35 based on the position command value of the moving body 20 generated by the position command generator 33 and the position information on the moving body 20 generated by the position generator 34. In the second embodiment, the drive controller 302 includes three drive controllers 302A, 302B, and 302C as illustrated in FIG. 9.

The drive controller 302A includes the communication subordinate station 32A and the position controller 35A, the drive controller 302B includes the communication subordinate station 32B and the position controller 35B, and the drive controller 302C includes the communication subordinate station 32C and the position controller 35C. The drive controllers 302A, 302B, and 302C, the communication subordinate stations 32A, 32B, and 32C, and the position controllers 35A, 35B, and 35C may be simply referred to as the drive controller 302, the communication subordinate station 32, and the position controller 35, respectively, when it is not necessary to distinguish therebetween. The position controller 35 of the drive controller 302 is allocated to the moving body 20 provided in the transport system 1W, and is configured to generate a drive command value of the allocated moving body 20.

The second embodiment describes an example of a form in which the transport system 1W includes the three moving bodies 20A, 20B, and 20C, and one position controller 35 is allocated to one moving body 20. Specifically, the position controller 35A is allocated to generate a drive command value of the moving body 20A, the position controller 35B is allocated to generate a drive command value of the moving body 20B, and the position controller 35C is allocated to generate a drive command value of the moving body 20C. Then, the position controller 35A outputs the generated drive command value of the moving body 20A to the communication subordinate station 32A, the position controller 35B outputs the generated drive command value of the moving body 20B to the communication subordinate station 32B, and the position controller 35C outputs the generated drive command value of the moving body 20C to the communication subordinate station 32C. That is, the drive controller 302 is a controller that generates a drive command value of the moving body 20 allocated to the position controller 35 included in the drive controller 302.

Note that the number of moving bodies 20 to be allocated to the position controller 35 of the drive controller 302 can be freely determined, and an allocation similar to the allocation of the moving bodies 20 to the position controllers 35 described in the above-described first embodiment can be made. That is, the drive controllers 302 can be provided as many as the number of moving bodies 20 provided in the transport system 1W at a maximum as the entire transport system 1W.

In addition, the number of communication subordinate stations 32 and position controllers 35 included in one drive controller 302 can be freely configured, and can be determined when designing the hardware of the drive controller 302. For example, one communication subordinate station 32 and a plurality of position controllers 35 may be included in one drive controller 302, and one communication subordinate station 32 and each of the plurality of position controllers 35 may be connected via an internal bus. In addition, a plurality of communication subordinate stations 32 and a plurality of position controllers 35 may be included in one drive controller 302, the communication subordinate station 32 and the position controller 35 may be connected by an internal bus, and the communication subordinate stations 32 may be connected by an internal bus. Even with such a configuration, the drive controller 302 can be provided as many as the number of moving bodies 20 provided in the transport system 1W at a maximum as the entire transport system 1W.

Here, connection between the communication master station 31 of the position command controller 301, the communication subordinate station 32 of the drive controller 302, and the transport path communication subordinate station 11 of the transport path unit 10 in the control controller 30W according to the second embodiment will be described. In the transport system 1W of the second embodiment, the position command controller 301 and the drive controller 302 constituting the control controller 30W are connected via a third communication line 80. The drive controllers 302 are connected to each other via a drive controller communication line 90. The control controller 30W and the transport path unit 10 are connected via the first communication line 50.

Specifically, as illustrated in FIG. 9, the communication master station 31 of the position command controller 301 is connected to the communication subordinate station 32A of the drive controller 302A via the third communication line 80. The communication subordinate station 32A of the drive controller 302A is connected to the communication subordinate station 32B of the drive controller 302B via the drive controller communication line 90. The communication subordinate station 32B of the drive controller 302B is connected to the communication subordinate station 32C of the drive controller 302C via the drive controller communication line 90. Consequently, the position command controller 301 and the drive controller 302 can communicate with each other to constitute the control controller 30W. The communication master station 31 of the position command controller 301 and the communication subordinate stations 32A, 32B, and 32C of the drive controllers 302A, 302B, and 302C are connected by a daisy chain, and generation data including various command values and information for generating control data can be transmitted and received between the communication master station 31 and the communication subordinate station 32. By adopting such a daisy chain, serial communication can be adopted for transmission and reception of generation data between the communication master station 31 and the communication subordinate station 32, and an increase in communication lines can be reduced or prevented. In addition, the communication subordinate station 32C of the drive controller 302C is connected to the transport path communication subordinate station 11A of the transport path unit 10A via the first communication line 50. Consequently, the control controller 30W and the transport path unit 10 form a communication network that allows for communication with each other.

Then, in the configuration in which the communication master station 31 and the communication subordinate station 32 are connected by a daisy chain as illustrated in FIG. 9, the communication master station 31 transmits and receives generation data to and from the communication subordinate station 32A via the third communication line 80 connecting the communication master station 31 and the communication subordinate station 32A. The communication master station 31 transmits and receives generation data to and from the communication subordinate station 32B via the third communication line 80 connecting the communication master station 31 and the communication subordinate station 32A, the communication subordinate station 32A, and via the drive controller communication line 90 connecting the communication subordinate station 32A and the communication subordinate station 32B. In other words, the communication subordinate station 32B performs transmission and reception with the communication master station 31 via the communication subordinate station 32A. The communication master station 31 transmits and receives generation data to and from the communication subordinate station 32C via the third communication line 80 connecting the communication master station 31 and the communication subordinate station 32A, the communication subordinate station 32A, the drive controller communication line 90 connecting the communication subordinate station 32A and the communication subordinate station 32B, the communication subordinate station 32B, and the drive controller communication line 90 connecting the communication subordinate station 32B and the communication subordinate station 32C. In other words, the communication subordinate station 32C performs transmission and reception with the communication master station 31 via the communication subordinate station 32A and the communication subordinate station 32B. Even in such a configuration, it can be said that the communication master station 31 transmits and receives generation data to and from the communication subordinate stations 32A, 32B, and 32C. In addition, the communication master station 31 is configured to include two channels: a transmission channel and a reception channel.

As illustrated in FIG. 9, the communication subordinate station 32C is connected to the communication subordinate station 32B and is connected to the first communication line 50 connected to the transport path unit 10. Specifically, the communication subordinate station 32C included in the drive controller 302C and the transport path communication subordinate station 11 included in the transport path unit 10 are connected via the first communication line 50, thereby forming a communication network for transmitting and receiving control data between the control controller 30W and the transport path unit 10. That is, the communication subordinate station 32 and the transport path communication subordinate station 11 are connected by a daisy chain, and control data can be transmitted and received between the communication master station 31 and the transport path communication subordinate station 11 via the communication subordinate station 32.

Note that the control controller 30W does not necessarily need to connect the communication subordinate station 32C of the drive controller 302C and the first communication line 50, and only needs to be able to form a communication network for transmitting and receiving control data between the control controller 30W and the transport path unit 10. For example, the control controller 30W may form a communication network for transmitting and receiving control data between the control controller 30W and the transport path unit 10 by connecting the communication master station 31 of the position command controller 301 and the transport path communication subordinate station 11 provided in the transport path unit 10 via the first communication line 50.

In addition, in the configuration in which the communication master station 31 and the communication subordinate station 32 are connected by a daisy chain as illustrated in FIG. 9, the communication master station 31 transmits and receives control data to and from the transport path communication subordinate station 11 of the transport path unit 10 via the third communication line 80 connecting the communication master station 31 and the communication subordinate station 32A, the communication subordinate station 32A, the drive controller communication line 90 connecting the communication subordinate station 32A and the communication subordinate station 32B, the communication subordinate station 32B, the drive controller communication line 90 connecting the communication subordinate station 32B and the communication subordinate station 32C, the communication subordinate station 32C, and the first communication line 50. In other words, the communication master station 31 performs transmission and reception with the transport path communication subordinate station 11 of the transport path unit 10 via the first communication line 50. Even in such a configuration, it can be said that the control controller 30W transmits and receives control data to and from the transport path communication subordinate station 11 of the transport path unit 10. By adopting such a daisy chain, serial communication can be adopted for transmission and reception of control data between the communication master station 31 and the transport path communication subordinate station 11, and an increase in communication lines can be reduced or prevented.

The communication master station 31 of the position command controller 301 according to the second embodiment is configured to transmit generation data toward the communication subordinate station 32 similarly to the above-described first embodiment. The communication master station 31 of the position command controller 301 is configured to transmit control data toward the transport path communication subordinate station 11 similarly to the above-described first embodiment. Further, the communication master station 31 of the position command controller 301 is configured to receive generation data from the plurality of communication subordinate stations 32. The communication master station 31 of the position command controller 301 is configured to receive control data from the plurality of transport path communication subordinate stations 11. In addition, the communication control in the communication master station 31 of the position command controller 301 performs communication control using the transmission channel, the reception channel, and the communication frame similarly to the above-described first embodiment. That is, the control controller 30W according to the second embodiment functions similarly to the control controller 30 described above.

Figure 10:
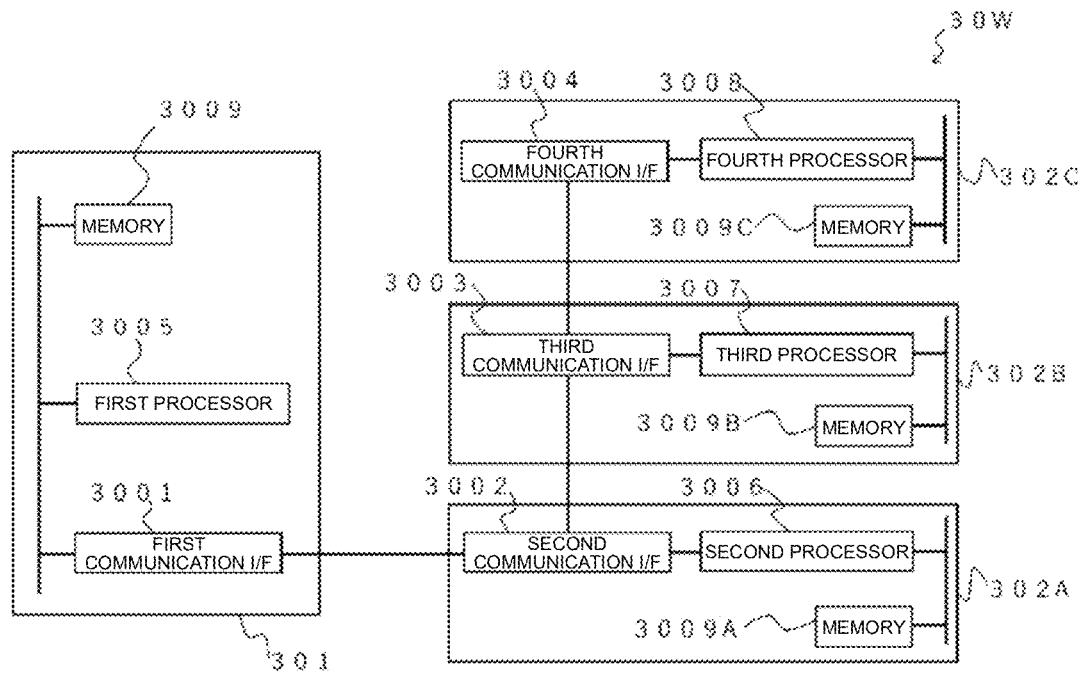
FIG. 10 is a diagram illustrating an exemplary hardware configuration of the control controller according to the second embodiment.

FIG. 10 is a diagram illustrating an exemplary hardware configuration of the control controller according to the second embodiment. The hardware of the control controller 30W is divided into the position command controller 301 and the drive controller 302. The position command controller 301 includes the first communication interface (first communication I/F) 3001 that functions as the communication master station 31, the first processor 3005 that functions as the position command generator 33, the position generator 34, and the current command generator 36, and the memory 3009 that reads and writes various data used for each calculation in the first processor 3005. The drive controller 302A includes the second communication interface (second communication I/F) 3002 that functions as the communication subordinate station 32A, the second processor 3006 that functions as the position controller 35A, and a memory 3009A that reads and writes various data used for each calculation in the second processor 3006. The drive controller 302B includes the third communication interface (third communication I/F) 3003 that functions as the communication subordinate station 32B, the third processor 3007 that functions as the position controller 35B, and a memory 3009B that reads and writes various data used for each calculation in the third processor 3007. The drive controller 302C includes the fourth communication interface (fourth communication I/F) 3004 that functions as the communication subordinate station 32C, the fourth processor 3008 that functions as the position controller 35C, and a memory 3009C that reads and writes various data used for each calculation in the fourth processor 3008.

Since the first processor 3005 to the fourth processor 3008 are similar to those in the first embodiment described above, the description thereof will be omitted. The memories 3009 and 3009A to 3009C include a nonvolatile memory that stores calculation programs and the like that are executed by the first processor 3005 to the fourth processor 3008, and a volatile memory that serves as a work memory at the time of each calculation in the first processor 3005 to the fourth processor 3008.

In the hardware configuration of the position command controller 301 in FIG. 10, the processor functioning as the position command generator 33, the position generator 34, and the current command generator 36 is illustrated as the first processor 3005 as an example. However, the hardware configuration may include a plurality of processors such as a processor functioning as the position command generator 33, a processor functioning as the position generator 34, and a processor functioning as the current command generator 36.

The control controller 30W and the transport path unit 10 according to the second embodiment operate similarly to the operation described with reference to FIGS. 7 and 8 in the above-described first embodiment, and control of the moving body 20 in the transport system 1W is performed, so that a specific description thereof is omitted.

As described above, in the transport system 1W according to the second embodiment, as in the transport system 1 according to the first embodiment described above, even when the moving body 20 moving in the transport system 1W is located at the boundary between the transport path units 10, the movement of the moving body 20 can be controlled with high accuracy, and an increase in the cost of the electric circuits such as the inverter circuit 122 included in one drive element can be reduced or prevented. In addition, similarly to the transport system 1 according to the first embodiment described above, the transport system 1W according to the second embodiment does not need to include the position controller 35 in each of the transport path units 10, and the number of drive controllers 302 including the position controllers 35 can be equal to or less than the number of moving bodies 20 at a maximum, so that it is possible to prevent an increase in the size and cost of the control system of the control controller 30W and the transport path unit 10. In addition, in the transport system 1W, since the moving body 20 is always allocated to a predetermined position controller 35, processing of allocating control of the moving body 20 during operation of the transport system 1W is unnecessary. Therefore, the transport system 1W according to the second embodiment can prevent the control of the moving body 20 of the transport system 1W from stopping without increasing the size and cost of the control system.

Further, in the transport system 1W according to the second embodiment, the position command controller 301 and the drive controller 302 constitute the control controller 30W. The drive controller 302 is configured to generate a drive command value of the allocated moving body 20. Thus, the control controller 30W is divided into the two controllers of the position command controller 301 and the drive controller 302, so that the control load of one controller can be reduced and the control delay as the control controller 30W can be prevented.

Further, the control controller 30W is divided into the position command controller 301 and the drive controller 302, the drive controller 302 and the position command controller 301 are connected by the third communication line 80, and the drive controllers 302 are connected by the drive controller communication line 90, so that the number of drive controllers 302 can be easily changed. Therefore, even when the number of moving bodies 20 moving on the transport route of the transport system 1W is changed, the control system configuration of the transport system 1W can be easily changed by changing the number of drive controllers 302. For example, when the number of moving bodies 20 moving on the transport route of the transport system 1W increases, the transport system 1W can easily change the control system configuration by increasing the number of drive controllers 302 of the control controller 30W. In addition, when the number of moving bodies 20 moving on the transport route of the transport system 1W decreases, the transport system 1W can easily change the control system configuration by decreasing the number of drive controllers 302 of the control controller 30W. That is, the transport system 1W according to the second embodiment can provide a transport system that can facilitate system expansion and change.

Third Embodiment

A transport system according to the third embodiment of the present disclosure will be described. Note that components similar to those of the first and second embodiments are denoted by the same reference signs, and a detailed description thereof is omitted. Hereinafter, configurations different from those of the first and second embodiments will be specifically described.

Figure 11:
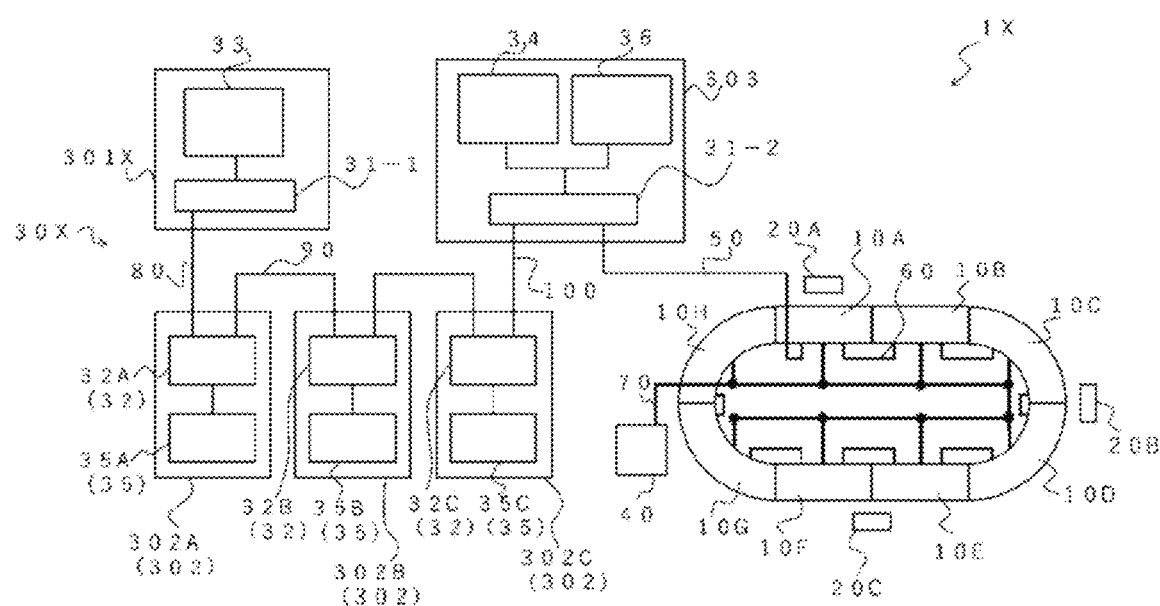
FIG. 11 is a schematic diagram illustrating an exemplary configuration of the transport system according to the third embodiment.

FIG. 11 is a schematic diagram illustrating an exemplary configuration of the transport system according to the third embodiment of the present disclosure. As illustrated in FIG. 11, similarly to the first embodiment, the transport system 1X includes the plurality of transport path units 10A to 10H constituting a transport route for the plurality of moving bodies 20A to 20C, and the power supply unit 40 that supplies power to the transport path units 10A to 10H. Note that the transport system 1X according to the third embodiment includes a control controller 30X that controls the operations of the plurality of moving bodies 20A to 20C instead of the control controller 30 or 30W. The control controller 30X includes a position command controller 301X, the drive controller 302, and a track controller 303. That is, the position command controller 301X, the drive controller 302, and the track controller 303 are configured as separate housings, and these controllers operate so as to function as the control controller 30X that performs multi-master communication control.

As illustrated in FIG. 11, the position command controller 301X includes a first communication master station 31-1 and the position command generator 33. The position command generator 33 is connected to the first communication master station 31-1 via an internal bus in the position command controller 301X. The position command generator 33 has a function similar to that in the above-described first embodiment, and generates a position command value of the moving body 20. The position command value of the moving body 20 is an example of generation data.

The drive controller 302 includes the communication subordinate station 32 and the position controller 35 as in the above-described second embodiment. The position controller 35 is connected to the communication subordinate station 32 via an internal bus in the drive controller 302. The drive controller 302 has a function similar to that in the above-described second embodiment.

In the third embodiment, the drive controller 302 includes the three drive controllers 302A, 302B, and 302C as illustrated in FIG. 11. Then, the drive controller 302A includes the communication subordinate station 32A and the position controller 35A, the drive controller 302B includes the communication subordinate station 32B and the position controller 35B, and the drive controller 302C includes the communication subordinate station 32C and the position controller 35C. The drive controllers 302A, 302B, and 302C, the communication subordinate stations 32A, 32B, and 32C, and the position controllers 35A, 35B, and 35C may be simply referred to as the drive controller 302, the communication subordinate station 32, and the position controller 35, respectively, when it is not necessary to distinguish therebetween. The position controller 35 of the drive controller 302 is allocated to the moving body 20 provided in the transport system 1X, and is configured to generate a drive command value of the allocated moving body 20. The drive command value of the moving body 20 is an example of generation data.

Similarly to the second embodiment, the third embodiment describes an example of a form in which the transport system 1X includes the three moving bodies 20A, 20B, and 20C, and one position controller 35 is allocated to one moving body 20. Note that the number of moving bodies 20 to be allocated to the position controller 35 of the drive controller 302 can be freely determined as in the above-described second embodiment. The number of communication subordinate stations 32 and position controllers 35 included in one drive controller 302 can be freely configured as in the above-described second embodiment.

The track controller 303 includes a second communication master station 31-2, the position generator 34, and the current command generator 36. The position generator 34 and the current command generator 36 are connected to the second communication master station 31-2 via an internal bus in the track controller 303. The position generator 34 and the current command generator 36 have functions similar to those in the above-described first embodiment, the position generator 34 generates position information on the moving body 20, and the current command generator 36 generates a current command value of the transport path unit 10. The position information on the moving body 20 is an example of generation data, and the current command value of the transport path unit 10 is an example of control data.

As described above, in the control controller 30X according to the third embodiment, the communication master station 31 described in the first embodiment is divided into two: the first communication master station 31-1 and the second communication master station 31-2, and the first communication master station 31-1 and the second communication master station 31-2 operate similarly to the communication master station 31.

Here, connection between the first communication master station 31-1 of the position command controller 301X, the communication subordinate station 32 of the drive controller 302, the second communication master station 31-2 of the track controller 303, and the transport path communication subordinate station 11 of the transport path unit 10 in the control controller 30X according to the third embodiment will be described. In the transport system 1X of the third embodiment, the position command controller 301X and the drive controller 302 constituting the control controller 30X are connected via the third communication line 80. The drive controllers 302 are connected to each other via the drive controller communication line 90. The drive controller 302 and the track controller 303 are connected via a fourth communication line 100. The control controller 30X and the transport path unit 10 are connected via the first communication line 50.

Specifically, as illustrated in FIG. 11, the first communication master station 31-1 of the position command controller 301X is connected to the communication subordinate station 32A of the drive controller 302A via the third communication line 80. The communication subordinate station 32A of the drive controller 302A is connected to the communication subordinate station 32B of the drive controller 302B via the drive controller communication line 90. The communication subordinate station 32B of the drive controller 302B is connected to the communication subordinate station 32C of the drive controller 302C via the drive controller communication line 90. Further, the communication subordinate station 32C of the drive controller 302C is connected to the second communication master station 31-2 of the track controller 303 via the fourth communication line 100. Consequently, the position command controller 301X, the drive controller 302, and the track controller 303 can communicate with each other to constitute the control controller 30X. The first communication master station 31-1 of the position command controller 301X, the communication subordinate stations 32A, 32B, and 32C of the drive controllers 302A, 302B, and 302C, and the second communication master station 31-2 of the track controller 303 are connected by a daisy chain, and generation data including various command values and information for generating control data can be transmitted and received between the first communication master station 31-1, the communication subordinate station 32, and the second communication master station 31-2. By adopting such a daisy chain, serial communication can be adopted for transmission and reception of generation data between the first and second communication master stations 31-1 and 31-2 and the communication subordinate station 32, and an increase in communication lines can be reduced or prevented. In addition, the second communication master station 31-2 of the track controller 303 is connected to the transport path communication subordinate station 11A of the transport path unit 10A via the first communication line 50. Consequently, the control controller 30X and the transport path unit 10 form a communication network that allows for communication with each other.

Then, in the configuration in which the first communication master station 31-1 and the communication subordinate station 32 are connected by a daisy chain as illustrated in FIG. 11, the first communication master station 31-1 transmits and receives generation data to and from the communication subordinate station 32A via the third communication line 80 connecting the first communication master station 31-1 and the communication subordinate station 32A. The first communication master station 31-1 transmits and receives generation data to and from the communication subordinate station 32B via the third communication line 80 connecting the first communication master station 31-1 and the communication subordinate station 32A, and the drive controller communication line 90 connecting the communication subordinate station 32A and the communication subordinate station 32B. In other words, the communication subordinate station 32B performs transmission and reception with the first communication master station 31-1 via the communication subordinate station 32A. The first communication master station 31-1 transmits and receives generation data to and from the communication subordinate station 32C via the third communication line 80 connecting the first communication master station 31-1 and the communication subordinate station 32A, the communication subordinate station 32A, the drive controller communication line 90 connecting the communication subordinate station 32A and the communication subordinate station 32B, the communication subordinate station 32B, and the drive controller communication line 90 connecting the communication subordinate station 32B and the communication subordinate station 32C. In other words, the communication subordinate station 32C performs transmission and reception with the first communication master station 31-1 via the communication subordinate station 32A and the communication subordinate station 32B. Even in such a configuration, it can be said that the first communication master station 31-1 transmits and receives generation data to and from the communication subordinate stations 32A, 32B, and 32C. In addition, the first communication master station 31-1 is configured to include two channels: a transmission channel and a reception channel.

Further, in the configuration in which the second communication master station 31-2 and the communication subordinate station 32 are connected by a daisy chain as illustrated in FIG. 11, the second communication master station 31-2 transmits and receives generation data to and from the communication subordinate station 32C via fourth communication line 100 connecting the second communication master station 31-2 and the communication subordinate station 32C. The second communication master station 31-2 transmits and receives generation data to and from the communication subordinate station 32B via the fourth communication line 100 connecting the second communication master station 31-2 and the communication subordinate station 32C, the communication subordinate station 32C, and the drive controller communication line 90 connecting the communication subordinate station 32C and the communication subordinate station 32B. In other words, the communication subordinate station 32B performs transmission and reception with the second communication master station 31-2 via the communication subordinate station 32C. The second communication master station 31-2 transmits and receives generation data to and from the communication subordinate station 32A via the fourth communication line 100 connecting the second communication master station 31-2 and the communication subordinate station 32C, the communication subordinate station 32C, the drive controller communication line 90 connecting the communication subordinate station 32C and the communication subordinate station 32B, the communication subordinate station 32B, and the drive controller communication line 90 connecting the communication subordinate station 32B and the communication subordinate station 32A. In other words, the communication subordinate station 32A performs transmission and reception with the second communication master station 31-2 via the communication subordinate station 32C and the communication subordinate station 32B. Even in such a configuration, it can be said that the second communication master station 31-2 transmits and receives generation data to and from the communication subordinate stations 32A, 32B, and 32C. In addition, the second communication master station 31-2 is configured to include two channels: a transmission channel and a reception channel.

As illustrated in FIG. 11, the second communication master station 31-2 is connected to the communication subordinate station 32C and is connected to the first communication line 50 connected to the transport path unit 10. Specifically, the second communication master station 31-2 included in the track controller 303 and the transport path communication subordinate station 11 included in the transport path unit 10 are connected via the first communication line 50, thereby forming a communication network for transmitting and receiving control data between the control controller 30X and the transport path unit 10. That is, the communication subordinate station 32 and the transport path communication subordinate station 11 are connected by a daisy chain, and control data can be transmitted and received between the second communication master station 31-2 and the transport path communication subordinate station 11. Even in such a configuration, it can be said that the control controller 30X transmits and receives control data to and from the transport path communication subordinate station 11 of the transport path unit 10. By adopting a daisy chain, serial communication can be adopted for transmission and reception of control data between the second communication master station 31-2 and the transport path communication subordinate station 11, and an increase in communication lines can be reduced or prevented.

The first communication master station 31-1 of the position command controller 301X and the second communication master station 31-2 of the track controller 303 according to the third embodiment are configured to transmit generation data toward the communication subordinate station 32. As an example, the first communication master station 31-1 and the second communication master station 31-2 are configured to designate a desired communication subordinate station 32 for the plurality of communication subordinate stations 32A to 32C as a communication destination, and transmit the generation data toward the designated communication subordinate station 32. In addition, the plurality of communication subordinate stations 32A to 32C are configured to designate a desired first communication master station 31-1 and a desired second communication master station 31-2 as communication destinations with respect to the first communication master station 31-1 of the position command controller 301X and the second communication master station 31-2 of the track controller 303, and transmit and receive generation data to and from the designated first communication master station 31-1 and second communication master station 31-2. Further, the second communication master station 31-2 of the track controller 303 is configured to transmit control data toward the transport path communication subordinate station 11. As an example, the second communication master station 31-2 is configured to designate a desired transport path communication subordinate station 11 as a communication destination for the plurality of transport path communication subordinate stations 11A to 11H and transmit control data toward the designated desired transport path communication subordinate station 11. The second communication master station 31-2 of the track controller 303 is configured to receive control data from the plurality of transport path communication subordinate stations 11. In addition, the communication control in the first communication master station 31-1 of the position command controller 301X and the second communication master station 31-2 of the track controller 303 performs the communication control using the transmission channel, the reception channel, and the communication frame similarly to the first embodiment and the second embodiment described above. That is, in the control controller 30X, the communication master station is divided into the first communication master station 31-1 of the position command controller 301X and the second communication master station 31-2 of the track controller 303, but the first communication master station 31-1 and the second communication master station 31-2 implement the same functions as the communication master station 31 described in the first and second embodiments.

Figure 12:
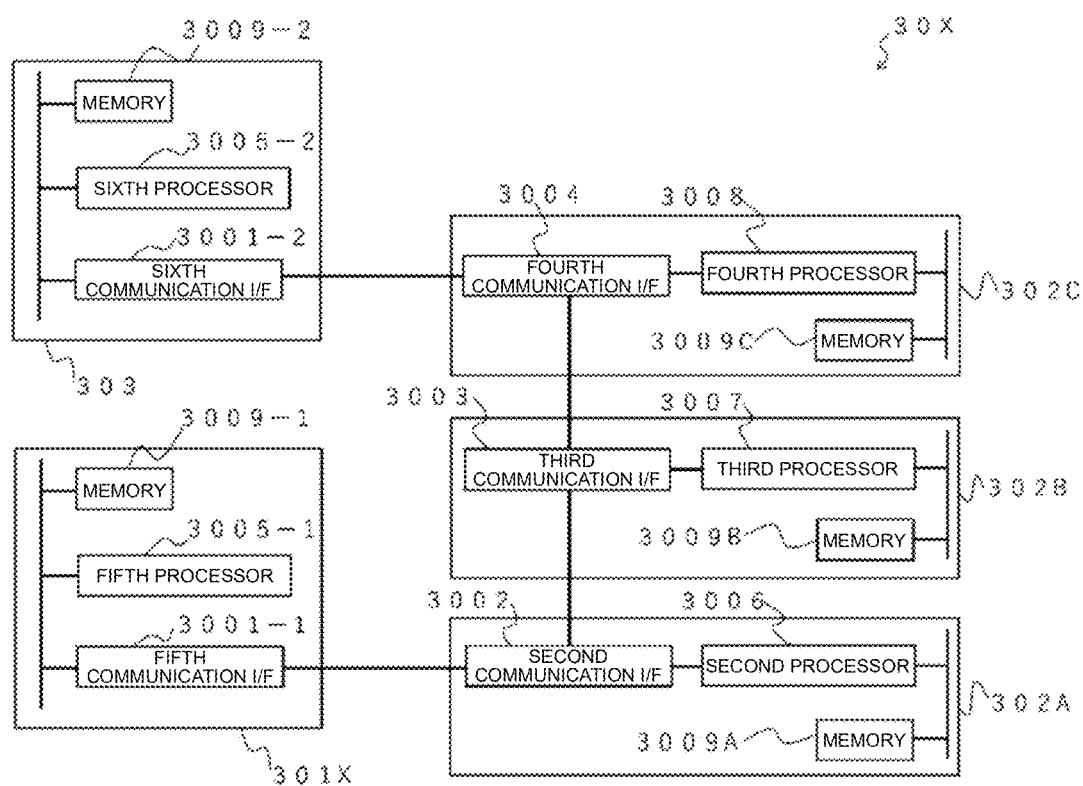
FIG. 12 is a diagram illustrating an exemplary hardware configuration of the control controller according to the third embodiment.

FIG. 12 is a diagram illustrating an exemplary hardware configuration of the control controller according to the third embodiment. The hardware of the control controller 30X is divided into the position command controller 301X, the drive controller 302, and the track controller 303. The position command controller 301X includes a fifth communication interface (fifth communication I/F) 3001-1 that functions as the first communication master station 31-1, a fifth processor 3005-1 that functions as the position command generator 33, and a memory 3009-1 that reads and writes various data used for each calculation in the fifth processor 3005-1. The drive controller 302A includes the second communication interface (second communication I/F) 3002 that functions as the communication subordinate station 32A, the second processor 3006 that functions as the position controller 35A, and a memory 3009A that reads and writes various data used for each calculation in the second processor 3006. The drive controller 302B includes the third communication interface (third communication I/F) 3003 that functions as the communication subordinate station 32B, the third processor 3007 that functions as the position controller 35B, and the memory 3009B that reads and writes various data used for each calculation in the third processor 3007. The drive controller 302C includes the fourth communication interface (fourth communication I/F) 3004 that functions as the communication subordinate station 32C, the fourth processor 3008 that functions as the position controller 35C, and a memory 3009C that reads and writes various data used for each calculation in the fourth processor 3008. The track controller 303 includes a sixth communication interface (sixth communication I/F) 3001-2 that functions as the second communication master station 31-2, a sixth processor 3005-2 that functions as the position generator 34 and the current command generator 36, and a memory 3009-2 that reads and writes various data used for each calculation in the sixth processor 3005-2.

Since the second processor 3006 to the fourth processor 3008 are similar to those in the first embodiment described above, the description thereof will be omitted. Since 3009A to 3009C are similar to those in the second embodiment described above, the description thereof will be omitted. The fifth processor 3005-1 is a processor that can calculate a position command value as the position command generator 33, and for example, a microprocessor, a microcontroller, a microcomputer, a CPU, a DSP, or the like can be adopted. The sixth processor 3005-2 is a processor that can calculate position information and a current command value of the transport path unit 10, and for example, a microprocessor, a microcontroller, a microcomputer, a CPU, a DSP, or the like can be adopted. The memory 3009-1 includes a nonvolatile memory that stores calculation programs and the like that are executed by the fifth processor 3005-1, and a volatile memory that serves as a work memory at the time of each calculation in the fifth processor 3005-1. The memory 3009-2 includes a nonvolatile memory that stores calculation programs and the like that are executed by the sixth processor 3005-2, and a volatile memory that serves as a work memory at the time of each calculation in the sixth processor 3005-2.

In the hardware configuration of the track controller 303 in FIG. 12, the processor functioning as the position generator 34 and the current command generator 36 is illustrated as the sixth processor 3005-2 as an example. However, the hardware configuration may include a plurality of processors such as a processor functioning as the position generator 34 and a processor functioning as the current command generator 36.

Figure 13:
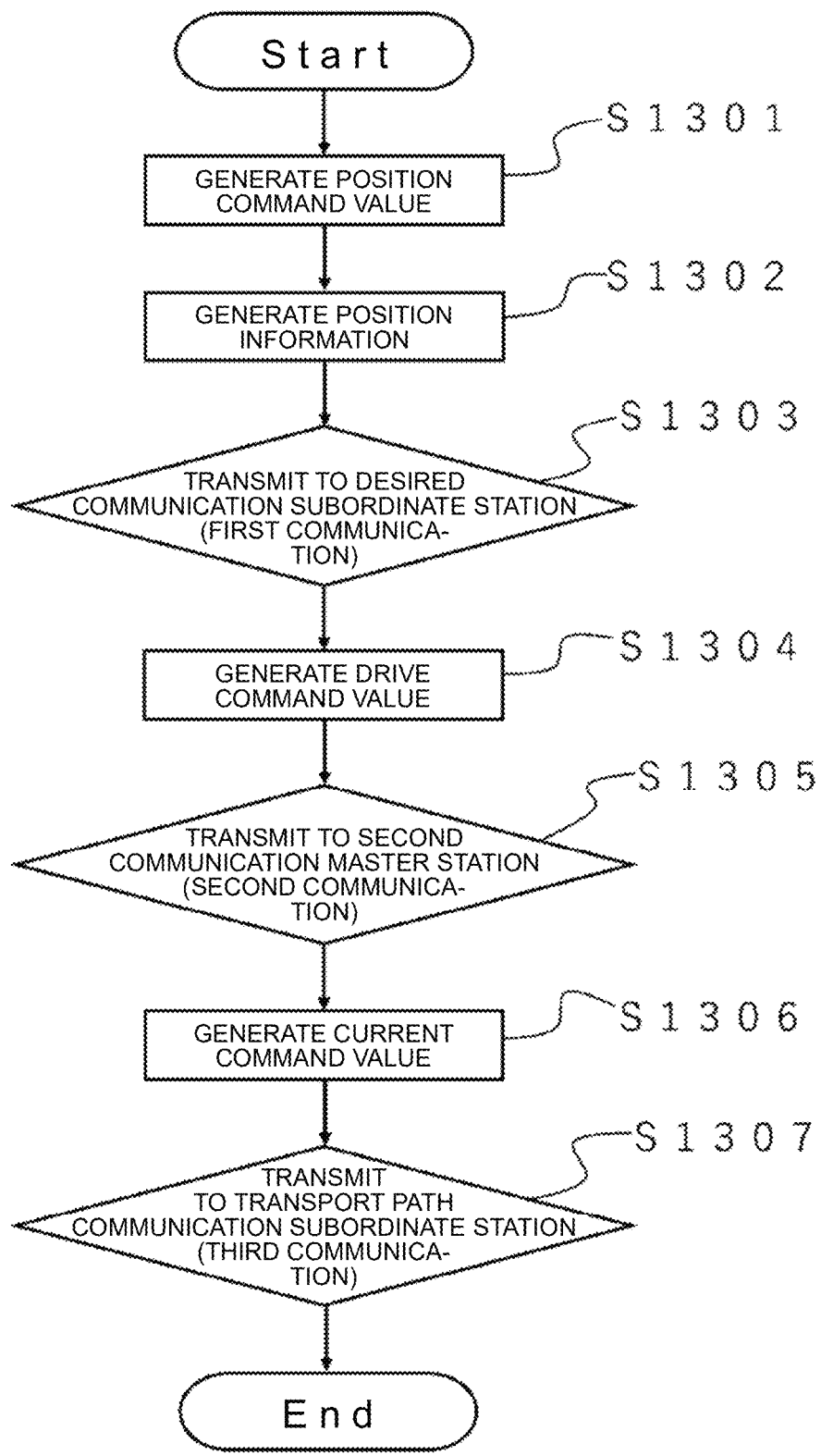
FIG. 13 is a flowchart illustrating an example of the operation of the control controller according to the third embodiment.

FIG. 13 is a flowchart illustrating an example of the operation of the control controller according to the third embodiment of the present disclosure. The operation of the control controller 30X will be described with reference to FIG. 13.

In step S1301 illustrated in FIG. 13, the position command generator 33 of the position command controller 301X constituting the control controller 30X generates the position command value of each of the three moving bodies 20A, 20B, and 20C included in the transport system 1X. Then, the position command generator 33 outputs the generated position command value of each of the moving bodies 20A, 20B, and 20C to the first communication master station 31-1 of the position command controller 301X.

In step S1302, the position generator 34 of the track controller 303 of the control controller 30X generates the position information on each of the moving bodies 20A, 20B, and 20C indicating the positions of the moving bodies 20A, 20B, and 20C on the transport route based on the scale detection information included in the control data received from the transport path units 10A to 10H using the communication frames R2A to R2H. Then, the position generator 34 outputs the generated position information on each of the moving bodies 20A, 20B, and 20C to the second communication master station 31-2 of the track controller 303.

In step S1303, the first communication master station 31-1 performs the first communication of transmitting the acquired position command value of each of the moving bodies 20A, 20B, and 20C toward the communication subordinate station 32. The second communication master station 31-2 performs the first communication of transmitting the acquired position information on each of the moving bodies 20A, 20B, and 20C toward the communication subordinate station 32. Specifically, the first communication master station 31-1 transmits the position command value of the moving body 20A toward the communication subordinate station 32A using the communication frame T1A, transmits the position command value of the moving body 20B toward the communication subordinate station 32B using the communication frame T1B, and transmits the position command value of the moving body 20C toward the communication subordinate station 32C using the communication frame T1C. On the other hand, the second communication master station 31-2 transmits the position information on the moving body 20A toward the communication subordinate station 32A using the communication frame T1A, transmits the position information on the moving body 20B toward the communication subordinate station 32B using the communication frame T1A, and transmits the position information on the moving body 20C toward the communication subordinate station 32C using the communication frame T1A.

In step S1304, the position controllers 35A, 35B, and 35C of the drive controllers 302A, 302B, and 302C respectively generate the drive command values of the moving bodies 20A, 20B, and 20C based on the position command values and the position information on the moving bodies 20A, 20B, and 20C received by the communication subordinate stations 32A, 32B, and 32C, respectively. Then, the position controllers 35A, 35B, and 35C output the generated drive command values of the moving bodies 20A, 20B, and 20C to the communication subordinate stations 32A, 32B, and 32C, respectively. Specifically, the position controller 35A acquires the position command value and the position information on the moving body 20A from the communication subordinate station 32A connected via the internal bus, generates the drive command value of the moving body 20A based on the position command value and the position information on the moving body 20A, and outputs the generated drive command value of the moving body 20A to the communication subordinate station 32A. Similarly, the position controllers 35B and 35C generate the drive command value of the moving body 20B and the drive command value of the moving body 20C, respectively, and output the drive command values to the communication subordinate stations 32B and 32C connected via the internal bus, respectively.

In step S1305, the communication subordinate stations 32A, 32B, and 32C of the drive controllers 302A, 302B, and 302C perform the second communication of transmitting the acquired drive command values of the moving bodies 20A, 20B, and 20C toward the second communication master station 31-2. Specifically, the communication subordinate station 32A transmits the drive command value of the moving body 20A toward the second communication master station 31-2 using the communication frame R1A including a header, a footer, and a payload. In addition, the communication subordinate stations 32B and 32C transmit the drive command value of the moving body 20B and the drive command value of the moving body 20C toward the second communication master station 31-2 using the communication frames R1B and R1C, respectively.

In step S1306, the current command generator 36 of the track controller 303 generates the current command values of the transport path units 10A to 10H based on the position information on the moving bodies 20A, 20B, and 20C generated by the position generator 34 and the drive command values of the moving bodies 20A, 20B, and 20C received by the second communication master station 31-2. Note that the position information on the moving bodies 20A, 20B, and 20C can be read and acquired from a memory included in the track controller 303. The current command generator 36 acquires the drive command value of the moving body 20A, the drive command value of the moving body 20B, and the drive command value of the moving body 20C from the second communication master station 31-2 connected via the internal bus. Then, the current command generator 36 acquires the position information on the moving body 20A, the position information on the moving body 20B, and the position information on the moving body 20C from the memory of the track controller 303. The current command generator 36 generates current command values of the transport path units 10A to 10H based on the drive commands and the position information on the moving bodies 20A, 20B, and 20C, and outputs the current command values to the communication master station 31. Since the generation of the current command values by the current command generator 36 is performed similarly to the first embodiment, a detailed description thereof will be omitted.

In step S1307, the second communication master station 31-2 of the track controller 303 performs the third communication of transmitting the acquired current command value of each of the transport path units 10A to 10H toward the transport path communication subordinate station 11. Specifically, the second communication master station 31-2 transmits the current command value of the transport path unit 10A toward the transport path communication subordinate station 11A using the communication frame T2A including a header, a footer, and a payload. Similarly, the second communication master station 31-2 transmits the current command values of the transport path units 10B to 10H toward the transport path communication subordinate stations 11B to 11H using the communication frames T2B to T2H, respectively.

The transport path unit 10 according to the third embodiment operates in the same manner as the operations of steps S801 to S804 described with reference to FIG. 8 in the above-described first embodiment, and controls the moving body 20 in the transport system 1X. The transport path unit 10 according to the third embodiment performs a different operation in step S805, which will be described below.

Figure 14:
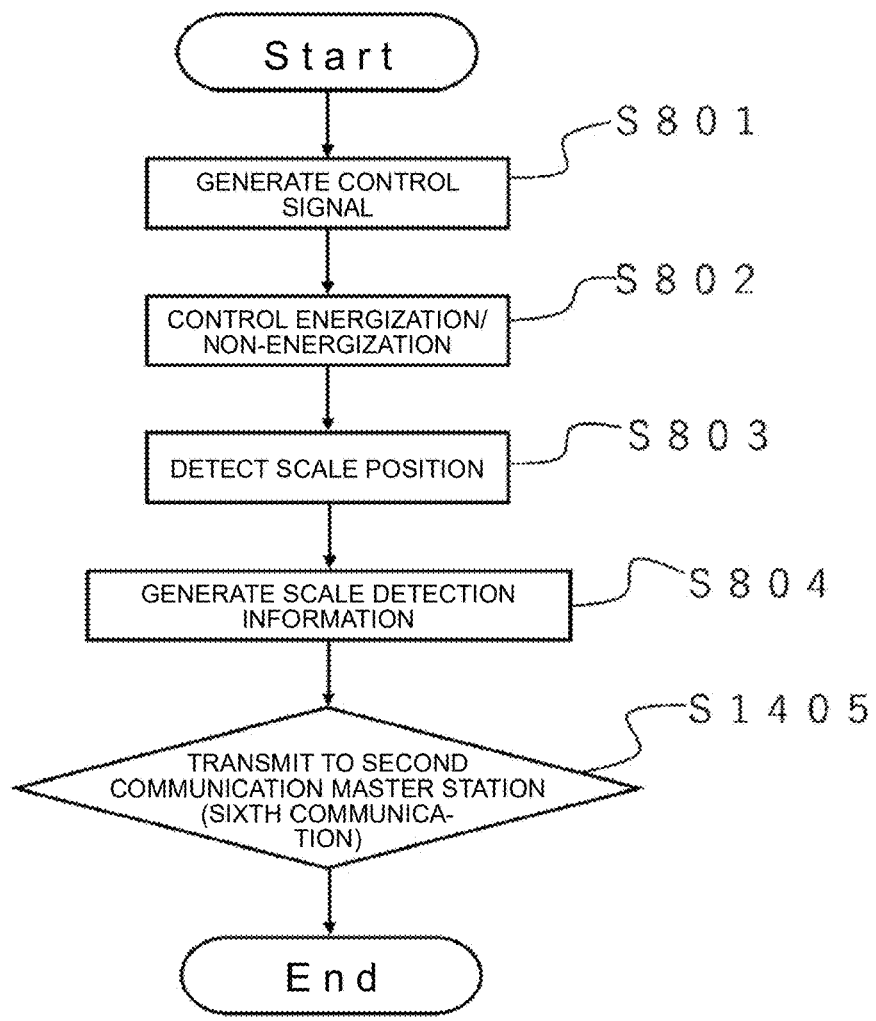
FIG. 14 is a flowchart illustrating an example of the operation of the transport path unit according to the third embodiment.

FIG. 14 is a flowchart illustrating an example of the operation of the transport path unit according to the third embodiment. The transport path unit 10 according to the third embodiment operates in the same manner as in steps S801 to S804, and then performs step S1405 illustrated in FIG. 14. In step S1405, the transport path communication subordinate station 11 of each transport path unit 10 performs the sixth communication of transmitting the acquired scale detection information toward the second communication master station 31-2. Specifically, the transport path communication subordinate station 11A transmits the scale detection information calculated by the position calculator 14A of the transport path unit 10A toward the second communication master station 31-2 included in the control controller 30X using the communication frame R2A that includes a header, a footer, and a payload. Similarly, the transport path communication subordinate stations 11B to 11H of the transport path units 10B to 10H sequentially transmit the scale detection information calculated by the position calculators 14B to 14H of the transport path units 10B to 10H toward the second communication master station 31-2 of the control controller 30X using the communication frames R2B to R2H.

As described above, the control controller 30X according to the third embodiment is configured to function similarly to the control controllers 30 and 30W by configuring the first communication master station 31-1 and the second communication master station 31-2 so as to function similarly to the above-described communication master station 31. Therefore, as in the first and second embodiments described above, even when the moving body 20 moving in the transport system 1X is located at the boundary between the transport path units 10, the movement of the moving body 20 can be controlled with high accuracy, and an increase in the cost of the electric circuits such as the inverter circuit 122 included in one drive element can be reduced or prevented. In addition, the transport system 1X according to the third embodiment does not need to include the position controller 35 in each of the transport path units 10, and the number of drive controllers 302 including the position controllers 35 can be equal to or less than the number of moving bodies 20 at a maximum, so that it is possible to reduce or prevent an increase in the size and cost of the control system of the control controller 30X and the transport path unit 10. In addition, in the transport system 1X, since the moving body 20 is always allocated to a predetermined position controller 35, processing of allocating control of the moving body 20 during operation of the transport system 1X is unnecessary. Therefore, the transport system 1X according to the third embodiment can prevent the control of the moving body 20 of the transport system 1X from stopping without increasing the size and cost of the control system.

Further, in the transport system 1X according to the third embodiment, the position command controller 301X, the drive controller 302, and the track controller 303 constitute the control controller 30X. The position command controller 301X is configured to generate a position command value of the moving body 20 moving along the transport route of the transport system 1X. The drive controller 302 is configured to generate a drive command value of the allocated moving body 20. The track controller 303 is configured to generate position information on the moving body 20 moving along the transport route of the transport system 1X and current command values of all the transport path units 10 constituting the transport route of the transport system 1X. Thus, the control controller 30X is divided into the three controllers of the position command controller 301X, the drive controller 302, and the track controller 303, so that the control load of one controller can be reduced and the control delay as the control controller 30X can be reduced or prevented.

In addition, the control controller 30X connects the position command controller 301X and the drive controller 302 via the third communication line 80, and connects the track controller 303 and the drive controller 302 via the fourth communication line 100. Thus, the control controller 30X can widen the communication band by separating the communication lines for transmitting and receiving the generation data, and can shorten the communication cycle between the position command controller 301X and the drive controller 302 and the communication cycle between the track controller 303 and the drive controller 302. Therefore, the control controller 30X can prevent the control delay and improve the control performance of the moving body 20.

In addition, in the control controller 30X, the drive controller 302 and the position command controller 301X are connected by the third communication line 80, and the drive controllers 302 are connected by the drive controller communication line 90, so that the number of drive controllers 302 can be easily changed as in the above-described second embodiment. Therefore, even when the number of moving bodies 20 moving on the transport route of the transport system 1X is changed, the control system configuration of the transport system 1X can be easily changed by changing the number of drive controllers 302. That is, the transport system 1X according to the third embodiment can provide a transport system that can facilitate system expansion and change.

Fourth Embodiment

A transport system according to the fourth embodiment of the present disclosure will be described. Note that components similar to those of the first and third embodiments are denoted by the same reference signs, and a detailed description thereof is omitted. Hereinafter, configurations different from those of the first to third embodiments will be specifically described.

Figure 15:
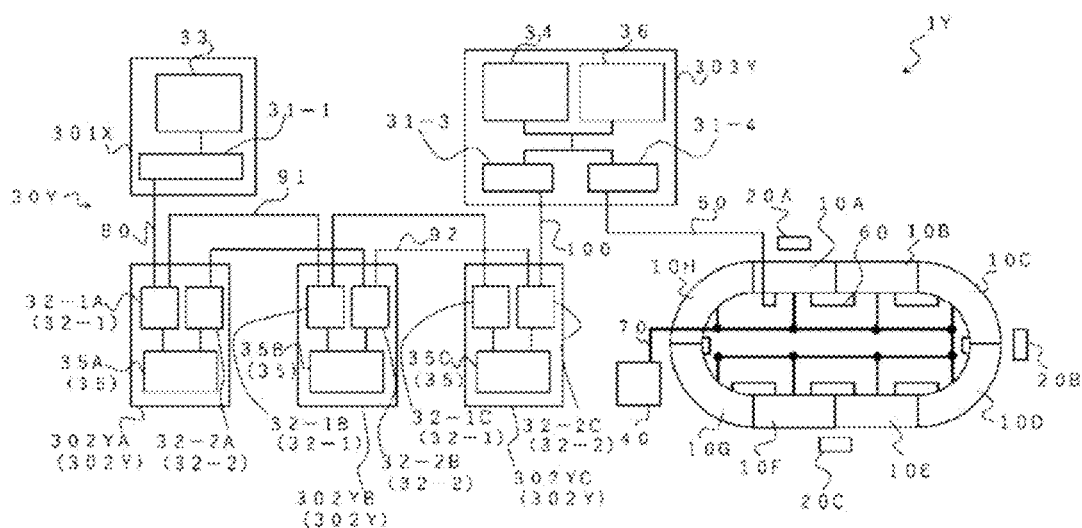
FIG. 15 is a schematic diagram illustrating an exemplary configuration of the transport system according to the fourth embodiment.

FIG. 15 is a schematic diagram illustrating an exemplary configuration of the transport system according to the fourth embodiment of the present disclosure. As illustrated in FIG. 15, similarly to the first embodiment, the transport system 1Y includes the plurality of transport path units 10A to 10H constituting a transport route for the plurality of moving bodies 20A to 20C, and the power supply unit 40 that supplies power to the transport path units 10A to 10H. Note that the transport system 1Y according to the fourth embodiment includes a control controller 30Y that controls the operations of the plurality of moving bodies 20A to 20C instead of the control controller 30, 30W, or 30X. The control controller 30Y includes the position command controller 301X, a drive controller 302Y, and a track controller 303Y. That is, the position command controller 301X, the drive controller 302Y, and the track controller 303Y are configured as separate housings, and these controllers operate so as to function as the control controller 30Y.

As illustrated in FIG. 15, the position command controller 301X includes the first communication master station 31-1 and the position command generator 33 as in the above-described third embodiment. The position command generator 33 is connected to the first communication master station 31-1 via an internal bus in the position command controller 301X. The position command generator 33 has a function similar to that in the above-described first embodiment, and generates a position command value of the moving body 20. The position command value of the moving body 20 is an example of generation data.

The drive controller 302Y includes a first communication subordinate station 32-1, a second communication subordinate station 32-2, and the position controller 35. The position controller 35 is connected to the first communication subordinate station 32-1 and the second communication subordinate station 32-2 via an internal bus in the drive controller 302Y. The position controller 35 has a function similar to that in the above-described first embodiment. In the drive controller 302Y according to the fourth embodiment, the communication subordinate station 32 described in the third embodiment is divided into two: the first communication subordinate station 32-1 and the second communication subordinate station 32-2. The first communication subordinate station 32-1 and the second communication subordinate station 32-2 operate similarly to the communication subordinate station 32.

In the fourth embodiment, the drive controller 302Y includes three drive controllers 302YA, 302YB, and 302YC as illustrated in FIG. 15. The drive controller 302YA includes a first communication subordinate station 32-1A, a second communication subordinate station 32-2A, and the position controller 35A. The drive controller 302YB includes a first communication subordinate station 32-1B, a second communication subordinate station 32-2B, and the position controller 35B. The drive controller 302YC includes a first communication subordinate station 32-1C, a second communication subordinate station 32-2C, and the position controller 35C. The drive controllers 302YA, 302YB, and 302YC, the first communication subordinate stations 32-1A, 32-1B, and 32-1C, the second communication subordinate stations 32-2A, 32-2B, and 32-2C, and the position controllers 35A, 35B, and 35C may be simply referred to as the drive controller 302Y, the first communication subordinate station 32-1, the second communication subordinate station 32-2, and the position controller 35, respectively, when it is not necessary to distinguish therebetween. The position controller 35 of the drive controller 302Y is allocated to the moving body 20 provided in the transport system 1Y, and is configured to generate a drive command value of the allocated moving body 20. The drive command value of the moving body 20 is an example of generation data.

Similarly to the above-described first to third embodiments, the fourth embodiment describes an example of a form in which the transport system 1Y includes the three moving bodies 20A, 20B, and 20C, and one position controller 35 is allocated to one moving body 20. Note that the number of moving bodies 20 to be allocated to the position controller 35 of the drive controller 302Y can be freely determined as in the above-described first to third embodiments.

The track controller 303Y includes a third communication master station 31-3, a fourth communication master station 31-4, the position generator 34, and the current command generator 36. The position generator 34 and the current command generator 36 are connected to the third communication master station 31-3 and the fourth communication master station 31-4 via an internal bus in the track controller 303Y. The position generator 34 and the current command generator 36 have functions similar to those in the above-described first embodiment, the position generator 34 generates position information on the moving body 20, and the current command generator 36 generates a current command value of the transport path unit 10. The position information on the moving body 20 is an example of generation data, and the current command value of the transport path unit 10 is an example of control data.

In the track controller 303Y according to the fourth embodiment, the second communication master station 31-2 described in the third embodiment is divided into two: the third communication master station 31-3 and the fourth communication master station 31-4. The third communication master station 31-3 and the fourth communication master station 31-4 operate similarly to the second communication master station 31-2. Then, in the control controller 30Y according to the fourth embodiment, the communication master station 31 described in the first embodiment is divided into three: the first communication master station 31-1, the third communication master station 31-3, and the fourth communication master station 31-4. The first communication master station 31-1, the third communication master station 31-3, and the fourth communication master station 31-4 operate similarly to the communication master station 31.

Here, connection between the first communication master station 31-1 of the position command controller 301X and the first communication subordinate station 32-1 of the drive controller 302Y, connection between the third communication master station 31-3 of the track controller 303Y and the second communication subordinate station 32-2 of the drive controller 302Y, and connection between the fourth communication master station 31-4 of the track controller 303Y and the transport path communication subordinate station 11 of the transport path unit 10 in the control controller 30Y according to the fourth embodiment will be described. In the transport system 1Y of the fourth embodiment, the position command controller 301X and the drive controller 302Y constituting the control controller 30Y are connected via the third communication line 80. The drive controllers 302Y are connected to each other via a first drive controller communication line 91 and a second drive controller communication line 92. The drive controller 302Y and the track controller 303Y are connected via the fourth communication line 100. The control controller 30Y and the transport path unit 10 are connected via the first communication line 50.

Specifically, as illustrated in FIG. 15, the first communication master station 31-1 of the position command controller 301X is connected to the first communication subordinate station 32-1A of the drive controller 302YA via the third communication line 80. The first communication subordinate station 32-1A of the drive controller 302YA is connected to the first communication subordinate station 32-1B of the drive controller 302YB via the first drive controller communication line 91. Then, the first communication subordinate station 32-1B of the drive controller 302YB is connected to the first communication subordinate station 32-1C of the drive controller 302YC via the first drive controller communication line 91. In addition, the third communication master station 31-3 of the track controller 303Y is connected to the second communication subordinate station 32-2A of the drive controller 302YC via the fourth communication line 100. The second communication subordinate station 32-2A of the drive controller 302YC is connected to the second communication subordinate station 32-2B of the drive controller 302YB via the second drive controller communication line 92. The second communication subordinate station 32-2B of the drive controller 302YB is connected to the second communication subordinate station 32-2C of the drive controller 302YA via the second drive controller communication line 92. Consequently, the position command controller 301X, the drive controller 302Y, and the track controller 303Y can communicate with each other to constitute the control controller 30Y.

Then, the first communication master station 31-1 of the position command controller 301X and the first communication subordinate stations 32-1A, 32-1B, and 32-1C of the drive controllers 302YA, 302YB, and 302YC are connected by a daisy chain, and generation data including various command values and information for generating control data can be transmitted and received between the first communication master station 31-1 and the first communication subordinate stations 32-1A, 32-1B, and 32-1C. In addition, the third communication master station 31-3 of the track controller 303Y and the second communication subordinate stations 32-2A, 32-2B, and 32-2C of the drive controllers 302YA, 302YB, and 302YC are connected by a daisy chain, and generation data including various command values and information for generating control data can be transmitted and received between the third communication master station 31-3 and the second communication subordinate stations 32-2A, 32-2B, and 32-2C. By adopting such a daisy chain, serial communication can be adopted for transmission and reception of generation data between the first and third communication master stations 31-1 and 31-3 and the first and second communication subordinate stations 32-1 and 32-2, and an increase in communication lines can be reduced or prevented. In addition, the fourth communication master station 31-4 of the track controller 303Y is connected to the transport path communication subordinate station 11A of the transport path unit 10A via the first communication line 50. Consequently, the control controller 30Y and the transport path unit 10 form a communication network that allows for communication with each other.

In the configuration in which the first communication master station 31-1 and the first communication subordinate station 32-1 are connected by a daisy chain as illustrated in FIG. 15, the first communication master station 31-1 performs transmission and reception with the first communication subordinate station 32-1 through the following communication route. The first communication master station 31-1 transmits and receives generation data to and from the first communication subordinate station 32-1A via the third communication line 80 connecting the first communication master station 31-1 and the first communication subordinate station 32-1A. The first communication master station 31-1 transmits and receives generation data to and from the first communication subordinate station 32-1B via the third communication line 80 connecting the first communication master station 31-1 and the first communication subordinate station 32-1A, the first communication subordinate station 32-1A, and the first drive controller communication line 91 connecting the first communication subordinate station 32-1A and the first communication subordinate station 32-1B. In other words, the first communication subordinate station 32-1B performs transmission and reception with the first communication master station 31-1 via the first communication subordinate station 32-1A. The first communication master station 31-1 transmits and receives generation data to and from the first communication subordinate station 32-1C via the third communication line 80 connecting the first communication master station 31-1 and the first communication subordinate station 32-1A, the first communication subordinate station 32-1A, the first drive controller communication line 91 connecting the first communication subordinate station 32-1A and the first communication subordinate station 32-1B, the first communication subordinate station 32-1B, and the first drive controller communication line 91 connecting the first communication subordinate station 32-1B and the first communication subordinate station 32-1C. In other words, the first communication subordinate station 32-1C performs transmission and reception with the first communication master station 31-1 via the first communication subordinate station 32-1A and the first communication subordinate station 32-1B. Even in such a configuration, it can be said that the first communication master station 31-1 transmits and receives generation data to and from the first communication subordinate stations 32-1A, 32-1B, and 32-1C. In addition, the first communication master station 31-1 is configured to include two channels: a transmission channel and a reception channel.

Further, in the configuration in which the third communication master station 31-3 and the second communication subordinate station 32-2 are connected by a daisy chain as illustrated in FIG. 15, the third communication master station 31-3 performs transmission and reception with the second communication subordinate station 32-2 through the following communication route. The third communication master station 31-3 transmits and receives generation data to and from the second communication subordinate station 32-2C via the fourth communication line 100 connecting the third communication master station 31-3 and the second communication subordinate station 32-2C. The third communication master station 31-3 transmits and receives generation data to and from the second communication subordinate station 32-2B via the fourth communication line 100 connecting the third communication master station 31-3 and the second communication subordinate station 32-2C, the second communication subordinate station 32-2C, and the second drive controller communication line 92 connecting the second communication subordinate station 32-2C and the second communication subordinate station 32-2B. In other words, the second communication subordinate station 32-2B performs transmission and reception with the third communication master station 31-3 via the second communication subordinate station 32-2C. The third communication master station 31-3 transmits and receives generation data to and from the second communication subordinate station 32-2A via the fourth communication line 100 connecting the third communication master station 31-3 and the second communication subordinate station 32-2C, the second communication subordinate station 32-2C, the second drive controller communication line 92 connecting the second communication subordinate station 32-2C and the second communication subordinate station 32-2B, the second communication subordinate station 32-2B, and the second drive controller communication line 92 connecting the second communication subordinate station 32-2B and the second communication subordinate station 32-2A. In other words, the second communication subordinate station 32-2A performs transmission and reception with the third communication master station 31-3 via the second communication subordinate station 32-2C and the second communication subordinate station 32-2B. Even in such a configuration, it can be said that the third communication master station 31-3 transmits and receives generation data to and from the second communication subordinate stations 32-2A, 32-2B, and 32-2C. In addition, the third communication master station 31-3 is configured to include two channels: a transmission channel and a reception channel.

As illustrated in FIG. 15, the fourth communication master station 31-4 is connected to the first communication line 50 connected to the transport path unit 10. Specifically, the fourth communication master station 31-4 included in the track controller 303Y and the transport path communication subordinate station 11 included in the transport path unit 10 are connected via the first communication line 50, thereby forming a communication network for transmitting and receiving control data between the control controller 30Y and the transport path unit 10. That is, the fourth communication master station 31-4 and the transport path communication subordinate station 11 are connected by a daisy chain, and control data can be transmitted and received between the fourth communication master station 31-4 and the transport path communication subordinate station 11. Even in such a configuration, it can be said that the control controller 30Y transmits and receives control data to and from the transport path communication subordinate station 11 of the transport path unit 10. By adopting a daisy chain, serial communication can be adopted for transmission and reception of control data between the fourth communication master station 31-4 and the transport path communication subordinate station 11, and an increase in communication lines can be prevented.

The first communication master station 31-1 of the position command controller 301X according to the fourth embodiment is configured to transmit generation data toward the first communication subordinate station 32-1. As an example, the first communication master station 31-1 is configured to designate a desired first communication subordinate station 32-1 for the plurality of first communication subordinate stations 32-1A to 32-1C as a communication destination, and transmit the generation data toward the designated first communication subordinate station 32-1. The third communication master station 31-3 of the track controller 303Y is configured to transmit generation data toward the second communication subordinate station 32-2. As an example, the third communication master station 31-3 is configured to designate a desired second communication subordinate station 32-2 for the plurality of second communication subordinate stations 32-2A to 32-2C as a communication destination, and transmit the generation data toward the designated second communication subordinate station 32-2. Further, the plurality of second communication subordinate stations 32-2A to 32-2C are configured to transmit generation data toward the third communication master station 31-3 of the track controller 303Y. Then, the fourth communication master station 31-4 of the track controller 303Y is configured to transmit control data toward the transport path communication subordinate station 11. As an example, the fourth communication master station 31-4 is configured to transmit control data toward a desired transport path communication subordinate station 11 for the plurality of transport path communication subordinate stations 11A to 11H. The fourth communication master station 31-4 of the track controller 303Y is configured to receive control data from the plurality of transport path communication subordinate stations 11.

That is, in the control controller 30Y, the communication master station is divided into the first communication master station 31-1 of the position command controller 301X and the third communication master station 31-3 and the fourth communication master station 31-4 of the track controller 303Y, but the first communication master station 31-1, the third communication master station 31-3, and the fourth communication master station 31-4 implement the same functions as the communication master station 31 described in the first and second embodiments. Hereinafter, the communication master station including the first communication master station 31-1, the third communication master station 31-3, and the fourth communication master station 31-4 may be referred to as the communication master station 31Y. In the control controller 30Y, the communication subordinate station is divided into the first communication subordinate station 32-1 and the second communication subordinate station 32-2 of the drive controller 302Y, but the first communication subordinate station 32-1 and the second communication subordinate station 32-2 implement the same functions as the communication subordinate station 32 described in the first to third embodiments. Hereinafter, the communication subordinate station including the first communication subordinate station 32-1 and the second communication subordinate station 32-2 may be referred to as the communication subordinate station 32Y.

Figure 16:
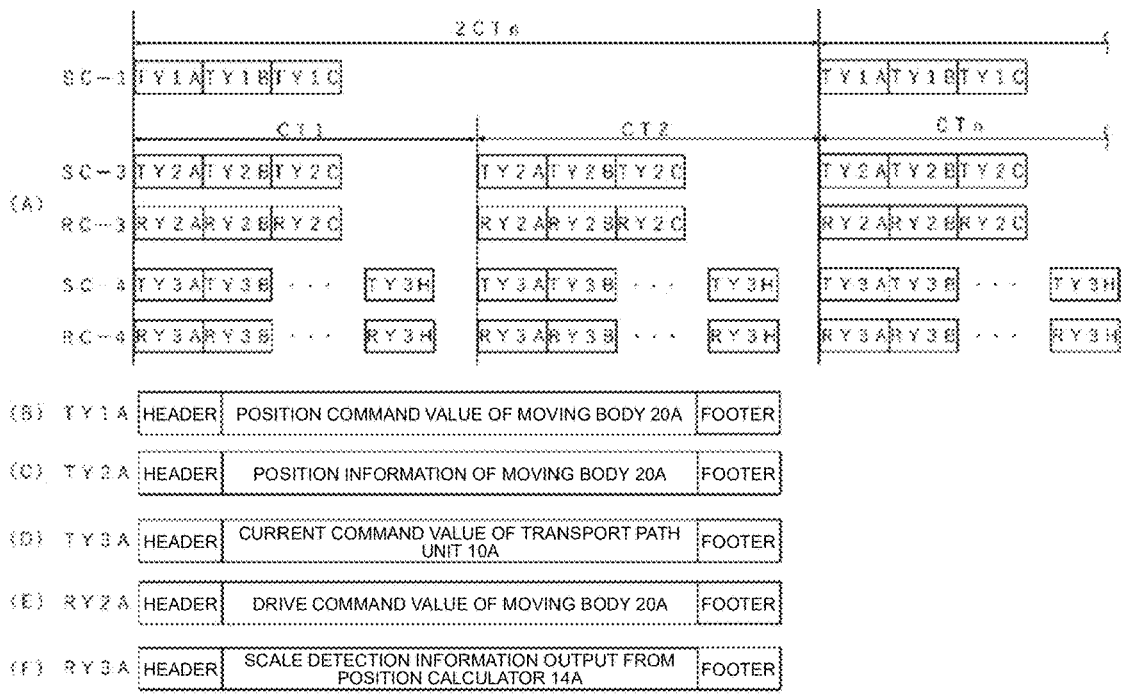
FIG. 16 is a diagram illustrating an example of communication control in the communication master station according to the fourth embodiment.

FIG. 16 is a diagram illustrating an example of communication control in the communication master station according to the fourth embodiment. Communication control of the communication master station regarding transmission and reception with the communication subordinate station 32Y performed by the communication master station 31Y and transmission and reception with the transport path communication subordinate station 11 included in the transport path unit 10 performed by the communication master station 31Y will be specifically described with reference to FIG. 16.

The communication master station 31Y is configured to transmit generation data toward the communication subordinate station 32Y. As an example, the communication master station 31Y is configured to designate a desired communication subordinate station 32Y for the plurality of communication subordinate stations 32Y as a communication destination, and transmit the generation data toward the designated communication subordinate station 32Y. The communication master station 31Y is configured to transmit control data toward the transport path communication subordinate station 11. As an example, the communication master station 31Y is configured to designate a desired transport path communication subordinate station 11 as a communication destination for the plurality of transport path communication subordinate stations 11A to 11H and transmit control data toward the designated transport path communication subordinate station 11. The communication master station 31Y is configured to receive generation data from the plurality of communication subordinate stations 32Y. The communication master station 31Y is configured to receive control data from the plurality of transport path communication subordinate stations 11.

As illustrated in FIG. 16(A), the first communication master station 31-1 constituting the communication master station 31Y transmits generation data including a command value and information for generating control data to the first communication subordinate station 32-1 using a transmission channel SC-1. The third communication master station 31-3 constituting the communication master station 31Y transmits and receives generation data including various command values and information for generating control data to and from the second communication subordinate station 32-2 using a transmission channel SC-3 and a reception channel RC-3. The fourth communication master station 31-4 constituting the communication master station 31Y transmits and receives control data to and from the transport path communication subordinate station 11 using a transmission channel SC-4 and a reception channel RC-4. The first communication master station 31-1 performs communication control so as to transmit generation data including a command value and information for generating control data to the first communication subordinate station 32-1 using a communication frame at an interval of once every two predetermined constant communication cycles CTn (n is a natural number). That is, the communication cycle of the communication performed by the first communication master station 31-1 is set to the communication cycle 2CTn. In addition, the third communication master station 31-3 performs communication control so as to transmit and receive generation data including a command value and information for generating control data to and from the second communication subordinate station 32-2 using a communication frame at an interval of once each predetermined constant communication cycle CTn. The fourth communication master station 31-4 performs communication control so as to transmit and receive control data to and from the transport path communication subordinate station 11 using a communication frame at an interval of once each predetermined constant communication cycle CTn.

Specifically, as illustrated in FIG. 16(A), the first communication master station 31-1 performs the first communication of designating the first communication subordinate station 32-1A as a communication destination and transmitting a communication frame TY1A toward the first communication subordinate station 32-1A using the transmission channel SC-1 within the communication cycle 2CT1. In addition, the first communication master station 31-1 performs the first communication of designating the first communication subordinate station 32-1B as a communication destination and transmitting a communication frame TY1B toward the first communication subordinate station 32-1B, and performs the first communication of designating the first communication subordinate station 32-1C and transmitting a communication frame TY1C toward the first communication subordinate station 32-1C. Similarly to the above-described first embodiment, when the first communication master station 31-1 performs the first communication, if it is not necessary to designate the first communication subordinate stations 32-1A to 32-1C, the first communication master station 31-1 may not designate the first communication subordinate stations 32-1A to 32-1C. The first communication master station 31-1 transmits the communication frames at an interval of once each communication cycle 2CTn, and thus when the communication cycle 2CT2 is started, transmits the communication frames TY1A to TY1C within the communication cycle 2CT2.

In addition, the third communication master station 31-3 performs the first communication of designating the second communication subordinate station 32-2A as a communication destination and transmitting a communication frame TY2A toward the second communication subordinate station 32-2A using the transmission channel SC-3 within the communication cycle CT1. The third communication master station 31-3 performs the first communication of designating the second communication subordinate station 32-2B and transmitting a communication frame TY2B toward the second communication subordinate station 32-2B, and performs the first communication of designating the second communication subordinate station 32-2C and transmitting a communication frame TY2C toward the second communication subordinate station 32-2C. Similarly to the above-described first embodiment, when the third communication master station 31-3 performs the first communication, if it is not necessary to designate the second communication subordinate stations 32-2A to 32-2C, the third communication master station 31-3 may not designate the second communication subordinate stations 32-2A to 32-2C. The third communication master station 31-3 transmits the communication frames at an interval of once each communication cycle CTn, and thus when the communication cycle CT2 is started, transmits the communication frames TY2A to TY2C within the communication cycle CT2.

Within the communication cycle CT1 using the reception channel RC-3, the third communication master station 31-3 receives a communication frame RY2A from the second communication subordinate station 32-2A, receives a communication frame RY2B from the second communication subordinate station 32-2B, and receives a communication frame RY2C from the second communication subordinate station 32-2C. In other words, the second communication subordinate station 32-2A performs the second communication of transmitting the communication frame R1A toward the third communication master station 31-3, the second communication subordinate station 32-2B performs the second communication of transmitting the communication frame R1B toward the third communication master station 31-3, and the second communication subordinate station 32-2C performs the second communication of transmitting the communication frame R1C toward the third communication master station 31-3. The third communication master station 31-3 receives the communication frames at an interval of once each communication cycle CTn, and thus when the communication cycle CT2 is started, receives the communication frames RY2A to RY2C within the communication cycle CT2.

The fourth communication master station 31-4 performs the third communication of designating the transport path communication subordinate station 11A as a communication destination and transmitting a communication frame TY3A toward the designated transport path communication subordinate station 11A using the transmission channel SC-4 within the communication cycle CT1. The fourth communication master station 31-4 performs the third communication of designating the transport path communication subordinate station 11B and transmitting a communication frame TY3B toward the transport path communication subordinate station 11B, and similarly performs the third communication of designating the transport path communication subordinate stations 11C to 11H and transmitting communication frames TY3C to TY3H toward the transport path communication subordinate stations 11C to 11H. Similarly to the above-described first embodiment, when the fourth communication master station 31-4 performs the third communication, if it is not necessary to designate the transport path communication subordinate stations 11A to 11H, the fourth communication master station 31-4 may not designate the transport path communication subordinate stations 11A to 11H. The fourth communication master station 31-4 transmits the communication frames at an interval of once each communication cycle CTn, and thus when the communication cycle CT2 is started, transmits the communication frames TY3A to TY3H within the communication cycle CT2.

In addition, the fourth communication master station 31-4 receives a communication frame RY3A from the transport path communication subordinate station 11A, transmits a communication frame RY3B from the transport path communication subordinate station 11B, and similarly receives communication frames RY3C to RY3H from the transport path communication subordinate stations 11C to 11H, respectively, using the reception channel RC-4 within the communication cycle CT1. In other words, the transport path communication subordinate station 11A performs the sixth communication of transmitting the communication frame R2A toward the communication master station 31, the transport path communication subordinate station 11B performs the sixth communication of transmitting the communication frame R2B toward the communication master station 31, and similarly, the transport path communication subordinate stations 11C to 11H perform the sixth communication of transmitting the communication frames R2C to R2H toward the communication master station 31. The fourth communication master station 31-4 receives the communication frames at an interval of once each communication cycle CTn, and thus when the communication cycle CT2 is started, receives the communication frames RY3A to RY3H within the communication cycle CT2.

The communication master station 31Y performs control to divide each communication cycle CTn into time slots and transmit each communication frame in a time division manner.

As illustrated in FIG. 16(B), the communication frame TY1A transmitted from the first communication master station 31-1 toward the first communication subordinate station 32-1A includes a header, a footer, and a payload. The communication frame TY1A is a communication frame for transmitting the generation data toward the first communication subordinate station 32-1A. In the communication frame TY1A, designation information (destination address, etc.) of the first communication subordinate station 32-1A is attached as a header, and the first communication subordinate station 32-1A is designated by the information on the header. The payload includes a position command value of the moving body 20A. In the footer, frame check sequence data and the like are attached for confirming that the communication frame has been accurately received at the reception destination. The communication frames TY1B and TY1C are communication frames for transmitting the generation data toward the first communication subordinate stations 32-1B and 32-1C. In the communication frames TY1B and TY1C, designation information (destination address, etc.) of the first communication subordinate stations 32-1B and 32-1C is attached as a header, and the first communication subordinate stations 32-1B and 32-1C are designated by the information on the header. The payload includes position command values of the moving bodies 20B and 20C. Frame check sequence data and the like are attached to the footer. Consequently, the communication master station 31Y can designate a desired communication subordinate station 32Y as a communication destination and transmit the generation data toward the designated communication subordinate station 32Y.

As illustrated in FIG. 16(C), the communication frame TY2A transmitted from the third communication master station 31-3 toward the second communication subordinate station 32-2A includes a header, a footer, and a payload. The communication frame TY2A is a communication frame for designating the second communication subordinate station 32-2A and transmitting the generation data toward the second communication subordinate station 32-2A. In the communication frame TY2A, designation information (destination address, etc.) of the second communication subordinate station 32-2A is attached as a header, and the second communication subordinate station 32-2A is designated by the information on the header. The communication frame TY2A includes position information on the moving body 20A as a payload. In the footer, frame check sequence data and the like are attached for confirming that the communication frame has been accurately received at the reception destination. The communication frames TY2B and TY2C are communication frames for transmitting the generation data toward the second communication subordinate stations 32-2B and 32-2C, respectively. The communication frames TY2B and TY2C have designation information on the second communication subordinate stations 32-2B and 32-2C attached as a header, and include position information on the moving bodies 20B and 20C as a payload, respectively. Frame check sequence data and the like are attached to the footer. Consequently, the communication master station 31Y can designate a desired communication subordinate station 32Y and transmit the generation data toward the designated communication subordinate station 32Y.

Next, as illustrated in FIG. 16 (D), the communication frame TY3A transmitted by the fourth communication master station 31-4 toward the transport path communication subordinate station 11A includes a header, a footer, and a payload. The communication frame TY3A is a communication frame for designating the transport path communication subordinate station 11A and transmitting the control data toward the transport path communication subordinate station 11A. In the communication frame TY3A, designation information (destination address, etc.) of the transport path communication subordinate station 11A is attached as a header, and the transport path communication subordinate station 11A is designated by the information on the header. The payload includes current command values for controlling energization or de-energization for all the coils 121A included in the transport path unit 10A including the transport path communication subordinate station 11A. In the footer, frame check sequence data and the like are attached for confirming that the communication frame has been accurately received at the reception destination. The communication frames TY3B to TY3H are communication frames for transmitting current command values for controlling energization or non-energization for all the coils 121B to 121H respectively included in the transport path units 10B to 10H including the transport path communication subordinate stations 11B to 11H toward the transport path communication subordinate stations 11B to 11H. In the communication frames TY3B to TY3H, designation information on the transport path communication subordinate stations 11B to 11H is attached as a header, and the transport path units 10B to 10H are designated by the information on the header. The payload includes current command values for controlling energization or de-energization for all the coils 121B to 121H respectively included in the transport path units 10B to 10H including the transport path communication subordinate stations 11B to 11H. Frame check sequence data and the like are attached to the footer. Consequently, the communication master station 31Y can designate a desired transport path communication subordinate station 11 and transmit the control data toward the designated communication transport path communication subordinate station 11.

As illustrated in FIG. 16(E), the communication frame RY2A received by the third communication master station 31-3 from the second communication subordinate station 32-2A includes a header, a footer, and a payload. The communication frame RY2A is a communication frame for transmitting the generation data from the second communication subordinate station 32-2A. The communication frame RY2A has designation information (destination address, etc.) of the third communication master station 31-3 attached as a header, and includes a drive command value of the moving body 20A as a payload. In the footer, frame check sequence data and the like are attached for confirming that the communication frame has been accurately received at the reception destination. The communication frames RY2B and RY2C are communication frames for transmitting generation data from the second communication subordinate stations 32-2B and 32-2C, have designation information on the third communication master station 31-3 attached as a header, and include drive command values of the moving bodies 20B and 20C as payloads. Frame check sequence data and the like are attached to the footer. Consequently, each of the communication subordinate stations 32Y can transmit the generation data toward the communication master station 31Y, and the communication master station 31Y can receive the generation data from each of the plurality of communication subordinate stations 32Y.

Next, as illustrated in FIG. 16(F), the communication frame RY3A received by the fourth communication master station communication 31-4 from the transport path communication subordinate station 11A includes a header, a footer, and a payload. The communication frame RY3A is a communication frame for transmitting control data from the transport path communication subordinate station 11A, has designation information (destination address, etc.) of the fourth communication master station 31-4 attached as a header, and includes, as a payload, scale detection information indicating relative positions of the moving body 20A with respect to all the position sensors 131A output by the position calculator 14A included in the transport path unit 10A including the transport path communication subordinate station 11A. In the footer, frame check sequence data and the like are attached for confirming that the communication frame has been accurately received at the reception destination. The communication frames RY3B to RY3H are communication frames for transmitting, from the transport path communication subordinate stations 11B to 11H, the scale detection information output by the position calculators 14B to 14H respectively included in the transport path units 10B to 10H including the transport path communication subordinate stations 11B to 11H, have designation information on the fourth communication master station 31-4 attached as a header, and include the scale detection information calculated by the position calculator 14B to the scale detection information calculated by the position calculator 14H as payloads. Frame check sequence data and the like are attached to the footer. Consequently, each of the transport path communication subordinate stations 11 can transmit the control data toward the communication master station 31Y, and the communication master station 31Y can receive the control data from the plurality of transport path communication subordinate stations 11.

In the transport system 1Y disclosed in the fourth embodiment, the communication master station 31Y includes the first communication master station 31-1, the third communication master station 31-3, and the fourth communication master station 31-4, and the communication subordinate station 32Y includes the first communication subordinate station 32-1 and the second communication subordinate station 32-2. Then, the communication master station 31Y is subjected to communication control as described above. Consequently, the first communication subordinate station 32-1 and the first communication master station 31-1 are single master communication control, the second communication subordinate station 32-2 and the third communication master station are single master communication control, and the transport path communication subordinate station 11 and the fourth communication master station 31-4 are single master communication control. In the transport system 1Y disclosed in the fourth embodiment, since the communication of generation data and control data can be configured by single master communication control, the complexity of the communication control can be reduced. In addition, since the transport system 1Y is single master communication control, for example, the communication control between the first communication master station 31-1 and the first communication subordinate station 32-1, the communication control between the third communication master station and the second communication subordinate station 32-2, and the communication control between the fourth communication master station 31-4 and the transport path communication subordinate station 11 can be configured independently, and each communication cycle can be easily changed. Therefore, the transport system 1Y can prevent deterioration in the control performance of the moving body 20 due to the influence of processing with a long calculation time in calculation processing in the control controller 30Y or the transport path unit 10.

In FIG. 16(A), the first communication master station 31-1 that performs the first communication of transmitting the position command value of the moving body 20 transmits a communication frame once each communication cycle 2CTn that is twice the communication cycle CTn, and the third communication master station 31-3 that performs the second communication and the fourth communication master station 31-4 that performs the third communication transmit a communication frame once each communication cycle CTn. That is, the communication cycle of the first communication of transmitting the position command value of the moving body 20 is different from the communication cycles of the second communication and the third communication, and is set longer than the communication cycle of the second communication and the third communication. Consequently, the number of times of transmission of the position information on the moving body 20, the drive command value of the moving body 20, and the current command value of the transport path unit 10 is larger than that of the position command value of the moving body 20, and the movement control of the moving body 20 can be performed more accurately.

FIG. 16(A) illustrates an example in which the first communication master station 31-1 transmits a communication frame once in the communication cycle 2CTn, and the third communication master station 31-3 and the fourth communication master station 31-4 transmit and receive a communication frame once in each communication cycle CTn, but it goes without saying that the communication control is not limited to such communication control. For example, the same communication cycle may be adopted for all the communication cycles in which the communication frames of the first communication master station 31-1, the third communication master station 31-3, and the fourth communication master station 31-4 are transmitted and received, or different communication cycles may be adopted for all the channels.

Figure 17:
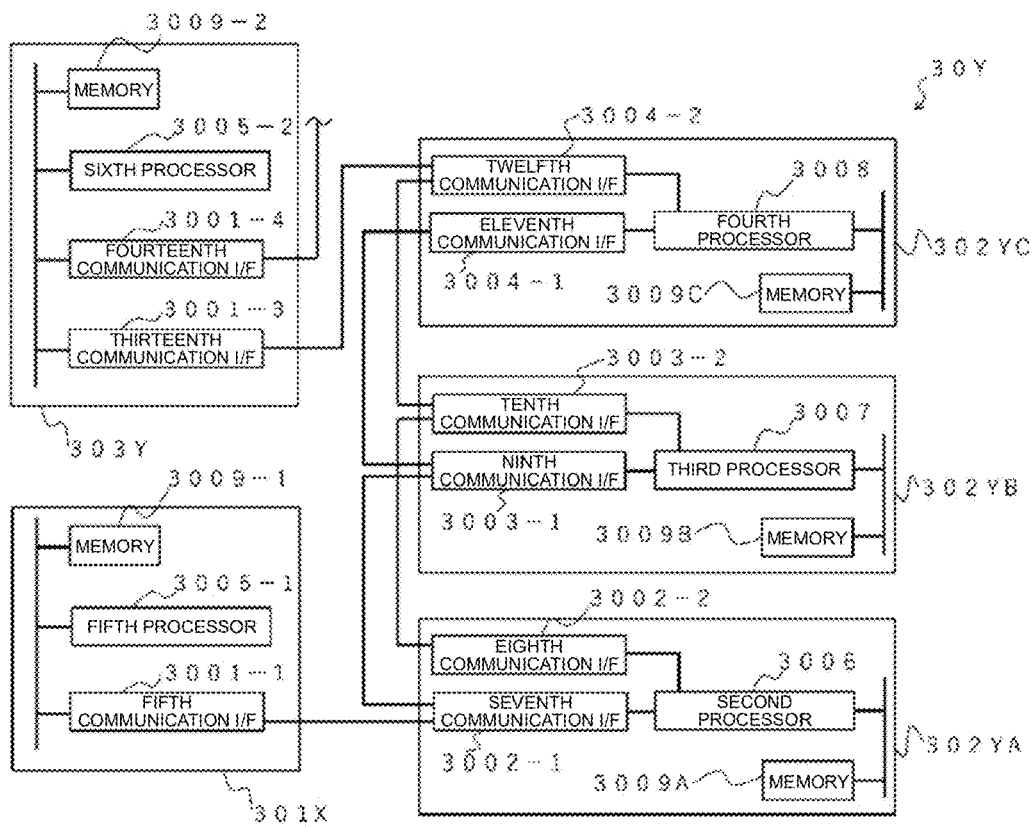
FIG. 17 is a diagram illustrating an exemplary hardware configuration of the control controller according to the fourth embodiment.

FIG. 17 is a diagram illustrating an exemplary hardware configuration of the control controller according to the fourth embodiment. The hardware of the control controller 30Y is divided into the position command controller 301X, the drive controller 302Y, and the track controller 303Y. The position command controller 301X includes the fifth communication interface (fifth communication I/F) 3001-1 that functions as the first communication master station 31-1, the fifth processor 3005-1 that functions as the position command generator 33, and the memory 3009-1 that reads and writes various data used for each calculation in the fifth processor 3005-1.

The drive controller 302YA includes a seventh communication interface (seventh communication I/F) 3002-1 that functions as the first communication subordinate station 32-1A, an eighth communication interface (eighth communication I/F) 3002-2 that functions as the second communication subordinate station 32-2A, the second processor 3006 that functions as the position controller 35A, and the memory 3009A that reads and writes various data used for each calculation in the second processor 3006. The drive controller 302YB includes a ninth communication interface (ninth communication I/F) 3003-1 that functions as the first communication subordinate station 32-1B, a tenth communication interface (tenth communication I/F) 3003-2 that functions as the second communication subordinate station 32-2B, the third processor 3007 that functions as the position controller 35B, and the memory 3009B that reads and writes various data used for each calculation in the third processor 3007. The drive controller 302YC includes an eleventh communication interface (eleventh communication I/F) 3004-1 that functions as the first communication subordinate station 32-1C, a twelfth communication interface (twelfth communication I/F) 3004-2 that functions as the second communication subordinate station 32-2C, the fourth processor 3008 that functions as the position controller 35C, and the memory 3009C that reads and writes various data used for each calculation in the fourth processor 3008.

The track controller 303Y includes a thirteenth communication interface (thirteenth communication I/F) 3001-3 that functions as the third communication master station 31-3, a fourteenth communication interface (fourteenth communication I/F) 3001-4 that functions as the fourth communication master station 31-4, the sixth processor 3005-2 that functions as the position generator 34 and the current command generator 36, and the memory 3009-2 that reads and writes various data used for each operation in the sixth processor 3005-2.

Since the second processor 3006 to the fourth processor 3008 are similar to those in the first embodiment described above, the description thereof will be omitted. Since 3009A to 3009C are similar to those in the second embodiment described above, the description thereof will be omitted. Since the fifth processor 3005-1 is similar to that in the third embodiment described above, the description thereof will be omitted. The memories 3009-1 and 3009-2 are similar to those in the third embodiment described above, the description thereof will be omitted.

In the hardware configuration of the track controller 303Y in FIG. 17, the processor functioning as the position generator 34 and the current command generator 36 is illustrated as the sixth processor 3005-2 as an example. However, the hardware configuration may include a plurality of processors such as a processor functioning as the position generator 34 and a processor functioning as the current command generator 36.

Figure 18:
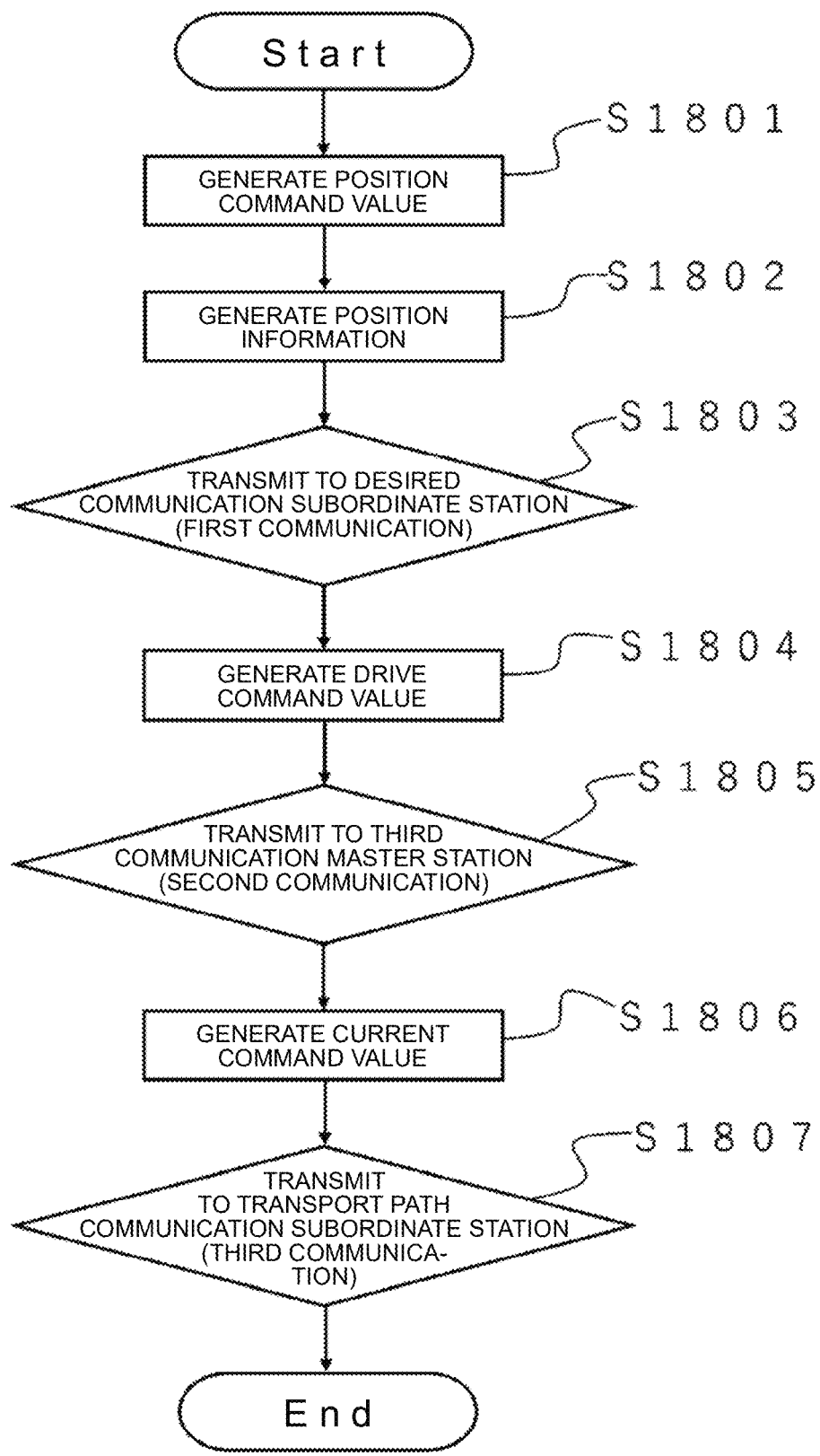
FIG. 18 is a flowchart illustrating an example of the operation of the control controller according to the fourth embodiment.

FIG. 18 is a flowchart illustrating an example of the operation of the control controller according to the fourth embodiment of the present disclosure. The operation of the control controller 30Y will be described with reference to FIG. 18.

In step S1801 illustrated in FIG. 18, the position command generator 33 of the position command controller 301X constituting the control controller 30Y generates the position command value of each of the three moving bodies 20A, 20B, and 20C included in the transport system 1Y. Then, the position command generator 33 outputs the generated position command value of each of the moving bodies 20A, 20B, and 20C to the first communication master station 31-1 of the position command controller 301X.

In step S1802, the position generator 34 of the track controller 303Y of the control controller 30Y generates the position information on each of the moving bodies 20A, 20B, and 20C indicating the positions of the moving bodies 20A, 20B, and 20C on the transport route based on the scale detection information included in the control data received from the transport path units 10A to 10H using the communication frames RY3A to RY3H. Then, the position generator 34 outputs the generated position information on each of the moving bodies 20A, 20B, and 20C to the third communication master station 31-3 of the track controller 303Y.

In step S1803, the first communication master station 31-1 performs the first communication of transmitting the acquired position command value of each of the moving bodies 20A, 20B, and 20C toward the first communication subordinate station 32-1. The third communication master station 31-3 performs the first communication of transmitting the acquired position information on each of the moving bodies 20A, 20B, and 20C toward the second communication subordinate station 32-2. Specifically, the first communication master station 31-1 transmits the position command value of the moving body 20A toward the first communication subordinate station 32-1A using the communication frame TY1A, transmits the position command value of the moving body 20B toward the communication subordinate station 32B using the communication frame TY1B, and transmits the position command value of the moving body 20C toward the communication subordinate station 32C using the communication frame TY1C. On the other hand, the third communication master station 31-3 transmits the position information on the moving body 20A toward the second communication subordinate station 32-2A using the communication frame TY2A, transmits the position information on the moving body 20B toward the second communication subordinate station 32-2B using the communication frame TY2B, and transmits the position information on the moving body 20C toward the second communication subordinate station 32-2C using the communication frame TY2C. The communication cycle of the first communication performed by the first communication master station 31-1 may be different from the communication cycles of the second communication and the third communication.

In step S1804, the position controllers 35A, 35B, and 35C of the drive controllers 302YA, 302YB, and 302YC respectively generate the drive command values of the moving bodies 20A, 20B, and 20C based on the position command values of the moving bodies 20A, 20B, and 20C received by the first communication subordinate stations 32-1A, 32-1B, and 32-1C, respectively, and the position information received by the second communication subordinate stations 32-2A, 32-2B, and 32-2C. Then, the position controllers 35A, 35B, and 35C output the generated drive command values of the moving bodies 20A, 20B, and 20C to the second communication subordinate stations 32-2A, 32-2B, and 32-2C, respectively. Specifically, the position controller 35A acquires the position command value of the moving body 20A from the first communication subordinate station 32-1A connected via the internal bus, and acquires the position information on the moving body 20A from the second communication subordinate station 32-2A connected via the internal bus. The position controller 35A generates a drive command value of the moving body 20A based on the position command value and the position information on the moving body 20A, and outputs the generated drive command value of the moving body 20A to the second communication subordinate station 32-2A. Similarly, the position controllers 35B and 35C generate a drive command value of the moving body 20B and a drive command value of the moving body 20C, respectively, and output the drive command values to the second communication subordinate stations 32-2B and 32-2C connected via the internal bus, respectively.

In step S1805, the second communication subordinate stations 32-2A, 32-2B, and 32-2C of the drive controllers 302YA, 302YB, and 302YC perform the second communication of transmitting the acquired drive command values of the moving bodies 20A, 20B, and 20C toward the third communication master station 31-3. Specifically, the communication subordinate station 32A transmits the drive command value of the moving body 20 toward the third communication master station 31-3 using the communication frame RY2A including a header, a footer, and a payload. In addition, the second communication subordinate stations 32-2B and 32-2C similarly transmit the drive command value of the moving body 20B and the drive command value of the moving body 20C toward the third communication master station 31-3 using the communication frames RY2B and RY2C.

In step S1806, the current command generator 36 of the track controller 303Y generates the current command values of the transport path units 10A to 10H based on the position information on the moving bodies 20A, 20B, and 20C generated by the position generator 34 and the drive command values of the moving bodies 20A, 20B, and 20C received by the third communication master station 31-3. Note that the position information on the moving bodies 20A, 20B, and 20C can be read and acquired from a memory included in the track controller 303Y. The current command generator 36 acquires the drive command value of the moving body 20A, the drive command value of the moving body 20B, and the drive command value of the moving body 20C from the third communication master station 31-3 connected via the internal bus. Then, the current command generator 36 acquires the position information on the moving body 20A, the position information on the moving body 20B, and the position information on the moving body 20C from the memory of the track controller 303Y. The current command generator 36 generates current command values of the transport path units 10A to 10H based on the drive commands and the position information on the moving bodies 20A, 20B, and 20C, and outputs the current command values to the fourth communication master station 31-4. Since the generation of the current command values by the current command generator 36 is performed similarly to the first embodiment, a detailed description thereof will be omitted.

In step S1807, the fourth communication master station 31-4 of the track controller 303Y performs the third communication of transmitting the acquired current command value of each of the transport path units 10A to 10H toward the transport path communication subordinate station 11. Specifically, the fourth communication master station 31-4 transmits the current command values of the transport path unit 10A toward the transport path communication subordinate station 11A using the communication frame TY3A including a header, a footer, and a payload. Similarly, the fourth communication master station 31-4 transmits the current command values of the transport path units 10B to 10H toward the transport path communication subordinate stations 11B to 11H using the communication frames TY3B to TY3H.

The transport path unit 10 according to the fourth embodiment operates in the same manner as the operations described in steps S801 to S804 described with reference to FIG. 8 in the above-described first embodiment, and controls the moving body 20 in the transport system 1Y. The transport path unit 10 according to the fourth embodiment performs a different operation in step S805, which will be described below.

FIG. 19 is a flowchart illustrating an example of the operation of the transport path unit according to the fourth embodiment. The transport path unit 10 according to the fourth embodiment operates in the same manner as in steps S801 to S804, and then performs step S1905 illustrated in FIG. 19. In step S1905, the transport path communication subordinate station 11 of each transport path unit 10 performs the sixth communication of transmitting the acquired scale detection information toward the fourth communication master station 31-4. Specifically, the transport path communication subordinate station 11A transmits the scale detection information calculated by the position calculator 14A of the transport path unit 10A toward the fourth communication master station 31-4 included in the control controller 30Y using the communication frame RY3A including a header, a footer, and a payload. Similarly, the transport path communication subordinate stations 11B to 11H of the transport path units 10B to 10H sequentially transmit the scale detection information calculated by the position calculators 14B to 14H of the transport path units 10B to 10H toward the fourth communication master station 31-4 of the control controller 30Y using the communication frames RY3B to RY3H.

As described above, the control controller 30Y according to the fourth embodiment is configured to function similarly to the control controllers 30, 30W, and 30X by the first communication master station 31-1, the third communication master station 31-3, and the fourth communication master station 31-4 functioning similarly to the above-described communication master station 31. Therefore, as in the first to third embodiments described above, even when the moving body 20 moving in the transport system 1Y is located at the boundary between the transport path units 10, the movement of the moving body 20 can be controlled with high accuracy, and an increase in the cost of the electric circuits such as the inverter circuit 122 included in one drive element can be prevented. In addition, the transport system 1Y according to the fourth embodiment does not need to include the position controller 35 in each of the transport path units 10, and the number of drive controllers 302Y including the position controllers 35 can be equal to or less than the number of moving bodies 20 at a maximum, so that it is possible to prevent an increase in the size and cost of the control system of the control controller 30Y and the transport path unit 10. In addition, in the transport system 1Y, since the moving body 20 is always allocated to a predetermined position controller 35, processing of allocating control of the moving body 20 during operation of the transport system 1Y is unnecessary. Therefore, the transport system 1Y according to the fourth embodiment can prevent the control of the moving body 20 of the transport system 1Y from stopping without increasing the size and cost of the control system.

Further, in the transport system 1Y according to the fourth embodiment, the position command controller 301X, the drive controller 302Y, and the track controller 303Y constitute the control controller 30Y. The position command controller 301X is configured to generate a position command value of the moving body 20 moving along the transport route of the transport system 1Y. The drive controller 302Y is configured to generate a drive command value of the allocated moving body 20. The track controller 303Y is configured to generate position information on the moving body 20 moving along the transport route of the transport system 1Y and current command values of all the transport path units 10 constituting the transport route of the transport system 1Y. Thus, the control controller 30Y is divided into the three controllers of the position command controller 301X, the drive controller 302Y, and the track controller 303Y, so that the control load of one controller can be reduced and the control delay as the control controller 30Y can be prevented.

In addition, the control controller 30Y connects the position command controller 301X and the drive controller 302Y via the third communication line 80, and connects the track controller 303Y and the drive controller 302 via the fourth communication line 100. Thus, the control controller 30Y can widen the communication band by separating the communication lines for transmitting and receiving the generation data, and can shorten the communication cycle between the position command controller 301X and the drive controller 302Y and the communication cycle between the track controller 303Y and the drive controller 302Y. Therefore, the control controller 30Y can prevent the control delay and improve the control performance of the moving body 20.

In addition, in the control controller 30Y, the drive controller 302Y and the position command controller 301X are connected by the third communication line 80, and the drive controllers 302Y are connected by the first drive controller communication line 91 and the second drive controller communication line 92, so that the number of drive controllers 302Y can be easily changed as in the above-described second and third embodiments. Therefore, even when the number of moving bodies 20 moving on the transport route of the transport system 1Y is changed, the control system configuration of the transport system 1Y can be easily changed by changing the number of drive controllers 302Y. That is, the transport system 1Y according to the fourth embodiment can provide a transport system that can facilitate system expansion and change.

In the transport system 1Y according to the fourth embodiment, as described above, the first communication subordinate station 32-1 and the first communication master station 31-1 are single master communication control, the second communication subordinate station 32-2 and the third communication master station are single master communication control, and the transport path communication subordinate station 11 and the fourth communication master station 31-4 are single master communication control. In the transport system 1Y according to the fourth embodiment, since the communication of generation data and control data can be configured by the single master communication control, the complexity of the communication control can be reduced as described above, each communication cycle can be easily changed, and deterioration in the control performance of the moving body 20 can be prevented due to the influence of processing with a long calculation time in calculation processing in the control controller 30Y or the transport path unit 10.

Fifth Embodiment

A transport system according to the fifth embodiment of the present disclosure will be described. Note that components similar to those of the first and fourth embodiments are denoted by the same reference signs, and a detailed description thereof is omitted. Hereinafter, configurations different from those of the first to fourth embodiments will be specifically described.

FIG. 20 is a schematic diagram illustrating an exemplary configuration of the transport system according to the fifth embodiment of the present disclosure. As illustrated in FIG. 20, similarly to the first embodiment, the transport system 1Z includes the plurality of transport path units 10A to 10H constituting a transport route for the plurality of moving bodies 20A to 20C, and the power supply unit 40 that supplies power to the transport path units 10A to 10H. Note that the transport system 1Z according to the fifth embodiment includes a control controller 30Z that controls the operations of the plurality of moving bodies 20A to 20C instead of the control controller 30, 30W, 30X, or 30Y. Unlike the control controller 30, the control controller 30Z includes a position command controller 301Z and a drive controller 302Z. That is, the position command controller 301Z and the drive controller 302Z are configured as separate housings, and these controllers operate so as to function as the control controller 30Z.

As illustrated in FIG. 20, the position command controller 301Z includes the communication master station 31, the position command generator 33, and the position generator 34. The position command generator 33 and the position generator 34 are connected to the communication master station 31 via an internal bus in the position command controller 301Z. The communication master station 31, the position command generator 33, and the position generator 34 have functions similar to those in the above-described first embodiment, the position command generator 33 generates a position command value of the moving body 20, and the position generator 34 generates position information on the moving body 20. Each of the position command value of the moving body 20 and the position information on the moving body 20 is an example of generation data.

The drive controller 302Z includes the communication subordinate station 32, the position controller 35, and a current command generator 36Z. The position controller 35 and the current command generator 36Z are connected to the communication subordinate station 32 via an internal bus in the drive controller 302Z. The communication subordinate station 32 and the position controller 35 have functions similar to those in the above-described first embodiment, and the position controller 35 generates a drive command value of the moving body 20. Unlike the current command generator 36 described in the first embodiment, the current command generator 36Z is configured to generate a current command value of the transport path unit 10 in which the moving body 20 is located. The drive command value of the moving body 20 is an example of generation data, and the current command value of the transport path unit 10 is an example of control data.

Here, differences between the current command generator 36Z and the above-described current command generator 36 will be described. The current command generator 36Z is configured as an arithmetic circuit that generates a current command value of the transport path unit 10 in which the moving body 20 of the transport system 1Z is located based on the drive command value of the moving body 20 and the position information on the moving body 20. Specifically, when the moving bodies 20A, 20B, and 20C are located at the positions illustrated in FIG. 20, the current command generator 36Z generates current command values for all the coils 121A included in the transport path unit 10A, generates current command values for all the coils 121C and 121D included in the transport path units 10C and 10D, and generates current command values for all the coils 121E and 121F included in the transport path units 10E and 10F. Although the current command generator 36Z is different from the current command generator 36 in terms of a target of current command value generation, the arithmetic expression described in the first embodiment can be used as the arithmetic expression for generating a current command value, and thus the description of the calculation of the current command value is omitted.

The drive controller 302Z is a controller that generates a drive command value of the moving body 20 based on the position command value of the moving body 20 and the position information on the moving body 20, and generates a current command value of the transport path unit 10 in which the moving body 20 is located on the transport route of the transport system 1Z based on the drive command value of the moving body 20 and the position information on the moving body 20. In the fourth embodiment, the drive controller 302Z includes three drive controllers 302ZA, 302ZB, and 302ZC as illustrated in FIG. 20.

The drive controller 302ZA includes the communication subordinate station 32A, the position controller 35A, and a current command generator 36ZA, the drive controller 302ZB includes the communication subordinate station 32B, the position controller 35B, and a current command generator 36ZB, and the drive controller 302ZC includes the communication subordinate station 32C, the position controller 35C, and a current command generator 36ZC. The drive controllers 302ZA, 302ZB, and 302ZC, the communication subordinate stations 32A, 32B, and 32C, the position controllers 35A, 35B, and 35C, and the current command generators 36ZA, 36ZB, and 36ZC may be simply referred to as the drive controller 302Z, the communication subordinate station 32, the position controller 35, and the current command generator 36Z in a case where it is not necessary to distinguish therebetween. The position controller 35 of the drive controller 302Z is allocated to the moving body 20 provided in the transport system 1Z, and is configured to generate a drive command value of the allocated moving body 20. The current command generator 36Z is configured to generate the current command value based on the drive command value generated by the position controller 35 included in the drive controller 302Z including the current command generator 36Z and the position information on the moving body 20 to which the position controller 35 is allocated.

The fifth embodiment describes an example of a form in which the transport system 1Z includes the three moving bodies 20A, 20B, and 20C, and one position controller 35 is allocated to one moving body 20. Specifically, the position controller 35A is allocated to generate a drive command value of the moving body 20A, the position controller 35B is allocated to generate a drive command value of the moving body 20B, and the position controller 35C is allocated to generate a drive command value of the moving body 20C. Then, the current command generator 36ZA generates a current command value of the transport path unit 10 in which the moving body 20A is located in the transport system 1Z based on the drive command value of the moving body 20A and the position information on the moving body 20A. The current command generator 36ZB generates a current command value of the transport path unit 10 in which the moving body 20B is located in the transport system 1Z based on the drive command value of the moving body 20B and the position information on the moving body 20B. The current command generator 36ZC generates a current command value of the transport path unit 10 in which the moving body 20C is located in the transport system 1Z based on the drive command value of the moving body 20C and the position information on the moving body 20C. Thereafter, the current command generator 36ZA outputs the generated current command value to the communication subordinate station 32A, the current command generator 36ZB outputs the generated current command value to the communication subordinate station 32B, and the current command generator 36ZC outputs the generated current command value to the communication subordinate station 32C.

That is, the drive controller 302Z is a controller that generates a drive command value of the moving body 20 allocated to the position controller 35 included in the drive controller 302Z, and generates a current command value of the transport path unit 10 in which the moving body 20 is located in the transport system 1Z based on the drive command value generated by the position controller 35 and the position information on the moving body 20 allocated to the position controller.

Note that the number of moving bodies 20 to be allocated to the position controller 35 of the drive controller 302Z can be freely determined, and can be set before the transport system 1Z is operated. As illustrated in FIG. 20, in a case where the transport system 1Z includes the three moving bodies 20A, 20B, and 20C, for example, all of the three moving bodies 20A, 20B, and 20C may be allocated to one position controller 35. In this case, the control controller 30Z only needs to include one drive controller 302Z. In addition, for example, in a case where the transport system 1Z includes nine moving bodies, the control controller 30Z may include nine drive controllers 302Z and allocate one moving body to the position controller 35 of one drive controller 302Z to allocate the nine moving bodies to the position controllers 35 of the nine drive controllers 302Z, may include three drive controllers 302Z and allocate three moving bodies to the position controller 35 of one drive controller 302Z to allocate the nine moving bodies to the position controllers 35 of the three drive controllers 302Z, or may include one drive controller 302Z and allocate nine moving bodies to the position controller 35 of one drive controller 302Z to allocate the nine moving bodies to the position controller 35 of one drive controller 302Z. That is, the drive controller 302Z can be provided as many as the number of moving bodies 20 provided in the transport system 1Z at a maximum as the entire transport system 1Z.

In addition, the number of communication subordinate stations 32 and position controllers 35 included in one drive controller 302Z can be freely configured, and can be determined when designing the hardware of the drive controller 302Z. For example, one communication subordinate station 32 and a plurality of position controllers 35 may be included in one drive controller 302Z, and one communication subordinate station 32 and each of the plurality of position controllers 35 may be connected via an internal bus. In addition, a plurality of communication subordinate stations 32 and a plurality of position controllers 35 may be included in one drive controller 302Z, the communication subordinate station 32 and the position controller 35 may be connected by an internal bus, and the communication subordinate stations 32 may be connected by an internal bus. Even with such a configuration, the drive controller 302Z can be provided as many as the number of moving bodies 20 provided in the transport system 1Z at a maximum as the entire transport system 1Z.

Here, connection between the communication master station 31 of the position command controller 301Z, the communication subordinate station 32 of the drive controller 302Z, and the transport path communication subordinate station 11 of the transport path unit 10 in the control controller 30Z according to the fifth embodiment will be described. In the transport system 1Z of the fifth embodiment, the position command controller 301Z and the drive controller 302Z constituting the control controller 30Z are connected via the third communication line 80. The drive controllers 302Z are connected to each other via the drive controller communication line 90. The control controller 30Z and the transport path unit 10 are connected via the first communication line 50.

Specifically, as illustrated in FIG. 20, the communication master station 31 of the position command controller 301Z is connected to the communication subordinate station 32A of the drive controller 302ZA via the third communication line 80. The communication subordinate station 32A of the drive controller 302ZA is connected to the communication subordinate station 32B of the drive controller 302ZB via the drive controller communication line 90. The communication subordinate station 32B of the drive controller 302ZB is connected to the communication subordinate station 32C of the drive controller 302ZC via the drive controller communication line 90. Consequently, the position command controller 301Z and the drive controller 302Z can communicate with each other to constitute the control controller 30Z. The communication master station 31 of the position command controller 301Z and the communication subordinate stations 32A, 32B, and 32C of the drive controllers 302ZA, 302ZB, and 302ZC are connected by a daisy chain, and generation data and control data including various command values and information for generating control data and control data can be transmitted and received between the communication master station 31 and the communication subordinate station 32. By adopting such a daisy chain, serial communication can be adopted for transmission and reception of generation data between the communication master station 31 and the communication subordinate station 32, and an increase in communication lines can be prevented. In addition, the communication subordinate station 32C of the drive controller 302ZC is connected to the transport path communication subordinate station 11A of the transport path unit 10A via the first communication line 50. Consequently, the control controller 30Z and the transport path unit 10 form a communication network that allows for communication with each other.

Then, in the configuration in which the communication master station 31 and the communication subordinate station 32 are connected by a daisy chain as illustrated in FIG. 20, the communication master station 31 transmits and receives generation data and control data to and from the communication subordinate station 32A via the third communication line 80 connecting the communication master station 31 and the communication subordinate station 32A. The communication master station 31 transmits and receives generation data and control data to and from the communication subordinate station 32B via the third communication line 80 connecting the communication master station 31 and the communication subordinate station 32A, the communication subordinate station 32A, and the drive controller communication line 90 connecting the communication subordinate station 32A and the communication subordinate station 32B. In other words, the communication subordinate station 32B performs transmission and reception with the communication master station 31 via the communication subordinate station 32A. The communication master station 31 transmits and receives generation data and control data to and from the communication subordinate station 32C via the third communication line 80 connecting the communication master station 31 and the communication subordinate station 32A, the communication subordinate station 32A, the drive controller communication line 90 connecting the communication subordinate station 32A and the communication subordinate station 32B, the communication subordinate station 32B, and the drive controller communication line 90 connecting the communication subordinate station 32B and the communication subordinate station 32C. In other words, the communication subordinate station 32C performs transmission and reception with the communication master station 31 via the communication subordinate station 32A and the communication subordinate station 32B. Even in such a configuration, it can be said that the communication master station 31 transmits and receives generation data to and from the communication subordinate stations 32A, 32B, and 32C. In addition, the communication master station 31 is configured to include two channels: a transmission channel and a reception channel.

As illustrated in FIG. 20, the communication subordinate station 32C is connected to the communication subordinate station 32B and is connected to the first communication line 50 connected to the transport path unit 10. Specifically, the communication subordinate station 32C included in the drive controller 302ZC and the transport path communication subordinate station 11 included in the transport path unit 10 are connected via the first communication line 50, thereby forming a communication network for transmitting and receiving control data between the control controller 30Z and the transport path unit 10. That is, the communication subordinate station 32 and the transport path communication subordinate station 11 are connected by a daisy chain, and control data can be transmitted and received between the communication master station 31 and the transport path communication subordinate station 11 via the communication subordinate station 32.

Note that the control controller 30Z does not necessarily need to connect the communication subordinate station 32C of the drive controller 302ZC and the first communication line 50, and only needs to be able to form a communication network for transmitting and receiving control data between the control controller 30Z and the transport path unit 10. For example, the control controller 30Z may form a communication network for transmitting and receiving control data between the control controller 30Z and the transport path unit 10 by connecting the communication master station 31 of the position command controller 301Z and the transport path communication subordinate station 11 provided in the transport path unit 10 via the first communication line 50.

In addition, in the configuration in which the communication master station 31 and the communication subordinate station 32 are connected by a daisy chain as illustrated in FIG. 20, the communication master station 31 transmits and receives control data to and from the transport path communication subordinate station 11 of the transport path unit 10 via the third communication line 80 connecting the communication master station 31 and the communication subordinate station 32A, the communication subordinate station 32A, the drive controller communication line 90 connecting the communication subordinate station 32A and the communication subordinate station 32B, the communication subordinate station 32B, the drive controller communication line 90 connecting the communication subordinate station 32B and the communication subordinate station 32C, the communication subordinate station 32C, and the first communication line 50. In other words, the communication master station 31 performs transmission and reception with the transport path communication subordinate station 11 of the transport path unit 10 via the first communication line 50. Even in such a configuration, it can be said that the control controller 30Z transmits and receives control data to and from the transport path communication subordinate station 11 of the transport path unit 10. By adopting such a daisy chain, serial communication can be adopted for transmission and reception of control data between the communication master station 31 and the transport path communication subordinate station 11, and an increase in communication lines can be prevented.

The communication master station 31 of the position command controller 301Z according to the fifth embodiment is configured to transmit generation data toward the communication subordinate station 32 similarly to the above-described first embodiment. The communication master station 31 of the position command controller 301Z is configured to transmit control data toward the transport path communication subordinate station 11. Further, the communication master station 31 of the position command controller 301Z is configured to receive control data from the plurality of communication subordinate stations 32. The communication master station 31 of the position command controller 301Z is configured to receive control data from the plurality of transport path communication subordinate stations 11. In addition, the communication control in the communication master station 31 of the position command controller 301Z performs communication control using the transmission channel, the reception channel, and the communication frame similarly to the above-described first embodiment. That is, the control controller 30Z according to the fifth embodiment functions similarly to the control controller 30 described above.

Figure 21:
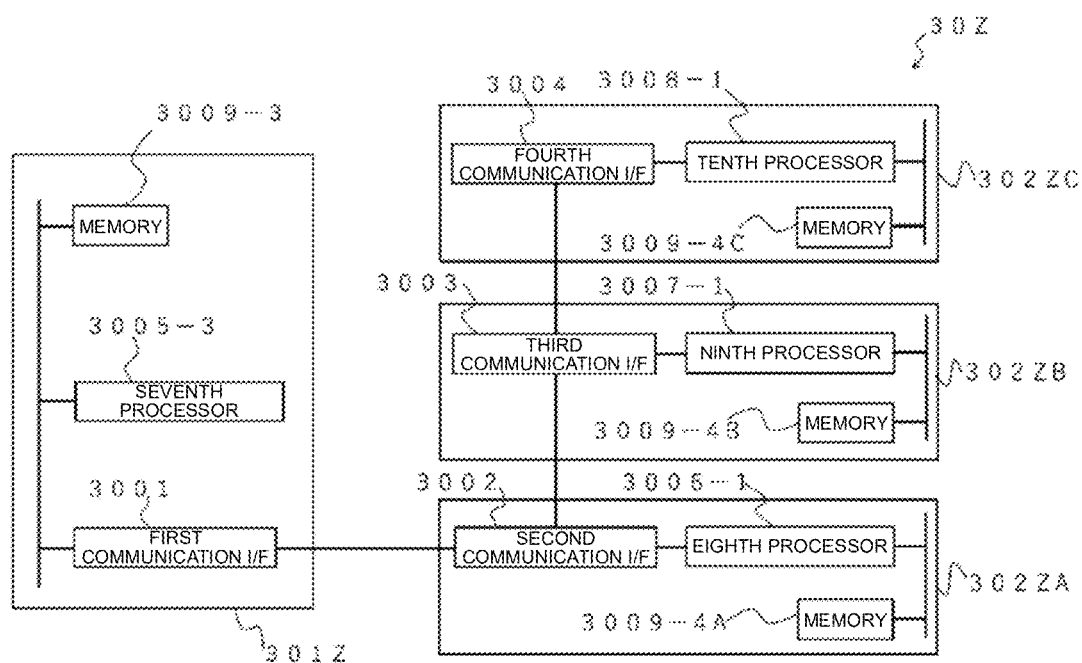
FIG. 21 is a diagram illustrating an exemplary hardware configuration of the control controller according to the fifth embodiment.

FIG. 21 is a diagram illustrating an exemplary hardware configuration of the control controller according to the fifth embodiment. The hardware of the control controller 30Z is divided into the position command controller 301Z and the drive controller 302Z. The position command controller 301Z includes the first communication interface (first communication I/F) 3001 that functions as the communication master station 31, a seventh processor 3005-3 that functions as the position command generator 33 and the position generator 34, and a memory 3009-3 that reads and writes various data used for each calculation in the seventh processor 3005-3. The drive controller 302ZA includes the second communication interface (second communication I/F) 3002 that functions as the communication subordinate station 32A, an eighth processor 3006-1 that functions as the position controller 35A and the current command generator 36ZA, and a memory 3009-4A that reads and writes various data used for each calculation in the eighth processor 3006-1. The drive controller 302ZB includes the third communication interface (third communication I/F) 3003 that functions as the communication subordinate station 32B, a ninth processor 3007-1 that functions as the position controller 35B and the current command generator 36ZB, and a memory 3009-4B that reads and writes various data used for each calculation in the ninth processor 3007-1. The drive controller 302ZC includes the fourth communication interface (fourth communication I/F) 3004 that functions as the communication subordinate station 32C, a tenth processor 3008-1 that functions as the position controller 35C and the current command generator 36ZC, and a memory 3009-4C that reads and writes various data used for each calculation in the tenth processor 3008-1.

The seventh processor 3005-3 is a processor that can calculate a position command value as the position command generator 33 and calculate position information as the position generator 34, and for example, a microprocessor, a microcontroller, a microcomputer, a CPU, a DSP, or the like can be adopted. The eighth processor 3006-1 to the tenth processor 3008-1 are processors that can calculate a drive command value as the position controller 35 and calculate a current command value as the current command generator 36, and for example, a microprocessor, a microcontroller, a microcomputer, a CPU, a DSP, or the like can be adopted.

The memory 3009-3 includes a nonvolatile memory that stores calculation programs and the like that are executed by the seventh processor 3005-3, and a volatile memory that serves as a work memory at the time of each calculation in the seventh processor 3005-3. The memory 3009-4A includes a nonvolatile memory that stores calculation programs and the like that are executed by the eighth processor 3006-1, and a volatile memory that serves as a work memory at the time of each calculation in the eighth processor 3006-1. The memory 3009-4B includes a nonvolatile memory that stores calculation programs and the like that are executed by the ninth processor 3007-1, and a volatile memory that serves as a work memory at the time of each calculation in the ninth processor 3007-1. The memory 3009-4C includes a nonvolatile memory that stores calculation programs and the like that are executed by the tenth processor 3008-1, and a volatile memory that serves as a work memory at the time of each calculation in the tenth processor 3008-1.

In the hardware configuration of the position command controller 301Z in FIG. 21, the processor functioning as the position command generator 33 and the position generator 34 is illustrated as the seventh processor 3005-3 as an example. However, the hardware configuration may include a plurality of processors such as a processor functioning as the position command generator 33 and a processor functioning as the position generator 34. In the hardware configuration of the drive controller 302Z, the processor functioning as the position controller 35 and the current command generator 36 is illustrated as one processor (for example, the eighth processor 3006-1) as an example. However, a plurality of processors may be provided such as a processor functioning as the position controller 35 and a processor functioning as the current command generator 36.

Figure 22:
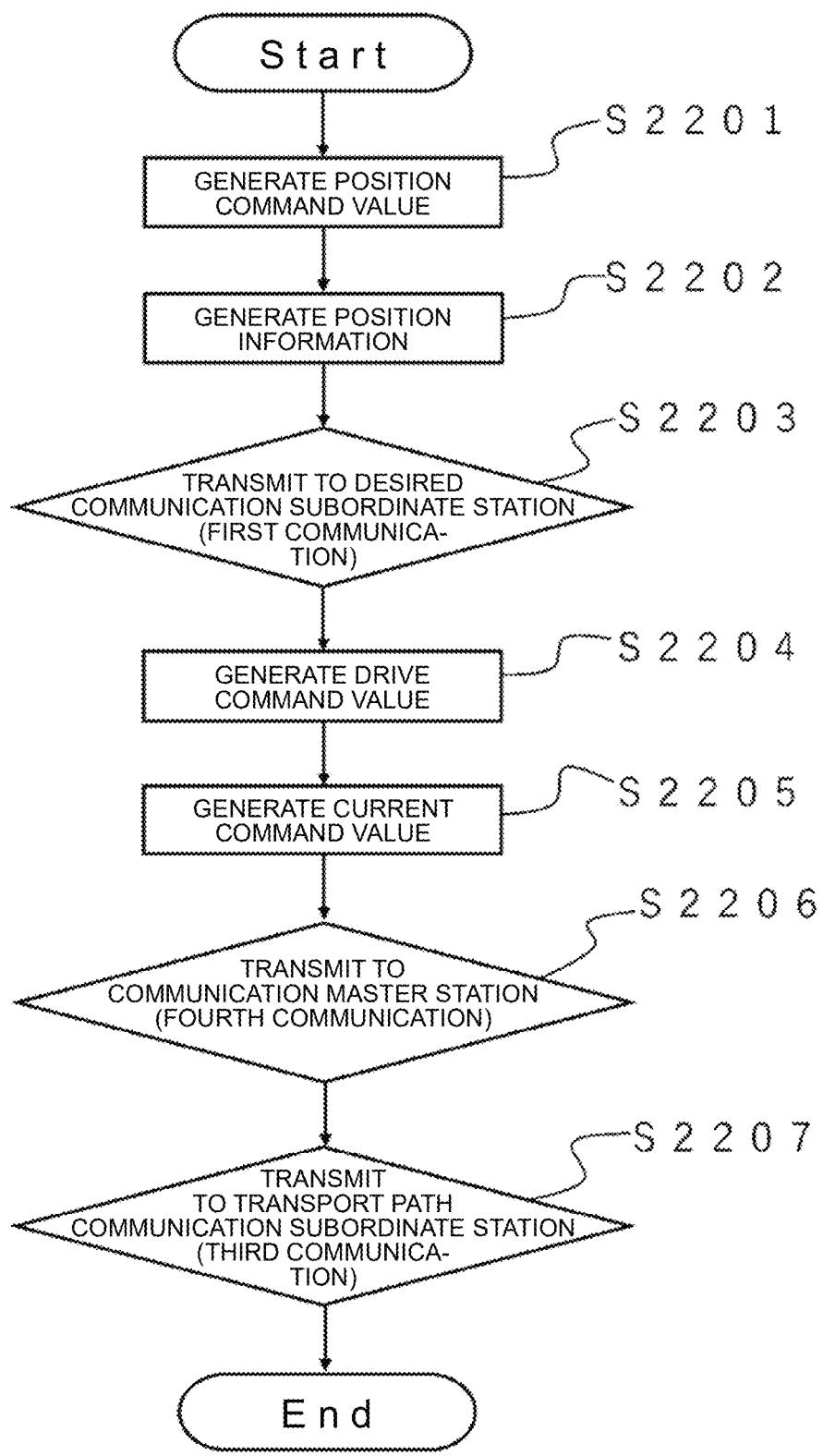
FIG. 22 is a flowchart illustrating an example of the operation of the control controller according to the fifth embodiment.

FIG. 22 is a flowchart illustrating an example of the operation of the control controller according to the fifth embodiment of the present disclosure. The operation of the control controller 30Z will be described with reference to FIG. 22.

In step S2201 illustrated in FIG. 22, the position command generator 33 of the position command controller 301Z constituting the control controller 30Z generates the position command value of each of the three moving bodies 20A, 20B, and 20C included in the transport system 1Z. Then, the position command generator 33 outputs the generated position command value of each of the moving bodies 20A, 20B, and 20C to the communication master station 31 of the position command controller 301Z.

In step S2202, the position generator 34 of the position command controller 301Z generates the position information on each of the moving bodies 20A, 20B, and 20C indicating the positions of the moving bodies 20A, 20B, and 20C on the transport route based on the scale detection information included in the control data received from the transport path units 10A to 10H using the communication frames R2A to R2H illustrated in FIG. 5. Then, the position generator 34 outputs the generated position information on each of the moving bodies 20A, 20B, and 20C to the communication master station 31 of the position command controller 301Z.

In step S2203, the communication master station 31 of the position command controller 301Z performs the first communication of transmitting the acquired position command value and position information on each of the moving bodies 20A, 20B, and 20C toward the communication subordinate station 32. Specifically, the communication master station 31 transmits the position command value and the position information on the moving body 20A toward the communication subordinate station 32A using the communication frame T1A illustrated in FIG. 5, transmits the position command value and the position information on the moving body 20B toward the communication subordinate station 32B using the communication frame T1B, and transmits the position command value and the position information on the moving body 20C toward the communication subordinate station 32C using the communication frame T1C.

In step S2204, the position controllers 35A, 35B, and 35C of the drive controllers 302ZA, 302ZB, and 302ZC respectively generate the drive command values of the moving bodies 20A, 20B, and 20C based on the position command values and the position information on the moving bodies 20A, 20B, and 20C received by the communication subordinate stations 32A, 32B, and 32C, respectively. Specifically, the position controller 35A acquires the position command value and the position information on the moving body 20A from the communication subordinate station 32A connected via the internal bus, generates the drive command value of the moving body 20A based on the position command value and the position information on the moving body 20A. Similarly, the position controllers 35B and 35C generate the drive command value of the moving body 20B and the drive command value of the moving body 20C, respectively.

In step S2205, the current command generators 36ZA, 36ZB, and 36ZC of the drive controllers 302ZA, 302ZB, and 302ZC generate current command values of the transport path units 10A, 10C, 10D, 10E, and 10F in which the moving bodies 20A, 20B, and 20C are located based on the position information on the moving bodies 20A, 20B, and 20C received by the communication subordinate stations 32A, 32B, and 32C and the drive command values of the moving bodies 20A, 20B, and 20C generated by the position controllers 35A, 35B, and 35C. The position information on the moving bodies 20A, 20B, and 20C and the drive command values of the moving bodies 20A, 20B, and 20C can be read and acquired from the memories included in the drive controllers 302ZA, 302ZB, and 302ZC.

Specifically, the current command generator 36ZA acquires the position information on the moving body 20A and the drive command value of the moving body 20A from the memory of the drive controller 302ZA, and generates current command values for all the coils 121A included in the transport path unit 10A in which the moving body 20A is located based on the position information and the drive command value of the moving body 20A. Similarly, the current command generator 36ZB generates the current command values of the transport path units 10C and 10D in which the moving body 20B is located based on the position information and the drive command value of the moving body 20B, and the current command generator 36ZC generates the current command values of the transport path units 10E and 10F in which the moving body 20C is located based on the position information and the drive command value of the moving body 20C. Then, the current command generators 36ZA, 36ZB, and 36ZC output, via the internal bus, the generated current command value of the transport path unit 10 to the communication subordinate stations 32A, 32B, and 32C to which the current command generators 36ZA, 36ZB, and 36ZC are connected.

In step S2206, the communication subordinate stations 32A, 32B, and 32C of the drive controllers 302ZA, 302ZB, and 302ZC perform the fourth communication of transmitting the acquired current command values of the respective transport path units 10A, 10C, 10D, 10E, and 10F toward the communication master station 31. Specifically, the communication subordinate station 32A uses the communication frame R1A including a header, a footer, and a payload illustrated in FIG. 5, and transmits the current command value of the transport path unit 10A included in the payload toward the communication master station 31. Similarly, the communication subordinate station 32B transmits the current command values of the transport path units 10C and 10D included in the payload toward the communication master station 31 using the communication frame R1B, and the communication subordinate station 32C transmits the current command values of the transport path units 10C and 10D included in the payload toward the communication master station 31 using the communication frame R1C.

In step S2207, the communication master station 31 of the position command controller 301Z performs the third communication of transmitting the acquired current command value of each of the transport path units 10A, 10C, 10D, 10E, and 10F toward the transport path communication subordinate station 11. Specifically, the communication master station 31 transmits the current command value of the transport path unit 10A toward the transport path communication subordinate station 11A using the communication frame T2A illustrated in FIG. 5. Similarly, the communication master station 31 transmits the current command values of the respective transport path units 10C, 10D, 10E, and 10F toward the transport path communication subordinate stations 11C, 11D, 11E, and 11F using the communication frames T2C, T2D, T2E, and T2F.

The transport path unit 10 according to the fifth embodiment operates in the same manner as the operations of steps 3801 to 3805 described with reference to FIG. 8 in the above-described first embodiment, and controls the moving body 20 in the transport system 1Z.

As described above, in the transport system 1Z according to the fifth embodiment, since the current command value of the transport path unit 10 in which the moving body 20 is located can be generated by the control controller 30Z, even when the moving body 20 moving in the transport system 1Z is located at the boundary between the transport path units 10, the movement of the moving body 20 can be controlled with high accuracy. In addition, in the transport system 1Z, even when the moving body 20 moving in the transport system 1Z is located at the boundary between the transport path units 10, the current command values of the two transport path units 10 across which the moving body 20 is located can be generated by the control controller 30Z, so that it is possible to prevent an increase in the cost of the electric circuits such as the inverter circuit 122 included in one drive element. In addition, the transport system 1Z according to the fifth embodiment does not need to include the position controller 35 in each of the transport path units 10, and the number of drive controllers 302Z including the position controllers 35 can be equal to or less than the number of moving bodies 20 at a maximum, so that it is possible to prevent an increase in the size and cost of the control system of the control controller 30Z and the transport path unit 10. In addition, in the transport system 1Z, since the moving body 20 is always allocated to a predetermined position controller 35, processing of allocating control of the moving body 20 during operation of the transport system 1Z is unnecessary. Therefore, the transport system 1Z according to the fifth embodiment can prevent the control of the moving body 20 of the transport system 1Z from stopping without increasing the size and cost of the control system.

Further, in the transport system 1Z according to the fifth embodiment, the position command controller 301Z and the drive controller 302Z constitute the control controller 30Z. The drive controller 302Z is configured to generate the drive command value of the allocated moving body 20 and the current command value of the transport path unit 10 in which the moving body 20 is located. Thus, the control controller 30Z is divided into the two controllers of the position command controller 301Z and the drive controller 302Z, so that the control load of one controller can be reduced and the control delay as the control controller 30Z can be prevented. The control controller 30Z can reduce the control load of the position command controller 301Z by providing the current command generator 36Z in the drive controller 302Z. In addition, since the control controller 30Z generates the drive command value and the current command value in the drive controller 302Z, the number of communications of generation data and control data via the internal bus of the position command controller 301Z can be reduced, and the control load as the control controller 30Z can be reduced.

Further, the control controller 30Z is divided into the position command controller 301Z and the drive controller 302Z, the drive controller 302Z and the position command controller 301Z are connected by the third communication line 80, and the drive controllers 302Z are connected by the drive controller communication line 90, so that the number of drive controllers 302Z can be easily changed. Therefore, even when the number of moving bodies 20 moving on the transport route of the transport system 1Z is changed, the control system configuration of the transport system 1Z can be easily changed by changing the number of drive controllers 302Z. That is, the transport system 1Z can provide a transport system that can facilitate system expansion and change.

Sixth Embodiment

A transport system according to the sixth embodiment of the present disclosure will be described. Differences between the transport system of the sixth embodiment and the transport system 1 of the first embodiment will be described below. Note that components similar to those of the first embodiment are denoted by the same reference signs, and a detailed description thereof is omitted.

Figure 23:
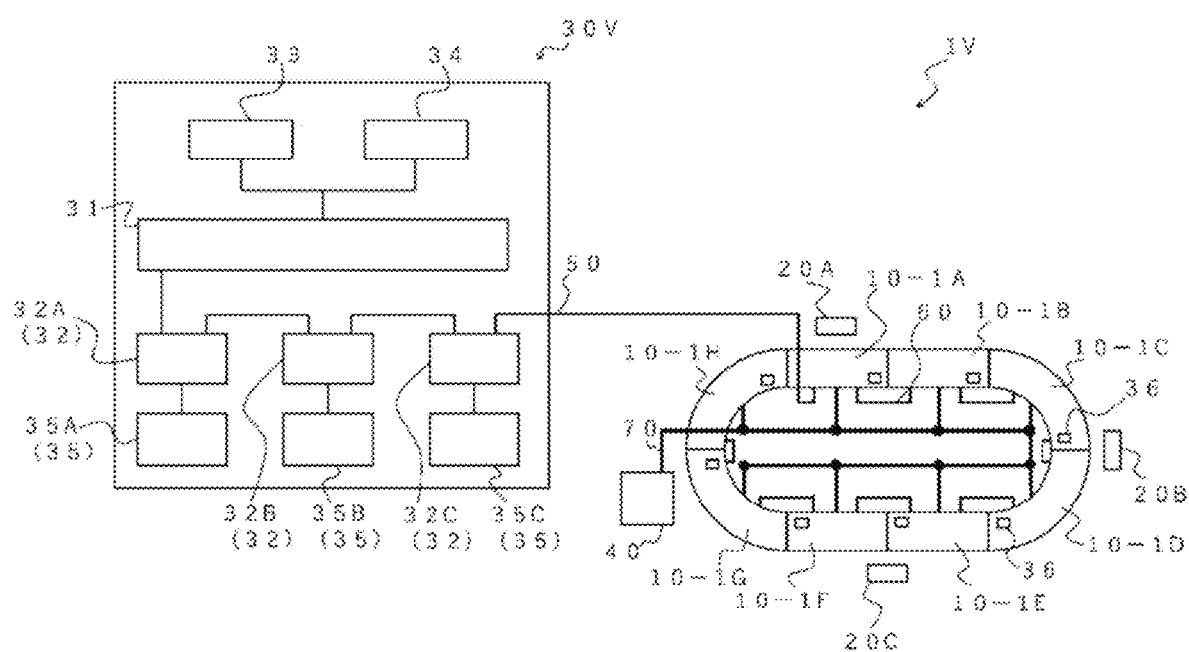
FIG. 23 is a schematic diagram illustrating an exemplary configuration of the transport system according to the sixth embodiment.

FIG. 23 is a schematic diagram illustrating an exemplary configuration of the transport system according to the sixth embodiment of the present disclosure. As illustrated in FIG. 23, the transport system 1V includes a plurality of transport path units 10-1A to 10-1H constituting a transport route for the plurality of moving bodies 20A to 20C, a control controller 30V that controls operations of the plurality of moving bodies 20A to 20C, and the power supply unit 40 that supplies power to the transport path units 10-1A to 10-1H.

As illustrated in FIG. 23, the control controller 30V includes the communication master station 31, the communication subordinate station 32, the position command generator 33, the position generator 34, and the position controller 35. The transport system 1V of the sixth embodiment is different from the above-described first embodiment in that the control controller 30V does not include the current command generator 36, and each of the transport path units 10-1A to 10-1H includes the current command generator 36 as illustrated in FIG. 23. Although not illustrated in FIG. 23, the current command generator 36 is connected to the transport path communication subordinate station 11 via an internal bus in the transport path unit 10-1. Since other configurations and connection states are similar to those in the above-described first embodiment, the description of each configuration and connection state is omitted.

In the hardware of the transport path unit 10-1, the processor 1002 illustrated in FIG. 3 functions as the current command generator 36 in addition to the current controller 124 and the position calculator 14. Other configurations are similar to those illustrated in FIG. 3.

Figure 24:
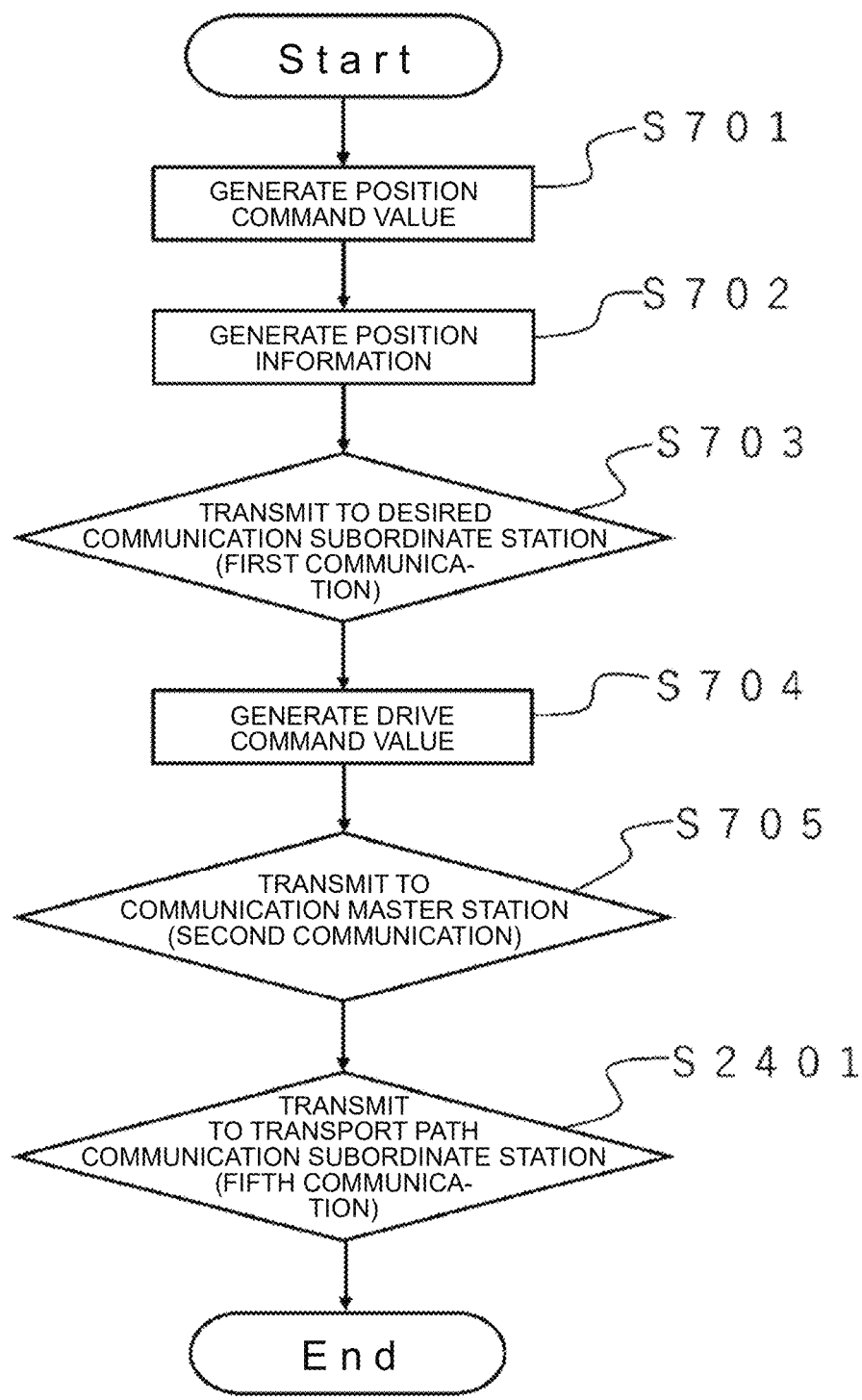
FIG. 24 is a flowchart illustrating an example of the operation of the control controller according to the sixth embodiment.
Figure 25:
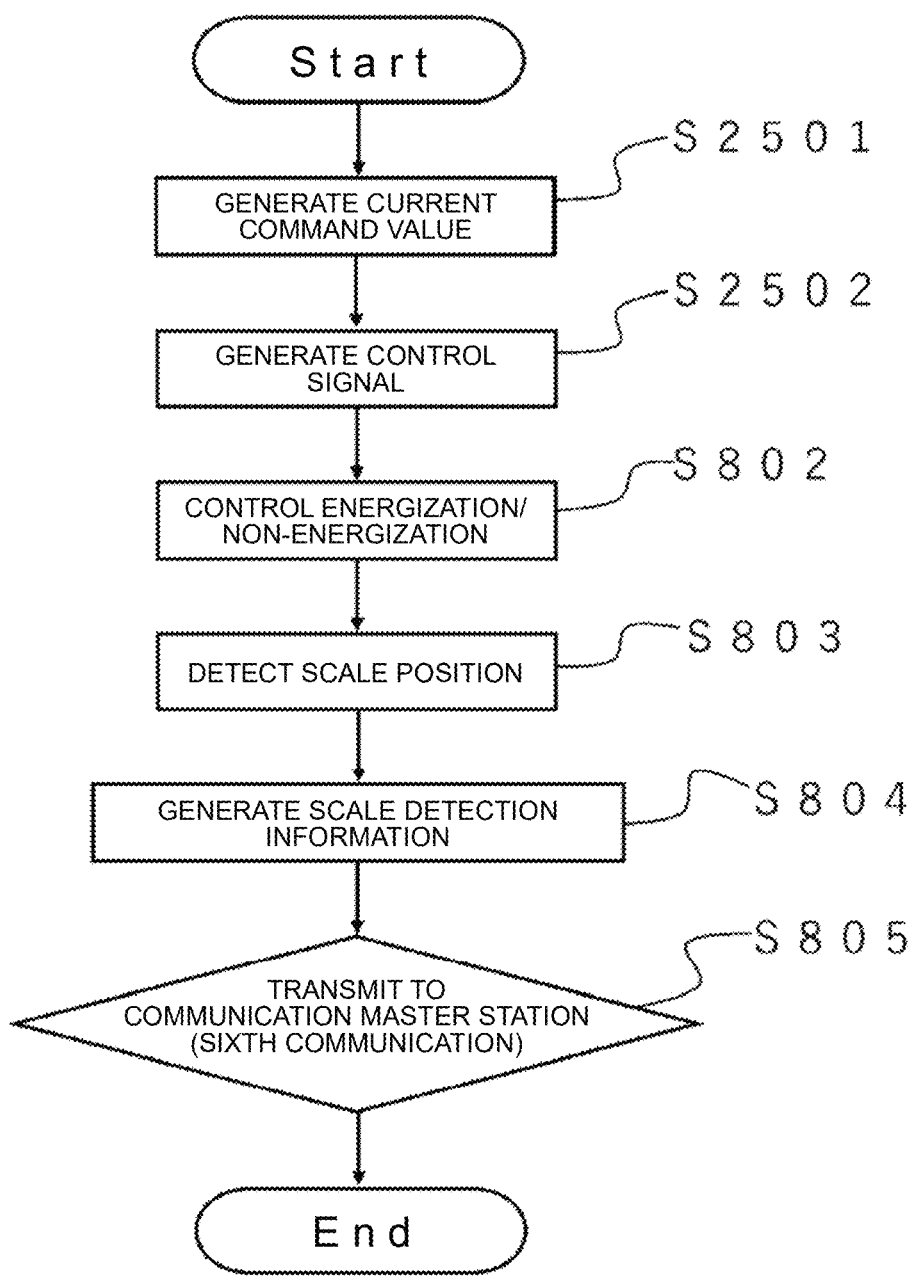
FIG. 25 is a flowchart illustrating an example of the operation of the transport path unit according to the sixth embodiment.

FIG. 24 is a flowchart illustrating an example of the operation of the control controller according to the sixth embodiment of the present disclosure. FIG. 25 is a flowchart illustrating an example of the operation of the transport path unit according to the sixth embodiment of the present disclosure. Control of the moving body 20 in the transport system 1V will be described with reference to FIGS. 24 and 25.

The operations in steps S701 to S705 illustrated in FIG. 24 are similar to those in the first embodiment described with reference to FIG. 7, and thus the description thereof is omitted.

In step S2401, the communication master station 31 performs the fifth communication of transmitting the drive command value of each of the moving bodies 20A, 20B, and 20C transmitted in step S705 and the position information on each of the moving bodies 20A, 20B, and 20C generated in step S702 toward the transport path communication subordinate station 11. Specifically, the communication master station 31 transmits, using the communication frame T2A, the drive command value of the moving body 20A and the position command value of the moving body 20A toward the transport path communication subordinate station 11A of the transport path unit 10-1A in which the moving body 20A is indicated to be located by the position information on the moving body 20A. Similarly, the communication master station 31 transmits, using the communication frames T2C and T2D, the drive command value of the moving body 20B and the position command value of the moving body 20B toward the transport path communication subordinate stations 11C and 11D of the transport path units 10-1C and 10-1D in which the moving body 20B is indicated to be located by the position information on the moving body 20B. Further, the communication master station 31 transmits, using the communication frames T2E and T2F, the drive command value of the moving body 20C and the position command value of the moving body 20C toward the transport path communication subordinate stations 11E and 11F of the transport path units 10-1E and 10-1F in which the moving body 20C is indicated to be located by the position information on the moving body 20C.

In step S2501 illustrated in FIG. 25, the current command generator 36 of the transport path unit 10-1 that has received the drive command value of the moving body 20 and the position information on the moving body 20 generates the current command value of the transport path unit 10-1 based on the drive command value of the moving body 20 and the position information on the moving body 20.

In step S2502, each current controller 124 of the transport path unit 10-1 calculates a control signal for controlling the operation of the inverter circuit 122 based on the current command value generated by the current command generator 36 and the actual current value RA detected by the current sensor 123 of the transport path unit 10-1, and outputs the calculated control signal to the inverter circuit 122. Specifically, the current controller 124A included in each drive element 12A of the transport path unit 10-1A acquires, via the internal bus, the actual current value RA detected by the current sensor 123A of the drive element 12A in which the current controller 124A is included, and acquires, from the current command value, a command value indicating the magnitude of the current to be supplied to the coil 121A of the drive element 12A in which the current controller 124A is included. Each current controller 124 calculates a control signal for controlling the operation of the inverter circuit 122 based on the command value indicating the magnitude of the current and the actual current value RA, and outputs the control signal to the inverter circuit 122A of the drive element 12A in which the current controller 124 is included. The transport path unit 10-1 that has received the drive command value of the moving body 20 and the position information on the moving body 20 and has generated the current command value by the current command generator 36 in step S2501 similarly performs step S2502.

After step S2502, operations similar to those in steps S802 to S805 described with reference to FIG. 8 are performed to control the moving body 20, and thus the description thereof is omitted.

As described above, the transport system 1V according to the sixth embodiment can control the movement of the moving body 20 with high accuracy even at the boundary between adjacent transport path units 10-1 as in the first embodiment, and can prevent an increase in the cost of the electric circuits included in one drive element 12. In addition, as in the first embodiment, the transport system 1V can prevent the control of the moving body of the transport system from stopping without increasing the size and cost of the control system. Further, the transport system 1V does not need to perform calculation for generating the current command values of all the transport path units 10-1 by the control controller 30V, and further performs calculation for generating the current command value of each transport path unit 10-1 in a distributed manner in each transport path unit 10-1. Consequently, the transport system 1V can prevent the control delay and improve the control performance of the moving body 20 by distributing the control load.

Seventh Embodiment

A transport system according to the seventh embodiment of the present disclosure will be described. Differences between the transport system of the seventh embodiment and the transport system 1 of the first embodiment will be described below. Note that components similar to those of the first embodiment are denoted by the same reference signs, and a detailed description thereof is omitted.

Figure 26:
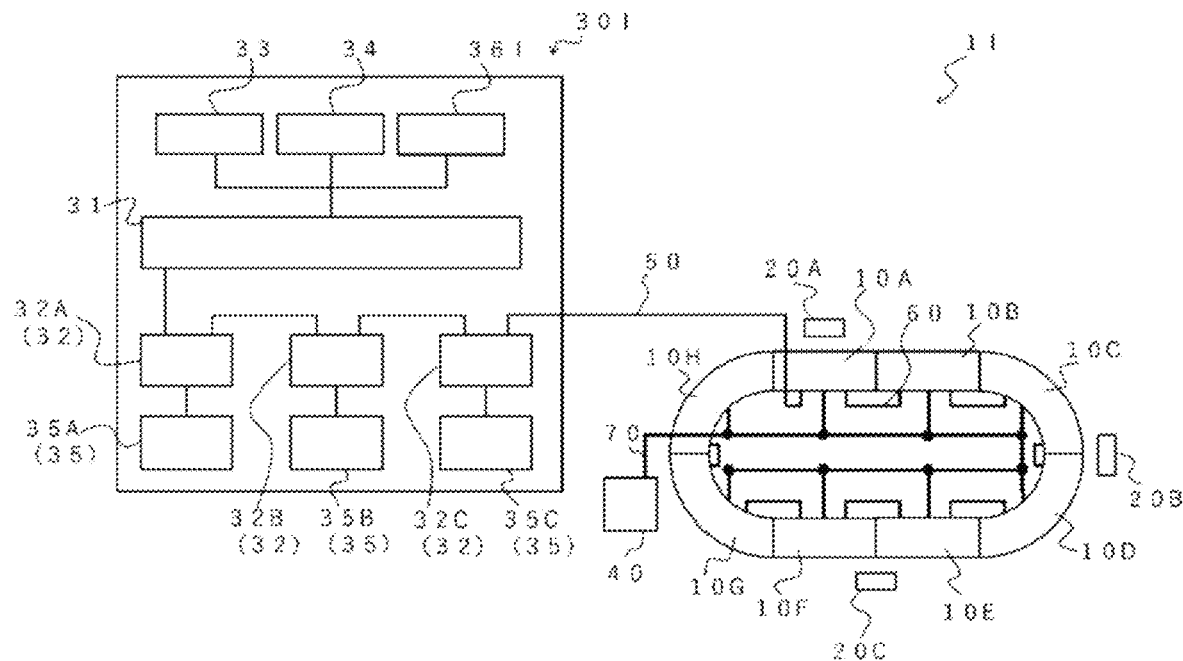
FIG. 26 is a schematic diagram illustrating an exemplary configuration of the transport system according to the seventh embodiment.

FIG. 26 is a schematic diagram illustrating an exemplary configuration of the transport system according to the seventh embodiment of the present disclosure. As illustrated in FIG. 26, similarly to the first embodiment, the transport system 1I includes the plurality of transport path units 10A to 10H constituting a transport route for the plurality of moving bodies 20A to 20C, the control controller 30I that controls operations of the plurality of moving bodies 20A to 20C, and the power supply unit 40 that supplies power to the transport path units 10A to 10H.

As illustrated in FIG. 26, the control controller 30I includes the communication master station 31, the communication subordinate station 32, the position command generator 33, the position generator 34, the position controller 35, and a current command generator 361. In the transport system 1I of the seventh embodiment, the current command generator 361 included in the control controller 30I is different from that in the above-described first embodiment.

As illustrated in FIG. 26, the current command generator 361 is connected to the communication master station 31 via an internal bus. Configurations and connection states of the communication master station 31, the communication subordinate station 32, the position command generator 33, the position generator 34, and the position controller 35 are the same as those in the first embodiment, and thus the description thereof is omitted.

Figure 27:
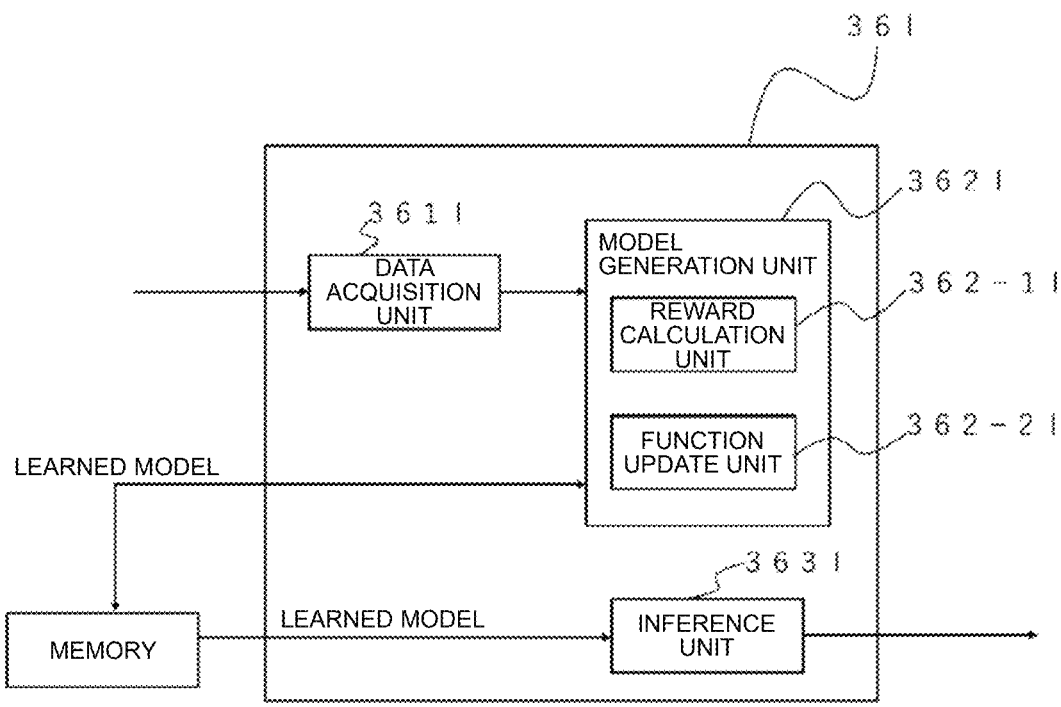
FIG. 27 is a diagram illustrating an exemplary configuration of the current command generator of the control controller according to the seventh embodiment.

FIG. 27 is a diagram illustrating an exemplary configuration of the current command generator of the control controller according to the seventh embodiment. Similarly to the above-described first embodiment, the current command generator 361 includes an arithmetic circuit that generates a current command value of the transport path unit 10 based on the position information on the moving body 20 generated by the position generator 34 and the drive command value generated by the position controller 35. In addition, the current command generator 361 includes a data acquisition unit 361I that acquires learning data, a model generation unit 362I that generates a learned model using the learning data, and an inference unit 363I that performs inference using the learned model.

The data acquisition unit 361I acquires, as learning data, a data set including the position information on the moving body 20 generated by the position generator 34, the drive command value of the moving body 20 generated by the position controller 35, and the current command value of the transport path unit 10 generated by the current command generator 361 itself. Regarding the data acquisition unit 361I, the communication master station 31 may also function as the data acquisition unit 361I.

The model generation unit 362I uses a data set including the position information on the moving body 20, the drive command value of the moving body 20, and the current command value of the transport path unit 10 as learning data, and generates a learned model that infers the current command value of the transport path unit 10 based on the learning data.

The learning algorithm that is used by the model generation unit 362I can be a known algorithm such as supervised learning, unsupervised learning, or reinforcement learning. An exemplary case in which reinforcement learning is applied will be described. In reinforcement learning, an agent (subject of an action) in an environment observes the current state (environment parameter) and determines the action to take. The environment dynamically changes due to the behavior of the agent, and a reward is given to the agent according to the change in the environment. The agent repeats this to learn an action policy that maximizes the reward through a series of actions. Q-learning and TD-learning are known as representative methods of reinforcement learning. For example, in the case of Q-learning, a general update expression for the action value function Q (s, a) is represented by Formula 1.

$$Q(s_t, a_t) \leftarrow Q(s_t, a_t) + \alpha\left(r_{t+1} + \gamma \max_a Q(s_{t+1}, a) - Q(s_t, a_t)\right) \quad \text{Formula 1}$$

In Formula 1, st represents the state of the environment at time t, and at represents the action at time t. The action at changes the state to st+1. In addition, rt+1 represents the reward that can be gained due to the change of the state, γ represents a discount rate, and α represents a learning coefficient. Note that γ is in the range of 0<γ≤1, and α is in the range of 0<α≤1. The current command value serves as the action at, the position information and the drive command value serve as the state st, and the best action at in the state st at time t is learned.

The update expression represented by Formula 1 increases the action value Q when the action value Q of the action a with the highest Q value at time t+1 is greater than the action value Q of the action a executed at time t, and otherwise reduces the action value Q. In other words, the action value function Q (s, a) is updated such that the action value Q of the action a at time t is brought closer to the best action value at time t+1. As a result, the best action value in a certain environment sequentially propagates to the action values in the previous environments.

As described above, in the case that a learned model is generated by reinforcement learning, the model generation unit 362I includes a reward calculation unit 362-1I and a function update unit 362-2I.

The reward calculation unit 362-1I calculates a reward based on the position information on the moving body 20, the drive command value of the moving body 20, and the current command value of the transport path unit 10. The reward calculation unit 362-1I calculates the reward r based on a voltage threshold determined in advance based on the magnitude of the voltage applied to each coil 121 of the transport path unit 10. Since the voltage threshold varies depending on specifications such as the allowable voltage of the coil 121, a desired threshold can be determined by the user. For example, the reward r is increased in a case where the voltage is equal to or lower than the voltage threshold of each coil 121 (for example, a reward of "1" is given), and the reward r is reduced in a case where the voltage exceeds the voltage threshold of each coil 121 (for example, a reward of "−1" is given.).

The function update unit 362-2I updates the function for determining the current command value of the transport path unit 10 according to the reward calculated by the reward calculation unit 362-1I, and outputs the updated function to the memory of the control controller 301. For example, in the case of Q-learning, the action value function Q (st, at) expressed by Formula 1 is used as a function for calculating the current command value of the transport path unit 10.

The above learning is repeatedly executed. The memory of the control controller 301 stores the action value function Q (st, at) updated by the function update unit 362-2I, that is, the learned model.

Figure 28:
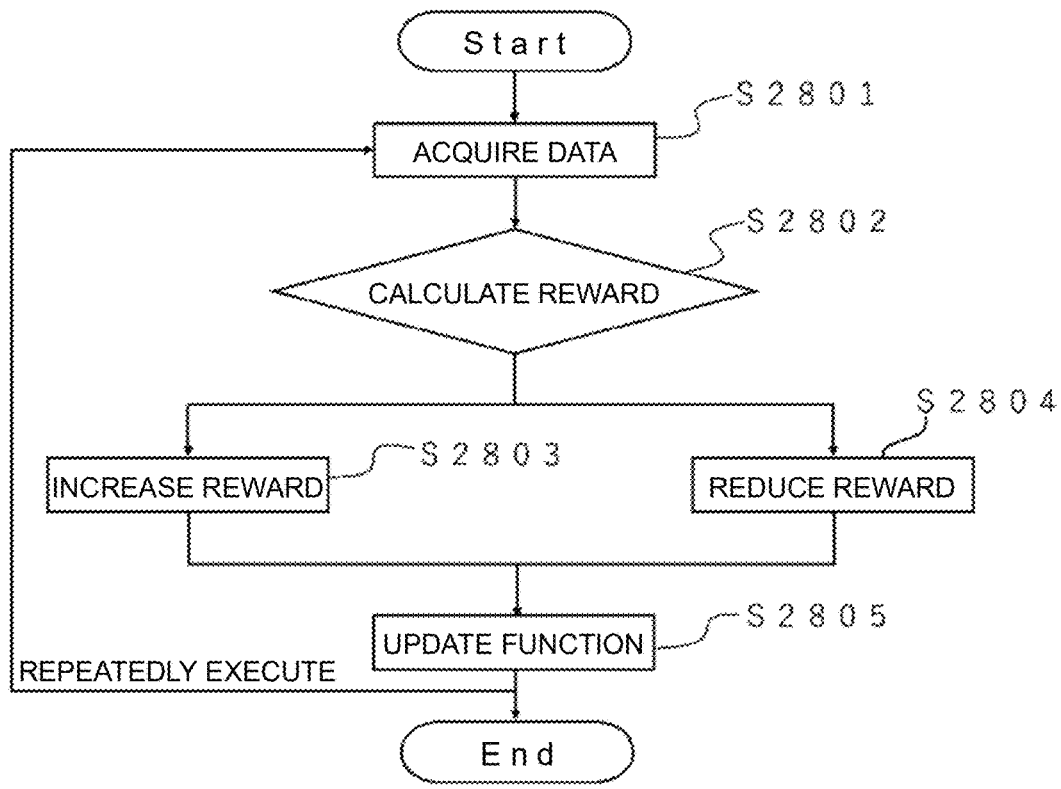
FIG. 28 is a flowchart related to learning processing of the current command generator according to the seventh embodiment.

Next, the process of learning by the current command generator 361 will be described with reference to FIG. 28. FIG. 28 is a flowchart related to learning processing of the current command generator according to the seventh embodiment. Note that the transport system 1I of the seventh embodiment includes the three moving bodies 20A, 20B, and 20C as the moving body 20 that moves on the transport route, but the following description will be specifically described with respect to the moving body 20A.

In step S2801, the data acquisition unit 361I acquires, as learning data, a data set including the position information on the moving body 20A generated by the position generator 34, the drive command value of the moving body 20A generated by the position controller 35A, and the current command value of the transport path unit 10 generated by the current command generator 361 based on the position information and the drive command value of the moving body 20A.

In step S2802, the model generation unit 3621 calculates a reward based on the learning data. Specifically, the reward calculation unit 362-1I acquires the position information on the moving body 20A, the drive command value of the moving body 20A, and the current command value of the transport path unit 10 generated based on the position information on the moving body 20A and the drive command value, and determines whether to increase the reward (step S2803) or reduce the reward (step S2804) based on a predetermined voltage threshold.

In response to determining to increase the reward, the reward calculation unit 362-1I increases the reward in step S2803. On the other hand, in response to determining to reduce the reward, the reward calculation unit 362-1I reduces the reward in step S2804.

In step S2805, the function update unit 362-2I updates the action value function Q (st, at) represented by Formula 1 stored in the memory of the control controller 301 based on the reward calculated by the reward calculation unit 362-1I.

The current command generator 361 repeatedly executes the above steps S2801 to S2805, and stores the generated action value function Q (st, at) as a learned model. Similarly, the current command generator 361 acquires, as learning data in step S2801, a data set including the position information on the moving body 20B generated by the position generator 34, the drive command value of the moving body 20B generated by the position controller 35B, and the current command value of the transport path unit 10 generated by the current command generator 361 based on the position information and the drive command value of the moving body 20B, repeatedly executes steps S2802 to S2805, and stores the generated action value function Q (st, at) as a learned model. Further, the current command generator 361 acquires, as learning data in step S2801, a data set including the position information on the moving body 20C generated by the position generator 34, the drive command value of the moving body 20C generated by the position controller 35C, and the current command value of the transport path unit 10 generated by the current command generator 361 based on the position information and the drive command value of the moving body 20C, repeatedly executes steps S2802 to S2805, and stores the generated action value function Q (st, at) as a learned model.

Although the current command generator 361 according to the seventh embodiment stores the learned model in the memory of the control controller 301, the learned model may be stored in a storage device provided outside the control controller 301. Although the data acquisition unit 361I and the model generation unit 3621 have been described as being included in the current command generator 361, the data acquisition unit 361I and the model generation unit 3621 may be provided outside the current command generator 361. For example, the data acquisition unit 361I and the model generation unit 3621 may be configured as a learning device including the data acquisition unit 361I and the model generation unit 3621, and the learning device may be provided inside the control controller 301, so that the learning data can be acquired via the internal bus. In addition, the learning device including the data acquisition unit 361I and the model generation unit 3621 may be configured as a housing different from the control controller 301 outside the control controller 301, and the control controller 301 and the learning device may be communicably connected via a communication line or the like so that the learning data can be acquired.

Next, the inference unit 3631 of the current command generator 361 will be described. The inference unit 3631 performs inference using the learned model generated by the model generation unit 3621 described above. Specifically, the current command generator 361 acquires the position information on the moving body 20 and the drive command value of the moving body 20 by the data acquisition unit 361I. Then, the inference unit 3631 uses the learned model to infer the current command value of the transport path unit 10. That is, a current command value suitable for the position information and the drive command value can be inferred by inputting the position information and the drive command value acquired by the data acquisition unit 361I to the learned model. Regarding the data acquisition unit 361I, the communication master station 31 may also function as the data acquisition unit 361I.

Figure 29:
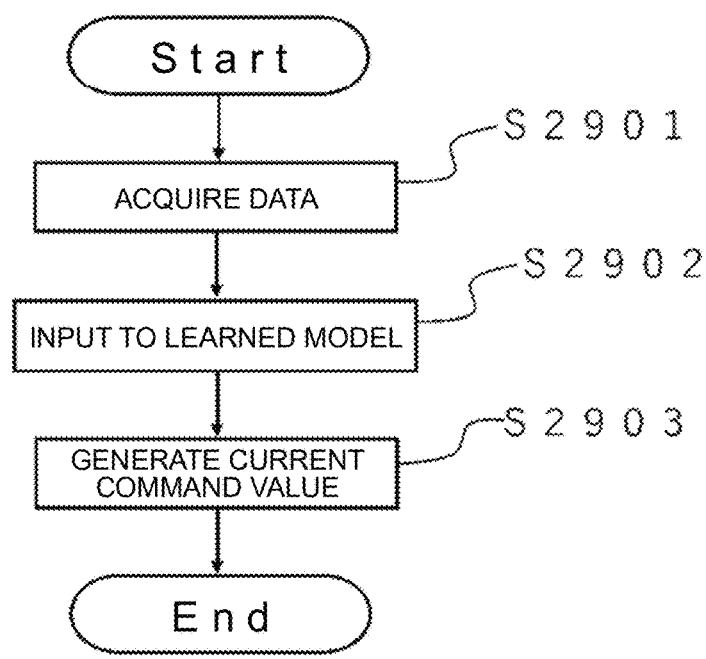
FIG. 29 is a flowchart related to inference processing of the current command generator according to the seventh embodiment.

Next, processing for the current command generator 361 to infer the current command value will be described with reference to FIG. 29. FIG. 29 is a flowchart related to inference processing of the current command generator according to the seventh embodiment.

In step S2901, the data acquisition unit 361I acquires the position information on the moving body 20A generated by the position generator 34 and the drive command value of the moving body 20A generated by the position controller 35A.

In step S2902, the inference unit 3631 inputs the position information on the moving body 20A and the drive command value of the moving body 20A to the learned model stored in the memory of the control controller 301, and obtains the current command value of the transport path unit 10.

The transport system 1I of the seventh embodiment includes the moving bodies 20B and 20C in addition to the moving body 20A as the moving bodies 20 that move on the transport route. After step S2902, the current command generator 361 repeats steps 2901 and 2902 by the number of moving bodies 20. Specifically, the data acquisition unit 361I executes step 2901 again to acquire the position information on the moving body 20B generated by the position generator 34 and the drive command value of the moving body 20B generated by the position controller 35B. Thereafter, step S2902 is executed, and the inference unit 3631 inputs the position information and the drive command value of the moving body 20B to the learned model stored in the memory of the control controller 301, and obtains the current command value of the transport path unit 10. In addition, the data acquisition unit 361I executes step 2901 again to acquire the position information on the moving body 20C generated by the position generator 34 and the drive command value of the moving body 20C generated by the position controller 35C. Thereafter, step S2902 is executed, and the inference unit 3631 inputs the position information and the drive command value of the moving body 20C to the learned model stored in the memory of the control controller 301, and obtains the current command value of the transport path unit 10.

In step S2903, the current command generator 361 merges the current command values of all the transport path units 10 obtained by the inference unit 3631 to generate current command values of all the transport path units 10 in the transport route of the transport system 1I, and outputs the generated current command values of the transport path units 10 to the communication master station 31.

After step S2903, the control controller 301 performs the same operation as step S707 described with reference to FIG. 7 in the above-described first embodiment. Thereafter, the transport system 1I performs steps S801 to S805 described with reference to FIG. 8 in the above-described first embodiment to control the moving body 20.

If there is a learned model already generated for inferring the current command value of the transport path unit 10, the current command generator 361 may be configured to include the data acquisition unit 361I and the inference unit 3631 instead of the arithmetic circuit described in the first embodiment. Even in such a case, the current command value of the transport path unit 10 can be generated. In a case where the communication master station 31 also functions as the data acquisition unit 361I, the current command generator 361 may not include the data acquisition unit 361I. Although the data acquisition unit 361I and the inference unit 3631 have been described as being included in the current command generator 361, the data acquisition unit 361I and the inference unit 3631 may be provided outside the current command generator 361. For example, the data acquisition unit 361I and the inference unit 3631 may be configured as an inference device including the data acquisition unit 361I and the inference unit 3631, and the inference device may be provided inside the control controller 301. In addition, the learning device including the data acquisition unit 361I and the inference unit 3631 may be configured as a housing different from the control controller 301 outside the control controller 301, and the control controller 301 and the inference device may be communicably connected via a communication line or the like.

As described above, the control controller 301 according to the seventh embodiment can generate a current command value that is control data by machine learning. This transport system 1I achieves the same effect as the transport system 1 according to the above-described first embodiment, and can search for an optimum current command value by machine learning.

Modifications

In the transport system described in the above-described first to seventh embodiments, the moving body 20 may be attached to the transport path unit 10 via a guide rail (not illustrated). In addition, the moving body 20 may be placed on the transport path unit 10 without being fixed by a guide rail or the like, and may be configured such that the moving body 20 moves on the transport path unit 10 through interaction between the magnet included in the moving body 20 and the coil included in the transport path unit 10.

The transport system described in the first to seventh embodiments has been described as a moving-magnet-type linear transport system in which the moving body 20 includes a magnet, the transport path unit 10 includes a coil, and the magnet and the coil constitute a moving-magnet-type linear motor so that the moving body 20 moves along the transport route constituted by the transport path unit 10. However, the transport system of the present disclosure may be configured as a roller conveyor transport system including a rotary motor instead of the coil of the transport path unit 10 and a roller rotated by the rotary motor. Specifically, the roller conveyor transport system couples transport path units 10-2 illustrated in FIG. 30 to form a transport route. In addition, a moving body 20-1 that moves on the transport route of the roller conveyor transport system does not need to include the mover magnet group 22, and for example, a pallet on which the workpiece is placed or the workpiece itself can be used as the moving body.

Figure 30:
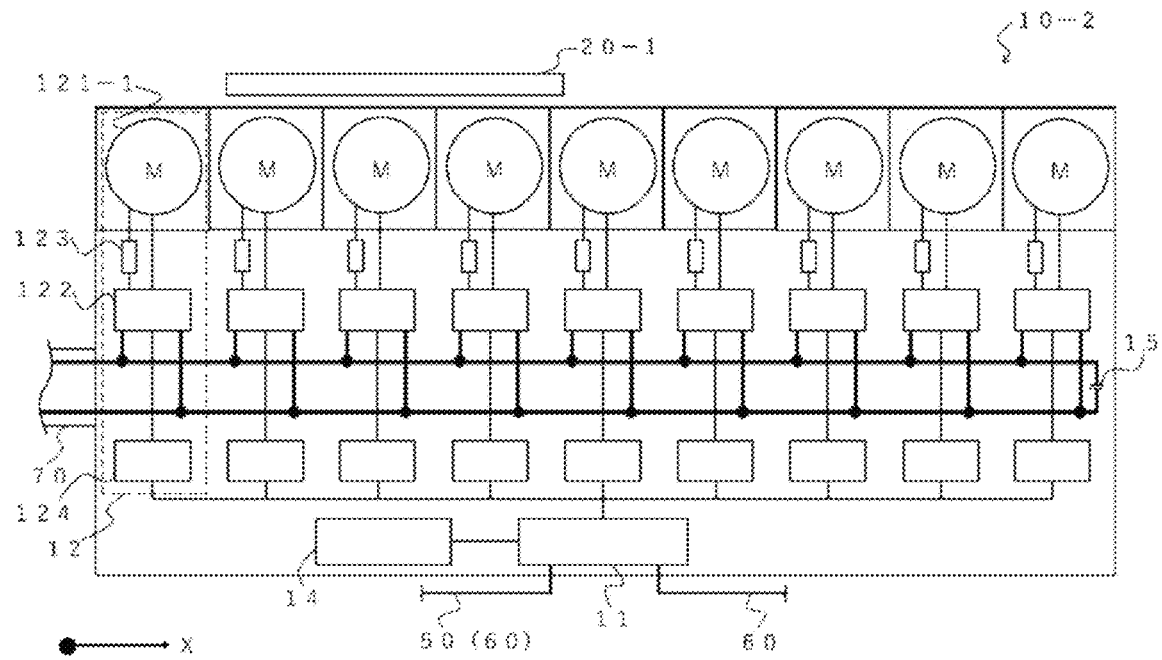
FIG. 30 is a diagram illustrating an exemplary configuration of a transport path unit and a moving body according to a modification.

As illustrated in FIG. 30, the transport path unit 10-2 includes a rotary motor 121-1 instead of the coil 121 of the transport path unit 10 described above. The transport path unit 10-2 includes a roller (not illustrated) that is rotated by the rotary motor 121-1. Other configurations of the transport path unit 10-2 are similar to those of the transport path unit 10, and thus the description thereof is omitted. Each rotary motor 121-1 of the transport path unit 10-2 is rotated by supply of a current controlled by the current controller 124 and the inverter circuit 122, and the rotary motor 121-1 rotates to rotate the roller and move the moving body 20-1. The scale 13 (not illustrated in FIG. 30) of the transport path unit 10-2 only needs to include a sensor capable of detecting the moving body 20-1, and for example, an optical sensor can be used. In a case where the position detection magnet group 23 is provided in the moving body 20-1, the Hall sensor or the magnetoresistive sensor described above can be used. Since the control controller of the conveyor transport system can be configured similarly to the control controller described in the first to seventh embodiments, the description thereof will be omitted. Even in such a transport system, the effect of the present disclosure can be achieved.

In addition, the transport system of the present disclosure may be configured as a belt conveyor transport system in which the rotary motors 121-1 included in the above-described transport path unit 10-2 are disposed at a wider interval, and a belt is stretched over adjacent rollers to constitute a belt conveyor.

In the transport system described in the first, second, fifth, sixth, and seventh embodiments, it has been described that the communication master station 31 performs the first communication of transmitting the position command value and the position information on each of the moving bodies 20A, 20B, and 20C toward the communication subordinate station 32 using the communication frames T1A to T1C. In addition, it has been described that the position controllers 35A, 35B, and 35C calculate the position deviation from the acquired position command value of the moving body and position information on the moving body when generating the drive command value of the moving body 20 based on the acquired position command value of the moving body and position information on the moving body. However, the communication master station 31 may perform the first communication of acquiring the position deviation and transmitting the position deviation of each of the moving bodies 20A, 20B, and 20C toward the communication subordinate station 32 using the communication frames T1A to T1C. Then, the position controllers 35A, 35B, and 35C may generate the drive command value of the moving body 20 based on the acquired position deviation.

Specifically, the position command generator 33 provided in the control controller of the transport system generates a position command value of the moving body 20. The position generator 34 generates position information on the moving body 20. Then, the processor of the control controller generates a position deviation based on the position command value of the moving body 20 and the position information on the moving body 20, and outputs the position deviation to the communication master station 31. The communication master station 31 designates a desired communication subordinate station 32 using the communication frames T1A to T1C, and performs the first communication of transmitting the acquired position deviation toward the designated communication subordinate station 32. The position controller 35 acquires the position deviation from the communication subordinate station 32 and generates a drive command value of the moving body 20. Similarly to the above embodiments, when the communication master station 31 transmits the communication frames T1A, T1B, and T1C toward the communication subordinate stations 32A to 32C, if it is not necessary to designate the communication subordinate stations 32A to 32C, the communication master station 31 may not designate the communication subordinate stations 32A to 32C. The control controller may have a configuration as a position deviation generator that generates a position deviation based on the position command value of the moving body 20 and the position information on the moving body 20.

In such a transport system, the data size of the communication frame transmitted by the communication master station 31 in the first communication can be reduced, and the time required for the first communication can be shortened. In addition, such a transport system can reduce the calculation load of the position controller 35. Consequently, the transport system can prevent the control delay as the entire transport system and can improve the control performance of the moving body 20.

In the transport system described in the third and fourth embodiments, the control controller includes the position command controller, the drive controller, and the track controller. However, the control controller described in the third and fourth embodiments is not limited to such a form. For example, the control controller may include a position command controller in which the position command controller and the drive controller are integrated, and a track controller. The control controller may include a track controller in which the track controller and the drive controller are integrated, and a position command controller. That is, the configuration of the drive controller may be included in another controller constituting the control controller.

In the transport system described in the fifth embodiment, the control controller includes the position control controller and the drive controller. However, the control controller described in the fifth embodiment is not limited to such a form. For example, the position control controller and the drive controller may be integrated to constitute the control controller, or the position control controller, the drive controller, and the track controller may constitute the control controller.

Furthermore, the control controller of the transport system described in the sixth and seventh embodiments may include a plurality of controllers as in the second to fifth embodiments.

Figure 31:
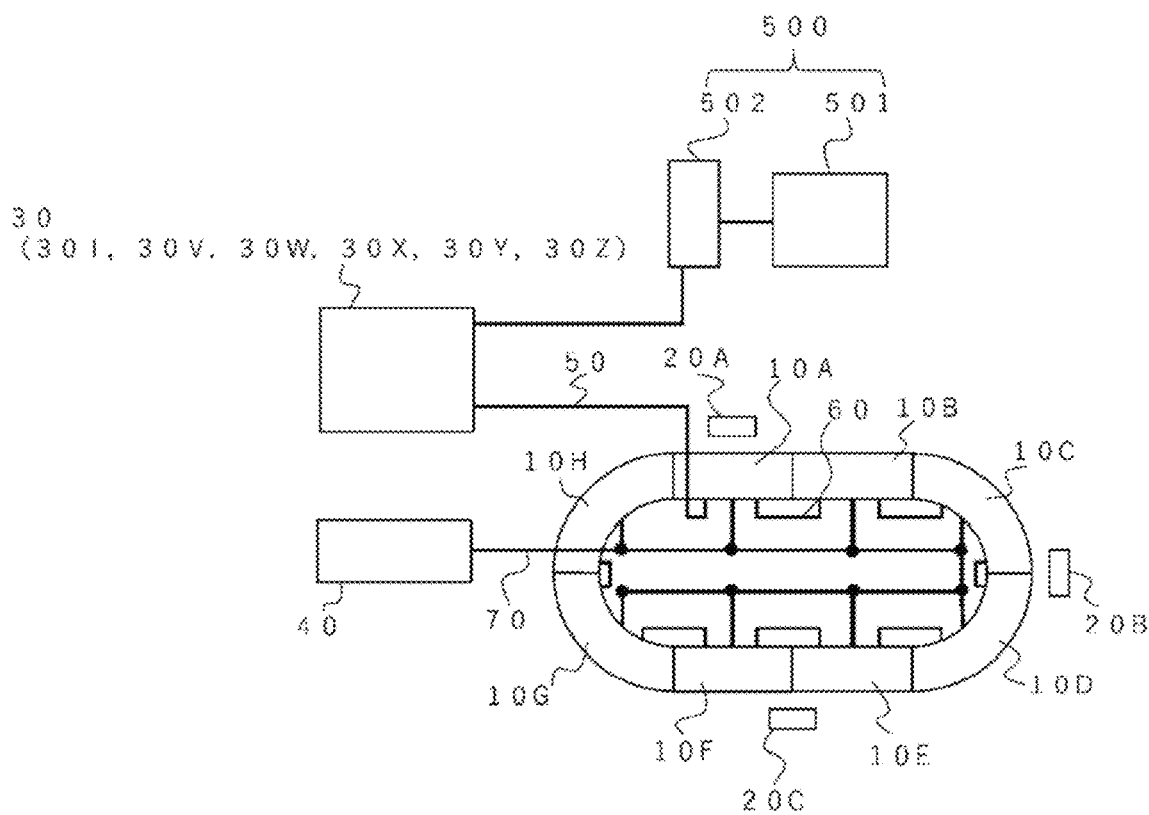
FIG. 31 is a schematic diagram illustrating an exemplary configuration of a transport system according to a modification.

In the transport system described in the first to seventh embodiments described above, another drive system 500 may be connected to the control controller 30 (30I, 30V, 30W, 30X, 30Y, or 30Z) as illustrated in FIG. 31. The drive system 500 connected to the control controller 30 (30I, 30V, 30W, 30X, 30Y, or 30Z) drives a drive device 501 included in the drive system 500 based on the position command value generated by the position command generator 33 of the control controller 30 (30I, 30V, 30W, 30X, 30Y, or 30Z). This drive system 500 is, for example, a drive system including a rotary motor as the drive device 501 and including a motor control device 502 that controls the rotary motor based on a position command value, a drive system including a moving coil linear motor as the drive device 501 and including a motor control device 502 that controls the moving coil linear motor based on a position command value, or the like.

As the motor control device 502 and the drive device 501 included in the drive system 500, conventionally known motor control devices and drive devices can be adopted, and positioning of the motor as the drive device is performed (at least one of rotation speed, rotation angle, torque, moving speed, moving distance, etc. is determined) based on the position command value acquired by the motor control device. In the drive system, the motor control device and the control controller of the transport system are connected by a communication line. Consequently, the drive system 500 can acquire the position command value generated by the position command generator 33 of the control controller 30 (30I, 30 V, 30W, 30X, 30Y, 30Z). Specifically, the communication master station 31 of the control controller 30 (30I, 30V, 30W, 30X, 30Y, or 30Z) transmits the position command value toward the motor control device 502. The motor control device 502 can acquire the position command value via the communication line.

In such a transport system, the drive device of the drive system can be operated in synchronization with the movement of the moving body of the transport system, and operations such as the movement of the workpiece by the moving body and the machining of the workpiece by the drive device can be performed in synchronization.

The configurations described in the above-mentioned embodiments and modifications indicate examples of the contents of the present disclosure. The configurations can be combined with another well-known technique, and some of the configurations can be omitted or changed in a range not departing from the gist of the present disclosure.

INDUSTRIAL APPLICABILITY

The present disclosure is suitable for realizing a transport system that moves a plurality of moving bodies along a transport route.

REFERENCE SIGNS LIST 1, 1I, 1V, 1W, 1X, 1Y, 1Z transport system; 10(10A to 10H), 10-1(10-1A to 10-1H), 10-2(10-2A to 10-2H) transport path unit; 11 transport path communication subordinate station; 12 drive element; 121 coil; 121-1 rotary motor; 122 inverter circuit; 123 current sensor; 124 current controller; 13 scale; 131 position sensor; 14 position calculator; 20(20A to 20C), 20-1 moving body; 21 moving body substrate; 22 mover magnet group; 23 position detection magnet group; 30, 30I, 30V, 30W, 30X, 30Y, 30Z control controller; 31 communication master station; 31-1 first communication master station; 31-2 second communication master station; 31-3 third communication master station; 31-4 fourth communication master station; 32(32A to 32C) communication subordinate station; 32-1(32-1A to 32-1C) first communication subordinate station; 32-2(32-2A to 32-2C) second communication subordinate station; 33 position command generator; 34 position generator; 35(35A to 35C) position controller; 36, 36Z(36ZA to 36ZC), 361 current command generator; 361I data acquisition unit; 3621 model generation unit; 362-1I reward calculation unit; 362-2I function update unit; 3631 inference unit; 40 power supply unit; 50 first communication line; 60 second communication line; 70 power supply line; 80 third communication line; 90 drive controller communication line; 91 first drive controller communication line; 92 second drive controller communication line; 100 fourth communication line; 301, 301X, 301Z position command controller; 302(302A to 302C), 302Y (302YA to 302YC), 302Z(302ZA to 302ZC) drive controller; 303, 303Y track controller; 500 drive system; 501 drive device; 502 motor control device; 1001 communication I/F; 1002 processor; 1003 memory; 3001 first communication I/F; 3002 second communication I/F; 3003 third communication I/F; 3004 fourth communication I/F; 3001-1 fifth communication I/F; 3001-2 sixth communication I/F; 3001-3 thirteenth communication I/F; 3001-4 fourteenth communication I/F; 3002-1 seventh communication I/F; 3002-2 eighth communication I/F; 3003-1 ninth communication I/F; 3003-2 tenth communication I/F; 3004-1 eleventh communication I/F; 3004-2 twelfth communication I/F; 3005 first processor; 3006 second processor; 3007 third processor; 3008 fourth processor; 3005-1 fifth processor; 3005-2 sixth processor; 3005-3 seventh processor; 3006-1 eighth processor; 3007-1 ninth processor; 3008-1 tenth processor; 3009, 3009A, 3009B, 3009C, 3009-1, 3009-2, 3009-3, 3009-4A, 3009-4B, 3009-4C memory.

The invention claimed is:
1. A transport system comprising:
a plurality of transport path units to constitute a movement route on which a plurality of moving bodies each having a magnet move, and to apply a driving force to the plurality of moving bodies;
a control controller to control the plurality of transport path units, wherein each of the transport path units includes:
a coil;
a transport path communication subordinate station;
a current controller connected to the transport path communication subordinate station; and
a position detector connected to the transport path communication subordinate station, and configured to detect a position of the moving body and output a position detection signal,
the control controller includes:
a communication master station to communicate with the transport path communication subordinate station;
one or a plurality of communication subordinate stations to communicate with the communication master station;
a position command generator connected to the communication master station;
a position generator connected to the communication master station;
a current command generator connected to the communication master station; and
a position controller connected to the communication subordinate station and allocated to the plurality of the moving bodies, wherein
the transport path communication subordinate station transmits the position detection signal of the position detector to the communication master station,
the position generator generates moving body position information that is position information for each of the plurality of moving bodies based on the position detection signal acquired from the communication master station,
the position command generator generates a moving body position command value, that is a position command value for each of the plurality of moving bodies, using a learned model to infer the first command value from the moving body position information and a moving body drive command value,
the communication master station transmits the moving body position command value and the moving body position information to the communication subordinate station, or transmits a position deviation obtained from the moving body position command value and the moving body position information to the communication subordinate station,
the position controller generates the moving body drive command value that is a drive command value for each of the plurality of moving bodies based on the moving body position command value and the moving body position information acquired from the communication subordinate station, or the position deviation,
the communication subordinate station the moving body drive command value to the communication master station,
the current command generator generates a first current command value that is a current command value of the plurality of transport path units based on the moving body drive command value acquired from the communication master station and the moving body position information,
the communication master station transmits the first current command value acquired from the current command generator to the transport path communication subordinate station, and the current controller controls a current to be supplied to the coil based on the first current command value acquired from the transport path communication subordinate station.

2. The transport system according to claim 1, wherein the control controller includes a position command controller including the position command generator, the position generator, the current command generator, and the communication master station, and a drive controller including the position controller and one or a plurality of the communication subordinate stations.

3. The transport system according to claim 1, wherein the control controller includes:
- a position command controller including the position command generator and a first communication master station;
- a track controller including the position generator, the current command generator, and a second communication master station; and
- a drive controller including the position controller and one or a plurality of the communication subordinate stations,
- the transport path communication subordinate station transmits the position detection signal of the position detector to the second communication master station,
- the position generator generates the moving body position information based on the position detection signal acquired from the second communication master station,
- the position command generator generates the moving body position command value,
- the first communication master station transmits the moving body position command value to the communication subordinate station,
- the second communication master station transmits the moving body position information to the communication subordinate station,
- the position controller generates the moving body drive command value based on the moving body position command value and the moving body position information acquired from the communication subordinate station,
- the communication subordinate station transmits the moving body drive command value to the second communication master station,
- the current command generator generates the first current command value based on the moving body drive command value and the moving body position information acquired from the second communication master station,
- the second communication master station transmits the first current command value acquired from the current command generator to the transport path communication subordinate station, and
- the current controller controls a current to be supplied to the coil based on the first current command value acquired from the transport path communication subordinate station.

4. The transport system according to claim 3, wherein the second communication master station includes a third communication master station and a fourth communication master station connected to each other,
the communication subordinate station includes a first communication subordinate station and a second communication subordinate station,
- the transport path communication subordinate station transmits the position detection signal of the position detector to the fourth communication master station,
- the position generator generates the moving body position information based on the position detection signal acquired from the fourth communication master station,
- the position command generator generates the moving body position command value, the first communication master station transmits the moving body position command value to the first communication subordinate station,
- the third communication master station transmits the moving body position information to the second communication subordinate station,
- the position controller generates the moving body drive command value based on the moving body position command value acquired from the first communication subordinate station and the moving body position information acquired from the second communication subordinate station,
- the second communication subordinate station transmits the moving body drive command value to the third communication master station,
- the current command generator generates the first current command value based on the moving body drive command value and the moving body position information acquired from the third communication master station,
- the fourth communication master station transmits the first current command value acquired from the current command generator to the transport path communication subordinate station, and
- the current controller controls a current to be supplied to the coil based on the first current command value acquired from the transport path communication subordinate station.

5. A transport system comprising:
- a plurality of transport path units to constitute a movement route on which a plurality of moving bodies each having a magnet move, and to apply a driving force to the plurality of moving bodies; and
- a control controller to control the plurality of transport path units, wherein
each of the transport path units includes:
- a coil;
- a transport path communication subordinate station;
- a current controller connected to the transport path communication subordinate station; and
a position detector connected to the transport path communication subordinate station, and configured to detect a position of the moving body and output a position detection signal,
the control controller includes:
- a communication master station to communicate with the transport path communication subordinate station;
- one or a plurality of communication subordinate stations to communicate with the communication master station;
- a position command generator connected to the communication master station;
- a position generator connected to the communication master station;
- a current command generator connected to the communication subordinate station; and one or a plurality of position controllers connected to the communication subordinate station and allocated to a plurality of the moving bodies, the control controller includes:
- a position command controller including the position command generator, the position generator, and the communication master station; and
- a drive controller including the position controller, the current command generator, and the communication subordinate station, the transport path communication subordinate station transmits the position detection signal of the position detector to the communication master station, the position generator generates moving body position information, that is position information for each of the plurality of moving bodies based on the position detection signal acquired from the communication master station, using a learned model to infer the first command value from the moving body position information and a moving body drive command value, the position command generator generates the moving body position command value that is a position command value for each of the plurality of moving bodies, the communication master station transmits the moving body position command value and the moving body position information to the communication subordinate station, or transmits a position deviation obtained from the moving body position command value and the moving body position information to the communication subordinate station, the position controller generates a moving body drive command value that is a drive command value for each of the plurality of moving bodies based on the moving body position command value and the moving body position information acquired from the communication subordinate station, or the position deviation, the current command generator generates a first current command value that is a current command value of the plurality of transport path units based on the moving body drive command value and the moving body position information acquired from the communication subordinate station, the communication subordinate station transmits the first current command value to the communication master station, the communication master station transmits the first current command value acquired from the communication subordinate station to the transport path communication subordinate station, and the current controller controls a current to be supplied to the coil based on the first current command value acquired from the transport path communication subordinate station.

6. A transport system comprising:
a plurality of transport path units to constitute a movement route on which a plurality of moving bodies having a magnet moves, and to apply a driving force to the plurality of moving bodies; and
a control controller to control the plurality of transport path units, wherein each of the transport path units includes:
- a coil;
- a transport path communication subordinate station;
- a current command generator connected to the transport path communication subordinate station;
- a current controller connected to the transport path communication subordinate station; and
- a position detector connected to the transport path communication subordinate station, and configured to detect a position of the moving body and output a position detection signal, the control controller includes:
- a communication master station to communicate with the transport path communication subordinate station;
- one or a plurality of communication subordinate stations to communicate with the communication master station;
- a position command generator connected to the communication master station;
- a position generator connected to the communication master station; and
- one or a plurality of position controllers connected to the communication subordinate station and allocated to a plurality of the moving bodies, the transport path communication subordinate station transmits the position detection signal of the position detector to the communication master station, the position generator generates moving body position information that is position information for each of the plurality of moving bodies based on the position detection signal acquired from the communication master station, the position command generator generates a moving body position command value, that is a position command value for each of the plurality of moving bodies, using a learned model to infer the first command value from the moving body position information and a moving body drive command value, the communication master station transmits the moving body position command value and the moving body position information to the communication subordinate station, or transmits a position deviation obtained from the moving body position command value and the moving body position information to the communication subordinate station, the position controller generates the moving body drive command value that is a drive command value for each of the plurality of moving bodies based on the moving body position command value and the moving body position information acquired from the communication subordinate station, or the position deviation, the communication subordinate station transmits the moving body drive command value to the communication master station, the communication master station transmits the moving body position information and the moving body drive command value acquired from the communication subordinate station to the transport path communication subordinate station, the current command generator generates a first current command value that is a current command value of the transport path units based on the moving body position information acquired from the transport path communication subordinate station and the moving body drive command value, and the current controller controls a current to be supplied to the coil based on the first current command value acquired from the current command generator.

7. The transport system according to claim 1 wherein the current command generator includes:
data acquisition processing circuitry to acquire learning data that includes: the moving body position information, the moving body drive command value, and the first current command value; and
model generation processing circuitry to generate the learned model for inferring the first current command value from the moving body position information and the moving body drive command value using the learning data.

8. The transport system according to claim 7, comprising:
inference processing circuitry to output the current command value of the transport path unit from the moving body position information and the moving body drive command value acquired by the data acquisition processing circuitry, using the learned model.

9. The transport system according to claim 1, wherein a number of the position controllers is equal to or less than a number of the moving bodies.

10. The transport system according to claim 1, wherein the magnet and the coil constitute a moving-magnet-type linear motor.

11. The transport system according to claim 1, wherein a connection between the communication master station, the communication subordinate station, and the transport path communication subordinate station is a daisy chain in which the communication master station and the communication subordinate station are connected and the communication subordinate station and the transport path communication subordinate station are connected.

12. The transport system according to claim 3, wherein a connection between the first communication master station, the second communication master station, the communication subordinate station, and the transport path communication subordinate station is a daisy chain in which the first communication master station and the communication subordinate station are connected, the communication subordinate station and the second communication master station are connected, and the second communication master station and the transport path communication subordinate station are connected.

13. The transport system according to claim 4, wherein a connection between the first communication master station, the third communication master station, the fourth communication master station, the first communication subordinate station, the second communication subordinate station, and the transport path communication subordinate station is a daisy chain in which the first communication master station and the first communication subordinate station are connected, the third communication master station and the second communication subordinate station are connected, and the fourth communication master station and the transport path communication subordinate station are connected.

14. The transport system according to claim 1, wherein a first transmission cycle in which the communication master station transmits the moving body position command value and the moving body position information to the communication subordinate station, a second transmission cycle in which the communication subordinate station transmits the moving body drive command value to the communication master station, and a third transmission cycle in which the communication master station transmits the first current command value to the transport path communication subordinate station are predetermined, and
the first communication cycle is different from the second communication cycle and the third communication cycle.

15. The transport system according to claim 14, wherein the first communication cycle is longer than the second communication cycle and the third communication cycle.

16. The transport system according to claim 1, further comprising:
a drive system connected to the control controller, and including a motor control device to acquire a position command value generated by the position command generator.

17. The transport system according to claim 5, further comprising:
a drive system connected to the control controller, and including a motor control device to acquire a position command value generated by the position command generator.

18. The transport system according to claim 6, further comprising:
a drive system connected to the control controller, and including a motor control device to acquire a position command value generated by the position command generator.

* * * * *